US012321857B2

(12) United States Patent
Power et al.

(10) Patent No.: US 12,321,857 B2
(45) Date of Patent: Jun. 3, 2025

(54) METHODS AND APPARATUS TO PERFORM MACHINE-LEARNING MODEL OPERATIONS ON SPARSE ACCELERATORS

(71) Applicant: Intel Corporation, Santa Clara, CA (US)

(72) Inventors: Martin Power, Dublin (IE); Kevin Brady, Newry (GB); Niall Hanrahan, Galway (IE); Martin-Thomas Grymel, Leixlip (IE); David Bernard, Kilcullen (IE); Gary Baugh, Bray (IE)

(73) Assignee: Intel Corporation, Santa Clara, CA (US)

( * ) Notice: Subject to any disclaimer, the term of this patent is extended or adjusted under 35 U.S.C. 154(b) by 1015 days.

(21) Appl. No.: 17/357,924

(22) Filed: Jun. 24, 2021

(65) Prior Publication Data

US 2021/0319317 A1    Oct. 14, 2021

(51) Int. Cl.
*G06F 17/15* (2006.01)
*G06N 3/063* (2023.01)
*G06N 3/08* (2023.01)

(52) U.S. Cl.
CPC ............... *G06N 3/08* (2013.01); *G06F 17/15* (2013.01); *G06F 17/153* (2013.01); *G06N 3/063* (2013.01)

(58) Field of Classification Search
CPC ........ G06N 3/04; G06N 3/0464; G06N 3/045; G06N 3/063; G06N 3/08; G06N 3/082; G06N 3/084; G06F 17/15; G06F 17/153
See application file for complete search history.

(56) References Cited

U.S. PATENT DOCUMENTS

| 10,768,895 | B2 | 9/2020 | Connor et al. | |
| 10,860,922 | B2 | 12/2020 | Dally et al. | |
| 11,803,736 | B1* | 10/2023 | Meyer | G06F 9/3013 |
| 12,182,695 | B1* | 12/2024 | Meyer | G06N 3/063 |
| 2020/0125953 | A1* | 4/2020 | Yoo | G06N 5/04 |
| 2021/0004668 | A1 | 1/2021 | Moshovos et al. | |
| 2021/0224640 | A1* | 7/2021 | Nakahara | G06N 3/063 |
| 2021/0319317 | A1 | 10/2021 | Power et al. | |
| 2022/0188600 | A1* | 6/2022 | Li | G06F 7/5443 |

(Continued)

FOREIGN PATENT DOCUMENTS

| CN | 111626410 | 9/2020 |
| GB | 2568102 A | 5/2019 |

OTHER PUBLICATIONS

L. Bai et al., DepthNet: Real-Time LiDAR Point Cloud Depth Completion for Autonomous Vehicles, IEEE Access, DOI 10.1109/ACCESS.2020.3045681, 2020 (Year: 2020).*

(Continued)

*Primary Examiner* — Emily E Larocque
(74) *Attorney, Agent, or Firm* — Akona IP PC

(57) ABSTRACT

Methods, apparatus, systems and articles of manufacture are disclosed to perform machine-learning model operations on sparse accelerators. An example apparatus includes first circuitry, second circuitry to generate sparsity data based on an acceleration operation, and third circuitry to instruct one or more data buffers to provide at least one of activation data or weight data based on the sparsity data to the first circuitry, the first circuitry to execute the acceleration operation based on the at least one of the activation data or the weight data.

21 Claims, 21 Drawing Sheets

(56) References Cited

U.S. PATENT DOCUMENTS

2022/0405553 A1* 12/2022 Li .................. H04N 25/50

OTHER PUBLICATIONS

B.C Lai et al., Enhancing Utilization of SIMD-Like Accelerator for Sparse Convolutional Neural Networks, IEEE Transactions of Very Large Scale Integration (VLSI) Systems, vol. 27, No. 5, 2019 (Year: 2019).*

R. Zhao et.al., Learning Grouped Convolution for Efficient Domain Adaptation, arXiv:1811.09341v1 [cs.CV], 2018 (Year: 2018).*

International Searching Authority, "Invitation to Correct Defects in the International Application," issued in connection with International Patent Application No. PCT/US2022/021590, mailed on Apr. 6, 2022, 4 pages.

International Searching Authority, "Written Opinion of the International Searching Authority," issued in connection with International Patent Application No. PCT/US2022/021590, mailed on Jun. 30, 2022, 4 pages.

International Searching Authority, "International Search Report," issued in connection with International Patent Application No. PCT/US2022/021590, mailed on Jun. 30, 2022, 4 pages.

International Searching Authority, "International Preliminary Report on Patentability," issued in connection with International Patent Application No. PCT/US2022/021590, mailed on Jan. 4, 2024, 6 pages.

"Keem Bay—Overview." [Online]. Available: https://www.intel.com/content/www/us/en/secure/design/confidential/products-andsolutions/processors-and-chipsets/keem-bay/overview.html. [Accessed: Apr. 12, 2021] (9 pages).

V. Sze, Y.-H. Chen, T.-J. Yang, and J. S. Emer, "Efficient Processing of Deep Neural Networks," Synth. Lect. Comput. Archit., vol. 15, No. 2, pp. 1-341, Jun. 2020 (343 pages).

V. Nair and G. E. Hinton, "Rectified Linear Units Improve Restricted Boltzmann Machines," in Proceedings of the 27th International Conference on Machine Learning (ICML-10), Jun. 21-24, 2010, Haifa, Israel, 2010, pp. 807-814 (8 pages).

Y.-H. Chen, T.-J. Yang, J. S. Emer, and V. Sze, "Eyeriss v2: A Flexible Accelerator for Emerging Deep Neural Networks on Mobile Devices," IEEE J. Emerg. Sel. Top. Circuits Syst., vol. 9, No. 2, pp. 292-308, Jun. 2019 (17 pages).

Y.-H. Chen, J. Emer, V. Sze, Y.-H. Chen, J. Emer, and V. Sze, "Eyeriss: A Spatial Architecture for Energy-Efficient Dataflow for Convolutional Neural Networks," in 2016 ACM/IEEE 43rd Annual International Symposium on Computer Architecture (ISCA), 2016, vol. 44, No. 3, pp. 367-379 (13 pages).

S. Han et al., "EIE: Efficient Inference Engine on Compressed Deep Neural Network," in 2016 ACM/IEEE 43rd Annual International Symposium on Computer Architecture (ISCA), 2016, pp. 243-254 (12 pages).

J. Albericio, P. Judd, T. Hetherington, T. Aamodt, N. E. Jerger, and A. Moshovos, "Cnvlutin: Ineffectual-Neuron-Free Deep Neural Network Computing," in Proceedings—2016 ACM/IEEE 43rd International Symposium on Computer Architecture, ISCA 2016, pp. 1-13 (13 pages).

"What Is Sparsity in AI Inference and Machine Learning? | NVIDIA Blog." [Online]. Available: https://blogs.nvidia.com/blog/2020/05/14/sparsity-ai-inference/. [Accessed: Apr. 13, 2021] (4 pages).

J.-S. Park et al., "9.5 A 6K-MAC Feature-Map-Sparsity-Aware Neural Processing Unit in 5nm Flagship Mobile SoC," in 2021 IEEE International Solid- State Circuits Conference (ISSCC), 2021, pp. 152-154 (3 pages).

F. Chollet, "Xception: Deep learning with depthwise separable convolutions," in Proceedings—30th IEEE Conference on Computer Vision and Pattern Recognition, CVPR, Apr. 4, 2017, pp. 1800-1807 (8 pages).

A. G. Howard et al., "MobileNets: Efficient Convolutional Neural Networks for Mobile Vision Applications." Apr. 17, 2017, arXiv:1704.04861v1 (9 pages).

L. Kaiser, A. N. Gomez, and F. Chollet, "Depthwise Separable Convolutions for Neural Machine Translation," arXiv, Jun. 16, 2017 (10 pages).

K. He, X. Zhang, S. Ren, and J. Sun, "Deep Residual Learning for Image Recognition," arXiv:1512.03385v1, Dec. 10, 2015 (12 pages).

S. Xie, R. Girshick, P. Dollár, Z. Tu, and K. He, "Aggregated residual transformations for deep neural networks," in Proceedings—30th IEEE Conference on Computer Vision and Pattern Recognition, CVPR 2017, Apr. 11, 2017, pp. 5987-5995 (10 pages).

F. Yu and V. Koltun, "Multi-Scale Context Aggregation by Dilated Convolutions," 4th Int. Conf. Learn. Represent. ICLR Apr. 30, 2016—Conf. Track Proc., arXiv:1511.07122v3 (13 pages).

X. Cui, K. Zheng, L. Gao, B. Zhang, D. Yang, and J. Ren, "Multiscale Spatial-Spectral Convolutional Network with Image-Based Framework for Hyperspectral Imagery Classification," Remote Sens., vol. 11, No. 19, p. 2220, Sep. 2019 (21 pages).

Grand Keynote: What DL Hardware Will We Need ?—Overview. [Online]. Available: https://slideslive.com/38923058/grand-keynote-what-dl-hardware-will-we-need. [Accessed: Jun. 24, 2021] (2 pages).

Weijie You et al., "RSNN: A Software/Hardware Co-Optimized Framework for Sparse Convolutional Neural Networks on FPGAs", IEEE Access, vol. 9, Dec. 24, 2020, 12 pages.

Xiao Liu et al., 'Layerwise Sparse Coding for Pruned Deep Neural Networks with Extreme Compression Ratio', Proceedings of the AAAI Conference on Artificial Intelligence, vol. 34, No. 04, Apr. 3, 2020, 8 pages.

International Searching Authority, "International Search Report and Written Opinion," mailed in connection with International Patent Application No. PCT/US2022/021590, on Jun. 30, 2022, 8 pages.

Liu et al., "S2TA: Exploiting Structured Sparsity for Energy-Efficient Mobile CNN Acceleration," arXiv:2017.07983v1 [cs.AR] Jul. 16, 2021, 13 pages.

* cited by examiner

METHODS AND APPARATUS TO PERFORM MACHINE-LEARNING MODEL OPERATIONS ON SPARSE ACCELERATORS

FIELD OF THE DISCLOSURE

This disclosure relates generally to processors and, more particularly, to methods and apparatus to perform machine-learning model operations on sparse accelerators.

BACKGROUND

In recent years, a demand for computationally-intensive processing capabilities, such as image processing capabilities, has moved beyond high-power dedicated desktop hardware and has become an expectation for personal and/or otherwise mobile devices. Mobile devices typically include processing capabilities that are limited by size constraints, temperature management constraints, and/or supply power constraints.

BRIEF DESCRIPTION OF THE DRAWINGS

FIG. 13 is an illustration of example kernels that may be implemented by the example acceleration circuitry of FIGS. 1 and/or 2.

DETAILED DESCRIPTION

Figure 1:
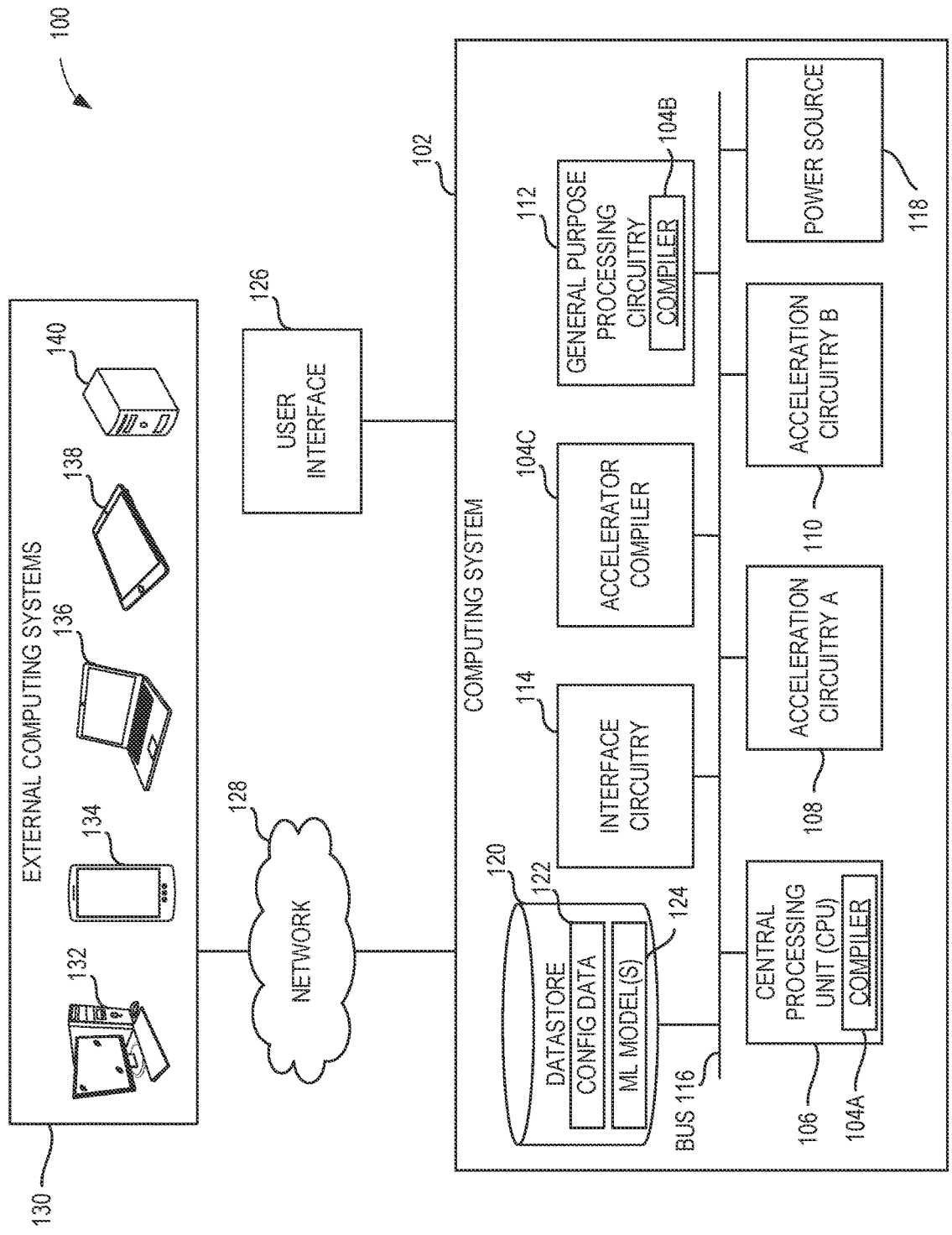
FIG. 1 is an illustration of an example computing system including an example accelerator compiler to configure example acceleration circuitry based on an acceleration operation to be executed by the acceleration circuitry.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Typical computing systems, including personal computers and/or mobile devices, implement computationally-intensive tasks, such as advanced image processing or computer vision algorithms to automate tasks that human vison can perform. For example, computer vision tasks may include acquiring, processing, analyzing, and/or understanding digital images. Some such tasks facilitate, in part, extraction of dimensional data from the digital images to produce numerical and/or symbolic information. Computer vision algorithms can use the numerical and/or symbolic information to make decisions and/or otherwise perform operations associated with three-dimensional (3-D) pose estimation, event detection, object recognition, video tracking, etc., among others. To support augmented reality (AR), virtual reality (VR), robotics, and/or other applications, it is then accordingly important to perform such tasks quickly (e.g., substantially in real time or near real time) and efficiently.

Computationally-intensive tasks, such as advanced image processing or computer vision algorithms, may be implemented utilizing a neural network, such as a convolutional neural network (CNN, or ConvNet). A CNN is a deep, artificial neural network (ANN) typically used to classify images, cluster the images by similarity (e.g., a photo search), and/or perform object recognition within the images using convolution. As used herein, "convolution" is defined to be a function derived from two given functions by integration that expresses how a shape of one of the functions is modified by a shape of the other function. Thus, a CNN can be used to identify faces, individuals, street signs, animals, etc., included in an input image by passing an output of one or more filters corresponding to an image feature (e.g., a horizontal line, a two-dimensional (2-D) shape, etc.) over the input image to identify matches of the image feature within the input image.

CNNs obtain vectors (e.g., broken down from multi-dimensional arrays) that need to be stored or used in computations to perform one or more functions. Thus, a CNN may receive multi-dimensional arrays (e.g., tensors or rows of vectors) including data corresponding to one or more images. The multi-dimensional arrays are broken into vectors. Such vectors may include thousands of elements. Each such element may include a large number of bits. A vector with 10,000 16-bit elements corresponds to 160,000 bits of information. Storing such vectors requires a lot of memory. However, such vectors may include large numbers of elements with a value of zero. Accordingly, some CNNs or other processing engines may break up such a vector into a sparse vector and a sparsity map vector (e.g., a bitmap vector).

As defined herein, a "sparse vector" is a vector that includes all non-zero elements of a vector in the same order as a dense vector, but excludes all zero elements. As defined herein, a "dense vector" is an input vector including both zero and non-zero elements. As such, the dense vector [0, 0, 5, 0, 18, 0, 4, 0] corresponds to the sparse vector is [5, 18, 4]. As defined herein, a "sparsity map" is a vector that includes one-bit elements identifying whether respective elements of the dense vector is zero or non-zero. Thus, a sparsity map may map non-zero values of the dense vector to '1' and may map the zero values of the dense vector to '0'. For the above-dense vector of [0, 0, 5, 0, 18, 0, 4, 0], the sparsity map may be [0, 0, 1, 0, 1, 0, 1, 0] (e.g., because the third, fifth, and seventh elements of the dense vector are non-zero). The combination of the sparse vector and the sparsity map represents the dense vector (e.g., the dense vector could be generated/reconstructed based on the corresponding sparse vector and sparsity map). Accordingly, a CNN engine may generate/determine the dense vector based on the corresponding sparse vector and sparsity map without storing the dense vector in memory.

Storing a sparse vector and a sparsity map in memory instead of a dense vector saves memory and processing resources (e.g., providing there are sufficient zeros in the dense vector(s)). For example, if each element of the above-dense vector (e.g., [0, 0, 5, 0, 18, 0, 4, 0]) was 16 bits of information, the amount of memory required to store the dense vector is 128 bits (e.g., 128 bits=8 elements×16 bits). However, the amount of memory required to store the corresponding sparse vector (e.g., [5, 18, 4]) and the sparsity map (e.g., 0, 0, 1, 0, 1, 0, 1, 0]) is 64 bits (e.g., (the 3 elements of the sparse vector×16 bits)+(8 elements of the sparsity map×1 bit)). Accordingly, storing the sparse vector and sparsity map instead of a corresponding dense vector reduces the amount of memory needed to store such vectors. Additionally, utilizing sparse vectors and sparsity maps improves bandwidth requirements because a decrease of an amount of data being delivered into a computational engine increases a delivery speed to the computational engine.

Machine-learning accelerators, such as neural network accelerators (NNAs), may execute 2-D convolution operations with dedicated hardware. Architectures of machine-learning models that may be executed by the machine-learning accelerators are continuously evolving. Some such architectures incorporate machine-learning layers that are not conventional 2-D convolution operations. For example, non-2-D convolution operations may include depthwise convolution, elementwise addition, etc. Machine-learning accelerators tailored to facilitate execution of 2-D convolution may be unable to execute such non-2-D convolutions.

Some machine-learning accelerators may support such non-2-D convolution operations by offloading the non-2-D convolution operations to other hardware. For example, a 2-D convolution machine-learning accelerator may offload layers to different hardware to execute depthwise convolution layers and retrieve the outputs from the different hardware to facilitate another machine-learning task. In some such examples, the offloading of the layers and retrieval of the outputs increases processing latency when executing non-2-D convolution operations. For example, the machine-learning accelerator may become idle as the layer is offloaded, which may substantially degrade the performance of the machine-learning accelerator. In some such examples, the performance of the machine-learning accelerator may also be degraded due to traversing a memory hierarchy to supply the offloaded layers as inputs to the different hardware and to traverse the memory hierarchy again for the machine-learning accelerator to receive the output from the different hardware and continue processing the machine-learning network.

Some machine-learning accelerators may support non-2-D convolution operations with dedicated hardware. For example, a machine-learning accelerator may include first hardware to execute a 2-D convolution operation and second hardware to execute a non-2-D convolution operation. In some such examples, the inclusion of dedicated hardware within a machine-learning accelerator to execute the non-2-D convolution operations increases the overall size and/or power consumption of the machine-learning accelerator.

In some instances, adding dedicated hardware for layers such as depthwise and elementwise addition may directly degrade the performance of the machine-learning accelerator. For example, performance of a machine-learning accelerator may be measured in Tera-operations per second (TOPs) and the efficiency of the machine-learning accelerator may be measured in TOPs per square millimeter of die area (TOPs/mm$^2$) and/or TOPs per watt of device power (TOPs/W). Accordingly, the inclusion of dedicated hardware may directly degrade TOPs/mm$^2$ of the machine-learning accelerator because increased die area to execute the same number of operations may reduce the TOPs/mm$^2$ metric. The inclusion of dedicated hardware may also require the inclusion of additional data paths within the machine-learning accelerator and multiplexing between these data paths adds significant complexity to the physical implementation of the machine-learning accelerator when targeting substantial frequencies of operation (e.g., gigahertz (GHz) frequencies of operation).

Examples disclosed herein perform machine-learning model operations on sparse accelerators. As used herein, a "sparse accelerator" is a hardware accelerator that may implement machine-learning operations (e.g., convolution operations) by utilizing sparse data structures (e.g., sparse vectors, sparsity map vectors, etc.). In some disclosed examples, an example sparse accelerator may generate sparsity information internally within the sparse accelerator. For example, the sparse accelerator may generate sparse or sparsity information including activation sparsity data (e.g., sparse activation data, sparse activation vector(s), etc.) and/or weight sparsity data (e.g., sparse weight data, sparse weight vector(s), etc.). In some such examples, the sparse accelerator may achieve increased bandwidth by internally generating the sparsity information when compared to retrieving the sparsity information from external hardware. In some disclosed examples, the sparse accelerator may generate weight data internally within the sparse accelerator. In some such disclosed examples, the sparse accelerator may achieve increased bandwidth by internally generating the weight information when compared to retrieving the weight information from external hardware.

In some disclosed examples, the sparse accelerator may adjust and/or otherwise manipulate sparsity bit masks to implement non-2-D convolution operations on the sparse accelerator, which may include depthwise convolution, grouped convolution, non-convolution operations (e.g., elementwise addition), dilated convolution, etc. In some disclosed examples, the sparse accelerator may implement a custom operation in which a user, a computing system, etc., may identify whether at least one of internal weight data generation, internal weight sparsity generation, or internal activation sparsity generation is to be executed by the sparse accelerator.

Advantageously, the example sparse accelerator disclosed herein may execute non-2-D convolution layers as 2-D convolution layers on a sparse machine-learning architecture by invoking sparsity bit mask manipulation, internal generation of sparsity information, internal generation of weight data, etc., and/or a combination thereof. Advantageously, the example sparse accelerator disclosed herein may achieve improved power and performance compared to prior accelerators by executing non-convolution operations as convolutions operations. Advantageously, the example sparse accelerator disclosed herein may achieve increased efficiencies of executing machine-learning networks (e.g., neural networks) on sparse machine-learning accelerators (e.g., sparse neural networks (NNs)) by executing the non-convolution operations as convolution operations.

In some disclosed examples, the sparse accelerator may program configuration registers within the sparse accelerator to internally generate bit mask vectors, weight data, etc., to manipulate the values that are subject to computation and implement the layer operation(s) as a convolution. Advantageously, internal generation of the bit mask vectors, the weight data, etc., may save the bandwidth of reading bit mask vectors, the weight data, etc., from external resources. In some disclosed examples, the sparse accelerator may manipulate the bit mask vectors values in memory and read in these vectors to manipulate the values that are subject to computation and implement the layer operation(s) as a convolution.

FIG. 1 is an illustration of an example computing environment 100 including an example computing system 102, which includes an example accelerator compiler 104A-C to configure a sparse accelerator to execute non-convolution operations as convolution operations to achieve improved accelerator efficiency and performance. In some examples, the accelerator compiler 104A-C obtains an output from a machine-learning framework (e.g., a NN framework) and compiles the output for implementation on the sparse accelerator based on the non-convolution operation to be executed and/or otherwise performed by the sparse accelerator.

The computing system 102 of the illustrated example of FIG. 1 includes an example central processing unit (CPU) 106, a first example acceleration circuitry (ACCELERATION CIRCUITRY A) 108, a second example acceleration circuitry (ACCELERATION CIRCUITRY B) 110, an example general purpose processing circuitry 112, an example interface circuitry 114, an example bus 116, an example power source 118, and an example datastore 120. In this example, the datastore 120 includes example configuration data (CONFIG DATA) 122 and example machine-learning model(s) (ML MODEL(S) 124. Further depicted in the illustrated example of FIG. 1 are an example user interface 126, an example network 128, and example external computing systems 130.

In some examples, the computing system 102 is a system on a chip (SoC) representative of one or more integrated circuits (ICs) (e.g., compact ICs) that incorporate components of a computer or other electronic system in a compact format. For example, the computing system 102 may be implemented with a combination of one or more programmable processors, hardware logic, and/or hardware peripherals and/or interfaces. Additionally or alternatively, the example computing system 102 of FIG. 1 may include memory, input/output (I/O) port(s), and/or secondary storage. For example, the computing system 102 includes the acceleration compiler 104A-C, the CPU 106, the first acceleration circuitry 108, the second acceleration circuitry 110, the general purpose processing circuitry 112, the interface circuitry 114, the bus 116, the power source 118, the datastore 120, the memory, the I/O port(s), and/or the secondary storage all on the same substrate (e.g., silicon substrate, semiconductor-based substrate, etc.). In some examples, the computing system 102 includes digital, analog, mixed-signal, radio frequency (RF), or other signal processing functions.

In the illustrated example of FIG. 1, the first acceleration circuitry 108 is an artificial intelligence (AI) accelerator. For example, the first acceleration circuitry 108 may be implemented by a hardware accelerator configured to accelerate AI tasks or workloads, such as NNs (e.g., artificial neural networks (ANNs)), machine vision, machine learning, etc. In some examples, the first acceleration circuitry 108 may implement a sparse accelerator (e.g., a sparse hardware accelerator). In some examples, the first acceleration circuitry 108 may implement a vision processing unit (VPU) to effectuate machine or computer vision computing tasks, train and/or execute a physical neural network, and/or train and/or execute a neural network. In some examples, the first acceleration circuitry 108 may train and/or execute a convolution neural network (CNN), a deep neural network (DNN), an ANN, a recurrent neural network (RNN), etc., and/or a combination thereof.

In the illustrated example of FIG. 1, the second acceleration circuitry 110 is a graphics processing unit (GPU). For example, the second acceleration circuitry 110 may be a GPU that generates computer graphics, executes general-purpose computing, etc. In some examples, the second acceleration circuitry 110 is another instance of the first acceleration circuitry 108. In some such examples, the computing system 102 may provide portion(s) of AI/ML workloads to be executed in parallel by the first acceleration circuitry 108 and the second acceleration circuitry 110.

The general purpose processing circuitry 112 of the example of FIG. 1 is a programmable processor, such as a CPU or a GPU. Alternatively, one or more of the first acceleration circuitry 108, the second acceleration circuitry 110, and/or the general purpose processing circuitry 112 may be a different type of hardware such as a digital signal processor (DSP), an application specific integrated circuit (ASIC), a programmable logic device (PLD), and/or a field programmable logic device (FPLD) (e.g., a field-programmable gate array (FPGA)).

In the illustrated example of FIG. 1, the interface circuitry 114 is hardware that may implement one or more interfaces (e.g., computing interfaces, network interfaces, etc.). For example, the interface circuitry 114 may be hardware, software, and/or firmware that implements a communication device (e.g., a network interface card (NIC), a smart NIC, a gateway, a switch, etc.) such as a transmitter, a receiver, a transceiver, a modem, a residential gateway, a wireless access point, and/or a network interface to facilitate exchange of data with external machines (e.g., computing devices of any kind) via the network 128. In some examples, the communication is effectuated via a Bluetooth® connection, an Ethernet connection, a digital subscriber line (DSL) connection, a wireless fidelity (Wi-Fi) connection, a telephone line connection, a coaxial cable system, a satellite system, a line-of-site wireless system, a cellular telephone system, an optical connection (e.g., a fiber-optic connection), etc. For example, the interface circuitry 114 may be implemented by any type of interface standard, such as a Bluetooth® interface, an Ethernet interface, a Wi-Fi interface, a universal serial bus (USB), a near field communication (NFC) interface, and/or a peripheral component interconnect express (PCIe) interface.

The computing system 102 includes the power source 118 to deliver power to hardware of the computing system 102. In some examples, the power source 118 may implement a power delivery network. For example, the power source 118 may implement an alternating current-to-direct current (AC/DC) power supply. In some examples, the power source 118 may be coupled to a power grid infrastructure such as an AC main (e.g., a 110 volt (V) AC grid main, a 220 V AC grid main, etc.). Additionally or alternatively, the power source 118 may be implemented by a battery. For example, the power source 118 may be a limited energy device, such as a lithium-ion battery or any other chargeable battery or power source. In some such examples, the power source 118 may be chargeable using a power adapter or converter (e.g., an AC/DC power converter), a wall outlet (e.g., a 110 V AC wall outlet, a 220 V AC wall outlet, etc.), a portable energy storage device (e.g., a portable power bank, a portable power cell, etc.), etc.

The computing system 102 of the illustrated example of FIG. 1 includes the datastore 120 to record data (e.g., the configuration data 122, the ML model(s) 124, etc.). The datastore 120 of this example may be implemented by a volatile memory (e.g., a Synchronous Dynamic Random Access Memory (SDRAM), a Dynamic Random Access Memory (DRAM), a RAMBUS Dynamic Random Access Memory (RDRAM), etc.) and/or a non-volatile memory (e.g., flash memory). The datastore 120 may additionally or alternatively be implemented by one or more double data rate (DDR) memories, such as DDR, DDR2, DDR3, DDR4, mobile DDR (mDDR), etc. The datastore 120 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 120 is illustrated as a single datastore, the datastore 120 may be implemented by any number and/or type(s) of datastores. Furthermore, the data stored in the datastore 120 may be in any data format such as, for example, binary data, comma delimited data, tab delimited data, structured query language (SQL) structures, an executable, etc.

In the illustrated example of FIG. 1, the computing system 102 is in communication with the user interface 126. For example, the user interface 126 may be implemented by a graphical user interface (GUI), an application user interface, etc., which may be presented to a user on a display device in circuit with and/or otherwise in communication with the computing system 102. In some such examples, a user (e.g., a developer, an IT administrator, a customer, etc.) controls the computing system 102, configures, trains, and/or executes the ML model(s) 124, etc., via the user interface 126. Alternatively, the computing system 102 may include and/or otherwise implement the user interface 126.

In the illustrated example of FIG. 1, the accelerator compiler 104A-C, the CPU 106, the first acceleration circuitry 108, the second acceleration circuitry 110, the general purpose processing circuitry 112, the interface circuitry 114, the power source 118, and the datastore 120 are in communication with one(s) of each other via the bus 116. For example, the bus 116 may be implemented by at least one of an Inter-Integrated Circuit (I2C) bus, a Serial Peripheral Interface (SPI) bus, a Peripheral Component Interconnect (PCI) bus, or a PCIe bus. Additionally or alternatively, the bus 116 may be implemented by any other type of computing or electrical bus.

In the illustrated example of FIG. 1, the network 128 is the Internet. However, the network 128 of this example may be implemented using any suitable wired and/or wireless network(s) including, for example, one or more data buses, one or more Local Area Networks (LANs), one or more wireless LANs, one or more cellular networks, one or more private networks, one or more public networks, etc. In some examples, the network 128 enables the computing system 102 to be in communication with one(s) of the external computing systems 130.

In the illustrated example of FIG. 1, the external computing systems 130 include and/or otherwise implement one or more computing devices on which the ML model(s) 124 is/are to be executed. In this example, the external computing systems 130 include an example desktop computer 132, an example mobile device (e.g., a smartphone, an Internet-enabled smartphone, etc.) 134, an example laptop computer 136, an example tablet (e.g., a tablet computer, an Internet-enabled tablet computer, etc.) 138, and an example server 140. In some examples, fewer or more than the external computing systems 130 depicted in FIG. 1 may be used. Additionally or alternatively, the external computing systems 130 may include, correspond to, and/or otherwise be representative of, any other type and/or quantity of computing devices.

In some examples, one or more of the external computing systems 130 execute one(s) of the ML model(s) 124 to process a computing workload (e.g., an AI/ML workload). For example, the mobile device 134 can be implemented as a cell or mobile phone having one or more processors (e.g., a CPU, a GPU, a VPU, an AI or NN specific processor, etc.) on a single SoC to process an AI/ML workload using one(s) of the ML model(s) 124. In some examples, the desktop computer 132, the laptop computer 136, the tablet computer, and/or the server 140 may be implemented as computing device(s) having one or more processors (e.g., a CPU, a GPU, a VPU, an AI/NN specific processor, etc.) on one or more SoCs to process AI/ML workload(s) using one(s) of the ML model(s) 124. In some examples, the server 140 may implement one or more servers (e.g., physical servers, virtualized servers, etc., and/or a combination thereof) that may implement a data facility, a cloud service (e.g., a public or private cloud provider, a cloud-based repository, etc.), etc., to process AI/ML workload(s) using one(s) of the ML model(s) 124.

In the illustrated example of FIG. 1, the computing system 102 includes a first accelerator compiler 104A (e.g., a first instance of the accelerator compiler 104A-C), a second accelerator compiler 104B (e.g., a second instance of the accelerator compiler 104A-C), and a third accelerator compiler 104C (e.g., a third instance of the accelerator compiler 104A-C) (collectively referred to herein as the accelerator compiler 104A-C unless specified otherwise). In this example, the first accelerator compiler 104A is implemented by the CPU 106 (e.g., implemented by hardware, software, and/or firmware of the CPU 106).

In the illustrated example of FIG. 1, the second accelerator compiler 104B is implemented by the general purpose processing circuitry 112 (e.g., implemented by hardware, software, and/or firmware of the general purpose processing circuitry 112). In this example, the third accelerator compiler 104C is external to the CPU 106. For example, the third accelerator compiler 104C may be implemented by hardware, software, and/or firmware of the computing system 102. In some such examples, the third accelerator compiler 104C may be implemented by one or more analog or digital circuit(s), logic circuits, programmable processor(s), programmable controller(s), GPU(s), DSP(s), ASIC(s), PLD(s), and/or FPLD(s)).

In some examples, one or more of the first accelerator compiler 104A, the second accelerator compiler 104B, the third accelerator compiler 104C, and/or portion(s) thereof, may be virtualized, such as by being implemented with one or more containers, one or more virtual resources (e.g., virtualizations of compute, memory, networking, storage, etc., physical hardware resources), one or more virtual machines, etc. In some examples one or more of the first accelerator compiler 104A, the second accelerator compiler 104B, the third accelerator compiler 104C, and/or portion(s) thereof, may be implemented by different resource(s) of the computing system 102. Alternatively, the computing system 102 may not include one or more of the first accelerator compiler 104A, the second accelerator compiler 104B, and/or the third accelerator compiler 104C.

In the illustrated example of FIG. 1, the accelerator compiler 104A-C may compile an AI/ML framework based on the configuration data 122 for implementation on one(s) of the acceleration circuitry 108, 110. In some examples, the configuration data 122 may include AI/ML configuration data (e.g., register configurations, activation data, activation sparsity data, weight data, weight sparsity data, hyperparameters, etc.), a convolution operation to be executed (e.g., a 2-D convolution, a depthwise convolution, a grouped convolution, a dilated convolution, etc.), a non-convolution operation (e.g., an elementwise addition operation), etc., and/or a combination thereof. In some examples, the accelerator compiler 104A-C may compile the AI/ML framework to generate an executable construct that may be executed by the one(s) of the acceleration circuitry 108, 110.

In the illustrated example of FIG. 1, the accelerator compiler 104A-C may instruct, direct, and/or otherwise invoke one(s) of the acceleration circuitrys 108, 110 to execute one(s) of the ML model(s) 124. For example, the ML model(s) 124 may implement AI/ML models. AI, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the machine-learning model(s) 124 may be trained with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the accelerator compiler 104A-C generates the machine-learning model(s) 124 as neural network model(s). The accelerator compiler 104A-C may invoke the interface circuitry 114 to transmit the machine-learning model(s) 124 to one(s) of the external computing systems 130. Using a neural network model enables the acceleration circuitry 108, 110 to execute an AI/ML workload. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the accelerator compiler 104A-C may compile and/or otherwise generate one(s) of the machine-learning model(s) 124 as lightweight machine-learning models.

In general, implementing an ML/AI system involves two phases, a learning/training phase and an inference phase. In the learning/training phase, a training algorithm is used to train the machine-learning model(s) 124 to operate in accordance with patterns and/or associations based on, for example, training data. In general, the machine-learning model(s) 124 include(s) internal parameters (e.g., the configuration data 122) that guide how input data is transformed into output data, such as through a series of nodes and connections within the machine-learning model(s) 124 to transform input data into output data. Additionally, hyperparameters (e.g., the configuration data 122) are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the accelerator compiler 104A-C may invoke supervised training to use inputs and corresponding expected (e.g., labeled) outputs to select parameters (e.g., by iterating over combinations of select parameters) for the machine-learning model(s) 124 that reduce model error. As used herein, "labeling" refers to an expected output of the machine learning model (e.g., a classification, an expected output value, etc.). Alternatively, the accelerator compiler 104A-C may invoke unsupervised training (e.g., used in deep learning, a subset of machine learning, etc.) that involves inferring patterns from inputs to select parameters for the machine-learning model(s) 124 (e.g., without the benefit of expected (e.g., labeled) outputs).

In some examples, the accelerator compiler 104A-C trains the machine-learning model(s) 124 using unsupervised clustering of operating observables. However, the accelerator compiler 104A-C may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the accelerator compiler 104A-C may train the machine-learning model(s) 124 until the level of error is no longer reducing. In some examples, the accelerator compiler 104A-C may train the machine-learning model(s) 124 locally on the computing system 102 and/or remotely at an external computing system (e.g., one(s) of the external computing systems 130) communicatively coupled to the computing system 102. In some examples, the accelerator compiler 104A-C trains the machine-learning model(s) 124 using hyperparameters that control how the learning is performed (e.g., a learning rate, a number of layers to be used in the machine learning model, etc.). In some examples, the accelerator compiler 104A-C may use hyperparameters that control model performance and training speed such as the learning rate and regularization parameter(s). The accelerator compiler 104A-C may select such hyperparameters by, for example, trial and error to reach an optimal model performance. In some examples, the accelerator compiler 104A-C utilizes Bayesian hyperparameter optimization to determine an optimal and/or otherwise improved or more efficient network architecture to avoid model overfitting and improve the overall applicability of the machine-learning model(s) 124. Alternatively, the accelerator compiler 104A-C may use any other type of optimization. In some examples, the accelerator compiler 104A-C may perform re-training. The accelerator compiler 104A-C may execute such re-training in response to override(s) by a user of the computing system 102, a receipt of new training data, etc.

In some examples, the accelerator compiler 104A-C facilitates the training of the machine-learning model(s) 124 using training data. In some examples, the accelerator compiler 104A-C utilizes training data that originates from locally generated data. In some examples, the accelerator compiler 104A-C utilizes training data that originates from externally generated data. In some examples where supervised training is used, the accelerator compiler 104A-C may label the training data. Labeling is applied to the training data by a user manually or by an automated data pre-processing system. In some examples, the accelerator compiler 104A-C may pre-process the training data using, for example, an interface (e.g., the interface circuitry 114). In some examples, the accelerator compiler 104A-C sub-divides the training data into a first portion of data for training the machine-learning model(s) 124, and a second portion of data for validating the machine-learning model(s) 124.

Once training is complete, the accelerator compiler 104A-C may deploy the machine-learning model(s) 124 for use as an executable construct that processes an input and provides an output based on the network of nodes and connections defined in the machine-learning model(s) 124. The accelerator compiler 104A-C may store the machine-learning model(s) 124 in the datastore 120. In some examples, the accelerator compiler 104A-C may invoke the interface circuitry 114 to transmit the machine-learning model(s) 124 to one(s) of the external computing systems 130. In some such examples, in response to transmitting the machine-learning model(s) 124 to the one(s) of the external computing systems 130, the one(s) of the external computing systems 130 may execute the machine-learning model(s) 124 to execute AI/ML workloads with at least one of improved efficiency or performance.

Once trained, the deployed one(s) of the machine-learning model(s) 124 may be operated in an inference phase to process data. In the inference phase, data to be analyzed (e.g., live data) is input to the machine-learning model(s) 124, and the machine-learning model(s) 124 execute(s) to create an output. This inference phase can be thought of as the AI "thinking" to generate the output based on what it learned from the training (e.g., by executing the machine-learning model(s) 124 to apply the learned patterns and/or associations to the live data). In some examples, input data undergoes pre-processing before being used as an input to the machine-learning model(s) 124. Moreover, in some examples, the output data may undergo post-processing after it is generated by the machine-learning model(s) 124 to transform the output into a useful result (e.g., a display of data, a detection and/or identification of an object, an instruction to be executed by a machine, etc.).

In some examples, output of the deployed one(s) of the machine-learning model(s) 124 may be captured and provided as feedback. By analyzing the feedback, an accuracy of the deployed one(s) of the machine-learning model(s) 124 can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the accelerator compiler 104A-C configures one(s) of the acceleration circuitry 108, 110 to execute a convolution operation, such as 2-D convolution operation. For example, the acceleration circuitry 108, 110 may implement a CNN. In some examples, CNNs ingest and/or otherwise process images as tensors, which are matrices of numbers with additional dimensions. For example, a CNN can obtain an input image represented by 3-D tensors, where a first and a second dimension correspond to a width and a height of a matrix and a third dimension corresponds to a depth of the matrix. For example, the width and the height of the matrix can correspond to a width and a height of an input image and the depth of the matrix can correspond to a color depth (e.g., a color layer) or a color encoding of the image (e.g., a Red-Green-Blue (RGB) encoding).

A typical CNN may also receive an input and transform the input through a series of hidden layers. For example, a CNN may have a plurality of convolution layers, pooling layers, and/or fully-connected layers. In some such examples, a CNN may have a plurality of layer triplets including a convolution layer, a pooling layer, and a fully-connected layer. In some examples, a CNN may have a plurality of convolution and pooling layer pairs that output to one or more fully-connected layers. In some examples, a CNN may include 20 layers, 30 layers, etc.

In some examples, the acceleration circuitry 108, 110 may execute a convolution layer to apply a convolution function or operation to map images of an input (previous) layer to the next layer in a CNN. In some examples, the convolution may be three-dimensional (3-D) because each input layer can have multiple input features (e.g., input channels) associated with an input image. The acceleration circuitry 108, 110 may execute the convolution layer to perform convolution by forming a regional filter window in each individual input channel and generating output data or activations by calculating a product of (1) a filter weight associated with the regional filter window and (2) the input data covered by the regional filter window. For example, the acceleration circuitry 108, 110 may determine an output feature of an input image by using the convolution filter to scan a plurality of input channels including a plurality of the regional filter windows.

In some examples, the acceleration circuitry 108, 110 may execute a pooling layer to extract information from a set of activations in each output channel. The pooling layer may perform a maximum pooling operation corresponding to a maximum pooling layer or an average pooling operation corresponding to an average pooling layer. In some examples, the maximum pooling operation may include selecting a maximum value of activations within a pooling window. In some examples, the average pooling operation may include calculating an average value of the activations within the pooling window.

In some examples, the acceleration circuitry 108, 110 may execute a fully-connected layer to obtain the data calculated by the convolution layer(s) and/or the pooling layer(s) and/or classify the data into one or more classes. In some examples, the fully-connected layer may determine whether the classified data corresponds to a particular image feature of the input image. For example, the acceleration circuitry 108, 110 may execute the fully-connected layer to determine whether the classified data corresponds to a simple image feature (e.g., a horizontal line) or a more complex image feature like an animal (e.g., a cat).

In some examples, the accelerator compiler 104A-C may configure one(s) of the acceleration circuitry 108, 110 to execute non-2-D convolution operations as 2-D convolution operations. For example, the accelerator compiler 104A-C may configure the one(s) of the acceleration circuitry 108, 110 to implement a depthwise convolution operation, an elementwise addition operation, a grouped convolution operation, a dilated convolution operation, a custom operation (e.g., a custom convolution, a custom acceleration operation, etc.), etc., as a 2-D convolution operation. In some such examples, the accelerator compiler 104A-C may instruct the one(s) of the acceleration circuitry 108, 110 to internally generate data rather than receive the data from the accelerator compiler 104A-C, the configuration data 122, etc. For example, the accelerator compiler 104A-C may instruct the first acceleration resource to generate at least one of activation sparsity data, weight sparsity data, or weight data based on the acceleration operation to be executed by the first acceleration circuitry 108. In some such examples, the accelerator compiler 104A-C may instruct the one(s) of the acceleration circuitry 108, 110 to execute the one(s) of the ML model(s) 124 based on the data generated by the one(s) of the acceleration circuitry 108, 110, which may be based on a convolution operation to be executed by the one(s) of the acceleration circuitry 108, 110.

Figure 2:
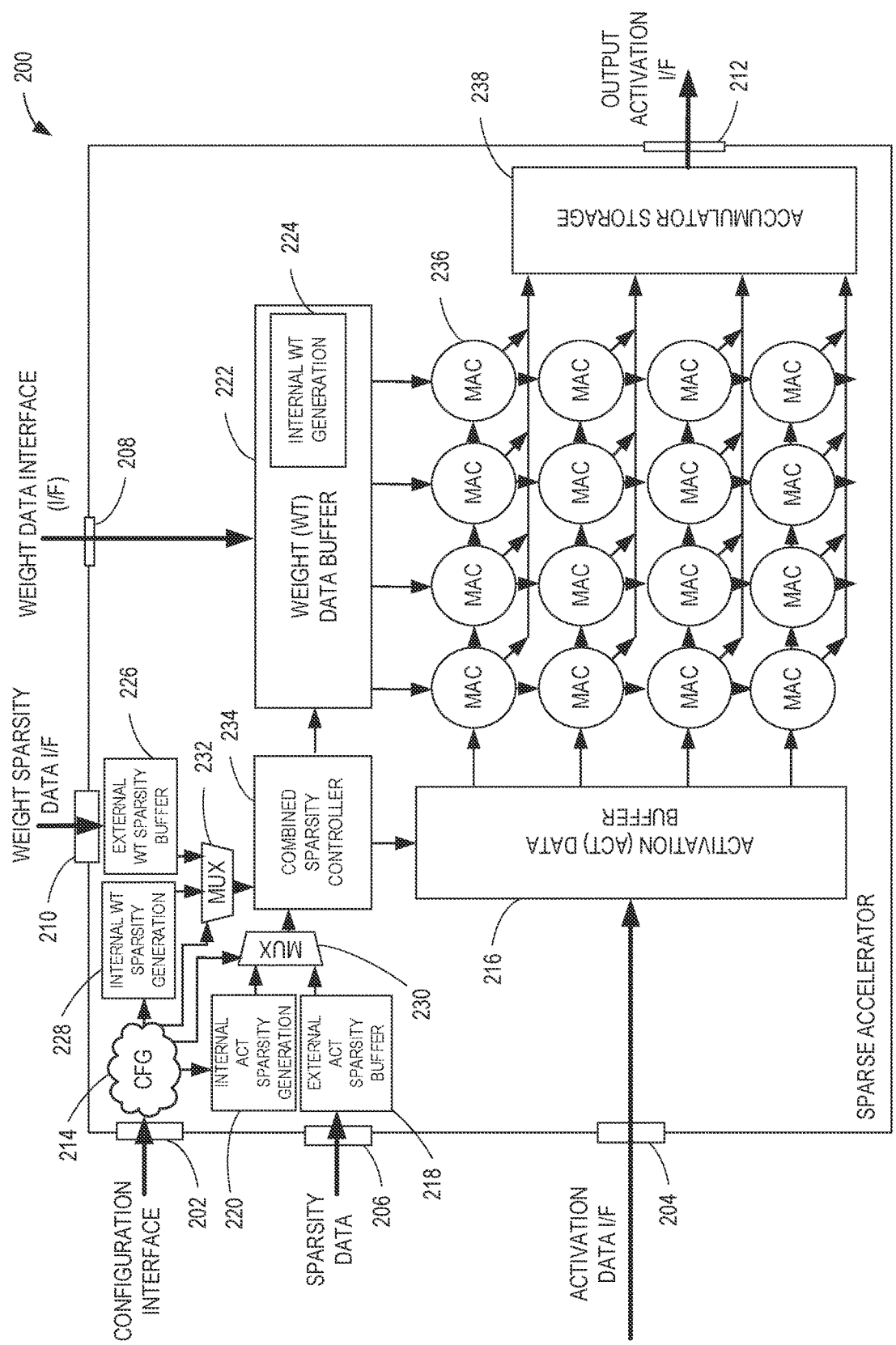
FIG. 2 is an illustration of an example implementation of the example acceleration circuitry of FIG. 1.

FIG. 2 is an illustration of an example accelerator 200. In some examples, the accelerator 200 may implement the first acceleration circuitry 108 and/or the second acceleration circuitry 110 of FIG. 1. For example, the accelerator 200 may implement an AI and/or ML accelerator (e.g., a GPU, a VPU, an NN processor, etc.). The accelerator 200 of FIG. 2 is a hardware accelerator. For example, the accelerator 200 may be implemented by one or more analog or digital circuit(s), logic circuits, programmable processor(s), programmable controller(s), GPU(s), DSP(s), ASIC(s), PLD(s), and/or FPLD(s)). In some examples, the accelerator 200 implements a machine-learning model, such as a NN, or portion(s) thereof. For example, the accelerator 200 may implement one of the ML model(s) 124 of FIG. 1, or one or more layers (e.g., ML layers, NN layers, etc.) thereof.

In the illustrated example of FIG. 2, the accelerator 200 is a sparse accelerator, such as a sparse NN accelerator. For example, an accelerator that implements a CNN may execute a convolution layer using one or more multiply-accumulate (MAC) operations between input activations and kernel weights. The accelerator 200 may save energy and/or otherwise execute with reduced power consumption (and reduce the time taken to process a NN layer) by ignoring and/or otherwise not calculating activation values having a value of zero. In some examples, the accelerator 200 may implement a ReLU function as the non-linear activation. For example, the ReLU function may clamp all negative values to zero, which may result in a significant number of zeros being present in the output activations and, thus, may be the main source of activation sparsity.

In some examples, the accelerator 200 may implement weight sparsity in response to a pruning of small magnitude values and replacing them with a value of zero. For example, the accelerator compiler 104A-C of FIG. 1 may introduce sparsity by employing techniques such as certain types of regularization to encourage weight values to zero during training of the machine-learning model (e.g., the ML model(s) 124 of FIG. 1) to be implemented by the accelerator 200. As described in further detail below, the accelerator 200 may combine both activation and weight sparsity to fully leverage all redundancy to achieve improved and/or otherwise maximum acceleration.

An accelerator based on a dense NNA may only read in data, such as activation and weight data. A sparse accelerator based on a sparse NNA may read in both the data and control information. In some examples, the control information may be used to indicate where the non-zero data is located in the read-in data. In some examples, the control information may be implemented in different control formats to represent the sparse data, such as run-length-encoded bit streams, coordinate lists, bit masks of non-zero entries, etc. In the example of FIG. 2, the accelerator 200 may use a bit mask of non-zero entries (e.g., a sparsity map or a sparsity vector) to represent the sparse data.

The accelerator 200 of the illustrated example includes accelerator or acceleration inputs, which may include an example configuration interface 202, an example activation data interface (I/F) 204, an example activation sparsity data interface 206, an example weight data interface 208, an example weight sparsity data interface 210. The accelerator 200 includes accelerator or acceleration outputs, which may include an example output activation interface 212. For example, at least one of the configuration interface 202, the activation data interface 204, the activation sparsity data interface 206, the weight data interface 208, the weight sparsity data interface 210, or the output activation interface 212 may be implemented by one or more interface circuits (e.g., interface circuitry, interface logic circuitry, etc.) implemented by any type of interface standard. In some such examples, at least one of the configuration interface 202, the activation data interface 204, the activation sparsity data interface 206, the weight data interface 208, the weight sparsity data interface 210, or the output activation interface 212 may be implemented by one or more analog or digital circuit(s), logic circuits, etc.

The accelerator 200 of the illustrated example includes example configuration circuitry 214, an example activation data buffer 216, an example external activation sparsity buffer 218, example internal activation sparsity generation circuitry 220, an example weight data buffer 222, example internal weight generation circuitry 224, example external weight sparsity buffer 226, example internal weight sparsity generation circuitry 228, a first example multiplexer (MUX) 230, a second example multiplexer 232, an example combined sparsity controller 234, a plurality of example multiply accumulators (MACs) 236, and example accumulator storage 238. In some examples, other structures may be present in the accelerator 200. For example, the accelerator 200 may include direct memory access (DMA) circuitry, CPU scheduling circuitry, etc., or any other type of accelerator circuitry. In some such examples, the accelerator 200 is not so limited to the structures depicted in the illustrated example of FIG. 2.

Output(s) of the activation data interface 204 is/are coupled to input(s) (e.g., buffer input(s), data buffer input(s), etc.) of the activation data buffer 216. Output(s) (e.g., interface output(s)) of the configuration interface 202 is/are coupled to input(s) (e.g., configuration input(s), configuration circuitry input(s), etc.) of the configuration circuitry 214. Output(s) (e.g., configuration output(s), configuration circuitry output(s), etc.) of the configuration circuitry 214 is/are coupled to input(s) of the internal activation sparsity generation circuitry 220, input(s) of the internal weight sparsity generation circuitry 228, input(s) (e.g., selection input(s), control input(s), multiplexer control input(s), etc.) of the first multiplexer 230, and input(s) (e.g., selection input(s), control input(s), multiplexer control input(s), etc.) of the second multiplexer 232.

In this example, output(s) of the activation sparsity data interface 206 is/are coupled to input(s) of the external activation sparsity buffer 218. Output(s) of the internal activation sparsity generation circuitry 220 and output(s) (e.g., buffer output(s), data buffer output(s), etc.) of the external activation sparsity buffer 218 is/are coupled to respective input(s) (e.g., multiplexer input(s)) of the first multiplexer 230. Output(s) (e.g., multiplexer output(s)) of the first multiplexer 230 is/are coupled to input(s) (e.g., controller input(s)) of the combined sparsity controller 234.

In this example, output(s) of the weight data interface 208 is/are coupled to input(s) of the weight data buffer 222. Output(s) of the weight sparsity data interface 210 is/are coupled to input(s) of the external weight sparsity buffer 226. Output(s) of the internal weight sparsity generation circuitry 228 and output(s) of the external weight sparsity buffer 226 is/are coupled to respective input(s) of the second multiplexer 232. Output(s) of the second multiplexer 232 is/are coupled to input(s) of the combined sparsity controller 234. Output(s) (e.g., controller output(s)) of the combined sparsity controller 234 is/are coupled to input(s) of the activation data buffer 216 and input(s) of the weight data buffer 222.

In this example, output(s) of the activation data buffer 216 is/are coupled to input(s) of the MACs 236. For example, one or more first outputs of the activation data buffer 216 may be coupled to one or more first inputs of a first one of the MACs 236, one or more second outputs of the activation data buffer 216 may be coupled to one or more second inputs of a second one of the MACs 236, etc. For example, the output(s) of the activation data buffer 216 may be coupled to respective ones of the accelerator inputs, which may be implemented by inputs of the MACs 236.

In this example, output(s) of the weight data buffer 222 is/are coupled to input(s) of the MACs 236. For example, one or more first outputs of the weight data buffer 222 may be coupled to one or more first inputs of a first one of the MACs 236, one or more second outputs of the weight data buffer 222 may be coupled to one or more second inputs of a second one of the MACs 236, etc. Output(s) of the MACs 236 is/are coupled to input(s) (e.g., storage input(s), accumulator storage input(s), etc.) of the accumulator storage 238. Output(s) (e.g., storage output(s), accumulator storage output(s), etc.) of the accumulator storage 238 is/are coupled to input(s) of the output activation interface 212. Output(s) of the output activation interface 212 may be coupled to different hardware. For example, the output(s) of the output activation interface 212 may be coupled to one(s) of the CPU 106, the first acceleration circuitry 108, the second acceleration circuitry 110, the general purpose processing circuitry 112, the interface circuitry 114, the bus 116, the datastore 120, etc., of FIG. 1.

In the illustrated example of FIG. 2, the accelerator 200 includes the configuration interface 202, the activation data interface 204, the activation sparsity data interface 206, the weight data interface 208, and the weight sparsity data interface 210 to receive and/or otherwise obtain data from a data source (e.g., hardware, software, and/or firmware of the computing system 102 or portion(s) thereof). In some examples, the configuration interface 202 receives configuration data, such as the configuration data 122 of FIG. 1. For example, the configuration interface 202 may receive the configuration data 122 to include configuration register settings. In some such examples, the configuration register settings may include a first configuration register setting that, when invoked, instructs the internal activation sparsity generation circuitry 220 to generate an activation bit mask (e.g., an activation sparsity bit mask) based on a first pattern (e.g., a first data pattern). In some such examples, the configuration register settings may include a second configuration register setting that, when invoked, instructs the internal weight sparsity generation circuitry 228 to generate a weight bit mask (e.g., a weight sparsity bit mask) based on a second pattern (e.g., a second data pattern).

In some examples, the activation data interface 204 receives activation data (e.g., convolution activation values, ML activation values, etc.) and stores the activation data in the activation data buffer 216. For example, the external activation sparsity buffer 218 may be implemented by volatile memory (e.g., flash memory), non-volatile memory, etc. In some examples, the activation sparsity data interface 206 receives sparsity activation data (e.g., a sparsity activation vector) and stores the sparsity activation data in the external activation sparsity buffer 218. In some examples, the weight data interface 208 receives weight data (e.g., convolution weight values, ML weight values, etc.) and stores the weight data in the weight data buffer 222. In some examples, the weight sparsity data interface 210 receives sparsity weight data (e.g., a sparsity weight vector) and stores the sparsity weight data in the external weight sparsity buffer 226. For example, the external weight sparsity buffer 226 may be implemented by volatile memory, non-volatile memory, etc.

In the illustrated example of FIG. 2, the accelerator 200 includes the internal activation sparsity generation circuitry 220 to generate activation sparsity data based on configuration data, such as the configuration data 122 of FIG. 1. For example, the internal activation sparsity generation circuitry 220 may generate a sparse activation vector based on a data pattern, which may be indicated and/or otherwise based on the configuration data.

In the illustrated example of FIG. 2, the accelerator 200 includes the internal weight sparsity generation circuitry 228 to generate weight sparsity data based on configuration data, such as the configuration data 122 of FIG. 1. For example, the internal weight sparsity generation circuitry 228 may generate a sparse weight vector based on a data pattern, which may be indicated and/or otherwise based on the configuration data.

Advantageously, the internal activation sparsity generation circuitry 220 and/or the internal weight sparsity generation circuitry 228 increases and/or otherwise improves the bandwidth of the accelerator 200. For example, in a conventional accelerator architecture, sparsity vectors reside in memory of the accelerator. For a conventional convolution operation, the corresponding bit masks may be computed offline for weights or at runtime for activations. The bit masks may not be calculated internally within the conventional accelerator architecture for a conventional convolution because the distribution of zeros within the data is random.

Advantageously, for other types of accelerator operations in which the bit mask vectors may be indicative of compute (e.g., a '1' to indicate computation of an element and a '0' to indicate a non-computation of an element) as opposed to sparsity (e.g., a '1' to indicate a non-zero value and a '0' to indicate a zero value), the internal activation sparsity generation circuitry 220 and/or the internal weight sparsity generation circuitry 228 may calculate and/or otherwise generate bit masks to follow a fixed or repeating pattern (e.g., fixed or repeating data pattern). For example, the internal activation sparsity generation circuitry 220 and/or the internal weight sparsity generation circuitry 228 may generate the bit masks (e.g., the activation sparsity bit mask, the weight sparsity bit mask, etc.) internally and/or otherwise within the accelerator 200 rather than retrieving the bit masks from hardware external to the accelerator 200. In some such examples, the internal activation sparsity generation circuitry 220 and/or the internal weight sparsity generation circuitry 228 may include driving hardware logic to produce, generate, and/or otherwise output data patterns, such as walking ones (1s) or repeating patterns of x 1s followed by y 0s. For example, a walking 1s pattern may be implemented by a first bit mask vector having a size of 1 byte of "00000001," a second bit mask vector having a size of 1 byte of "00000010," etc., where the "1" of each subsequent vector is left-shifted into an adjacent bit position of the previous bit position.

In some examples, the bit mask vectors (e.g., the activation sparsity bit mask vectors, the weight sparsity bit mask vectors, etc.) may use 1 bit of control to represent 1 byte (or 8 bits) of data. In some such examples, there is a minimum overhead of 12.5% (e.g., 0.125=1 bit of control/8 bits of data) for the accelerator 200 to read in the control information along with the data. Advantageously, by generating the bit mask vectors internally with the internal activation sparsity generation circuitry 220 and/or the internal weight sparsity generation circuitry 228, the accelerator 200 may remove the above-referenced overhead. In some examples, the removal of the overhead is beneficial when processing bandwidth limited layers such as depthwise convolution as the reduction of the overhead may reduce the number of reads to process the layer.

In the illustrated example of FIG. 2, the accelerator 200 includes the first multiplexer 230 to multiplex, select, and/or otherwise provide activation sparsity data from either the external activation sparsity buffer 218 or the internal activation sparsity generation circuitry 220. For example, the configuration circuitry 214 may instruct the first multiplexer 230 to select first activation sparsity data from the external activation sparsity buffer 218 based on the configuration data, which may indicate a type of convolution operation to be executed by the accelerator 200. In some such examples, the configuration circuitry 214 may instruct the first multiplexer 230 to select second activation sparsity data from the internal activation sparsity generation circuitry 220 based on the configuration data, which may indicate a type of convolution operation to be executed by the accelerator 200. In response to the instruction from the configuration circuitry 214, the first multiplexer 230 may provide the first activation sparsity data or the second activation sparsity data to the combined sparsity controller 234.

In the illustrated example of FIG. 2, the accelerator 200 includes the second multiplexer 232 to multiplex, select, and/or otherwise provide weight sparsity data from either the external weight sparsity buffer 226 or the internal weight sparsity generation circuitry 228. For example, the configuration circuitry 214 may instruct the second multiplexer 232 to select first weight sparsity data from the external weight sparsity buffer 226 based on the configuration data, which may indicate a type of convolution operation to be executed by the accelerator 200. In some such examples, the configuration circuitry 214 may instruct the second multiplexer 232 to select second weight sparsity data from the internal weight sparsity generation circuitry 228 based on the configuration data, which may indicate a type of convolution operation to be executed by the accelerator 200. For example, the configuration circuitry 214 may determine an accelerator mode based on the type of acceleration operation to be executed by the accelerator 200. In some such examples, the configuration circuitry 214 may determine the acceleration mode to be a 2-D convolution mode, a depthwise convolution mode, an elementwise addition mode, a grouped convolution mode, a dilated convolution mode, a custom mode (e.g., a mode in which the accelerator 200 is to execute a custom operation), etc., based on the configuration data. In response to the instruction from the configuration circuitry 214, the second multiplexer 232 may provide the first weight sparsity data or the second weight sparsity data to the combined sparsity controller 234. In some examples, the first multiplexer 230 and/or the second multiplexer 232 may implement multiplexer circuitry, multiplexer logic circuitry, etc.

In the illustrated example of FIG. 2, the accelerator 200 includes the combined sparsity controller 234 to provide and/or otherwise transfer non-sparse data from at least one of the activation data buffer 216 or the weight data buffer 222 to the MACs 236. For example, the combined sparsity controller 234 may implement control circuitry, control logic circuitry, controller circuitry, controller logic circuitry, etc. In some examples, the combined sparsity controller 234 determines that the presence of zeros in activation or weight data is indicative of when to skip certain computations when performing an acceleration operation, such as a convolution. For example, the combined sparsity controller 234 may determine that a sparsity bit mask vector is indicative of a "compute" bit mask vector where each bit may denote whether an element should be computed or non-computed (e.g., skipped). In some such examples, the combined sparsity controller 234 may determine that a '1' in a bit mask indicates that an element should be part of a computation operation and a '0' in a bit mask indicates that an element should not be part of a computation operation. In some such examples, the computation operation may be a standard or conventional convolution operation (e.g., a 2-D convolution operation), a non-standard or non-conventional convolution operation (e.g., a depthwise convolution operation, a grouped convolution operation, etc.), or a non-convolution operation (e.g., an elementwise addition operation).

In some examples, the combined sparsity controller 234 identifies the non-sparse data to be transferred based on a sparsity map. For example, the combined sparsity controller 234 may identify non-sparse activation data based on the sparse activation vector obtained from the first multiplexer 230. In some such examples, the combined sparsity controller 234 may map a '1' in the sparse activation vector to a non-sparse activation value stored in the activation data buffer 216. In some such examples, the activation data buffer 216 transfers the identified non-sparse activation value to one of the MACs 236.

In some examples, the combined sparsity controller 234 may identify non-sparse weight data based on the sparse weight vector obtained from the second multiplexer 232. In some such examples, the combined sparsity controller 234 may map a '1' in the sparse weight vector to a non-sparse weight value stored in the weight data buffer 222. In some such examples, the weight data buffer 222 transfers the identified non-sparse weight value to one of the MACs 236. In some examples, the weight data buffer 222 may invoke the internal weight generation circuitry 224 to generate the non-sparse weight value, which may be transferred to the one of the MACs 236.

In some examples, the combined sparsity controller 234 obtains sparsity data from at least one of the first multiplexer 230 or the second multiplexer 232. For example, the sparsity data may include activation sparsity data from the first multiplexer 230 and/or weight sparsity data from the second multiplexer 232. In some examples, the combined sparsity controller 234 may generate a combined sparsity bit mask based on the activation sparsity data and the weight sparsity data. In some such examples, the combined sparsity controller 234 may instruct the activation data buffer 216 to provide activation data to the MACs 236 based on the combined sparsity bit mask. In some examples, the combined sparsity controller 234 may instruct the weight data buffer 222 to provide weight data to the MACs 236 based on the combined sparsity bit mask. In some such examples, in response to a determination that the internal weight generation circuitry 224 is to generate weight data, the combined sparsity controller 234 may instruct the weight data buffer 222 to provide the internally generated weight data to the MACs 236 based on the combined sparsity bit mask.

In the illustrated example of FIG. 2, the accelerator 200 includes the MACs 236 to execute and/or otherwise implement a multiply-accumulate operation. For example, a first one of the MACs 236 may determine the product of two numbers and add that product to an accumulator. In some examples, the MACs 236 may implement accelerator or acceleration logic (e.g., accelerator or acceleration circuitry, accelerator or acceleration logic circuitry, etc.), compute or computation logic (e.g., compute or computation circuitry, compute or computation logic circuitry, etc.), etc. In this example, the MACs 236 are implemented as a 4×4 array of the MACs 236. Alternatively, the accelerator 200 may implement the MACs 236 in a different manner. For example, the accelerator 200 may implement the MACs 236 as one or more 8×8 arrays, one or more 16×16 arrays, etc., or any other quantity and/or type of array configuration(s). In this example, the MACs 236 may follow a common interconnection where activations may be shared and distributed across rows of the array and weights may be shared and distributed along columns of the array. In some examples, each of the MACs 236 may have an associated accumulator storage that may allow partial and/or final accumulations to be saved and thereby enable the MACs 236 to work on multiple output points per workload. In some such examples, in response to completing a workload (e.g., a convolution workload, an acceleration or accelerator workload, etc.), the final accumulated values may be drained and/or otherwise output from the accumulator storage 238 to external hardware via the output activation interface 212 for final post-processing. In some examples, the final post-processing may include adding a bias and/or applying a non-linear activation function before writing the post-processed values to memory (e.g., an external memory). For example, the accumulator storage 238 may provide the final accumulated values to the memory via the output activation interface 212. In some examples, the accumulator storage 238 may output the final accumulated values as corresponding to a layer of a NN. In some such examples, in response to completing the workload for the layer, which may be indicated by the output from the accumulator storage 238, the accelerator 200 may process another layer of the NN until the entire NN is complete.

Advantageously, the accelerator 200 of FIG. 2 may utilize sparsity (e.g., activation sparsity and/or weight sparsity) for faster processing and/or reduced power consumption. For example, the accelerator 200 may combine activation and weight sparsity to remove and/or skip redundant computation to achieve faster and/or otherwise improved processing of layers of a machine-learning model (e.g., a machine-learning network), reduce power consumption, and/or provide sparse acceleration. Advantageously, the accelerator 200 may reduce the cost of data movement (e.g., a bandwidth penalty) and/or reduce the bandwidth requirement for reading in activations and/or weights by removing activations and/or weights that have a value of zero to improve memory storage density (e.g., increased storage of non-zero data values compared to zero data values). Advantageously, in some examples, the accelerator 200 may increase and/or otherwise improve bandwidth by internally generating data (e.g., activation sparsity data, weight data, weight sparsity data, etc.) rather than retrieving the data from an external source.

In some examples, the internal activation sparsity generation circuitry 220 and/or the internal weight sparsity generation circuitry 228 may implement example means for generating sparsity data based on an acceleration operation. For example, the means for generating may be implemented by executable instructions such as that implemented by at least blocks 1404, 1408, 1412 of FIG. 14, blocks 1510, 1512, 1516 of FIG. 15, blocks 1608, 1612, 1616, 1620, and/or block 1714 of FIG. 17. In some examples, the executable instructions of blocks 1404, 1408, 1412 of FIG. 14, blocks 1510, 1512, 1516 of FIG. 15, blocks 1608, 1612, 1616, 1620, and/or block 1714 of FIG. 17 may be executed on at least one processor such as the example processor circuitry 1812 of FIG. 18. In other examples, the means for generating is implemented by hardware logic, hardware implemented state machines, logic circuitry, and/or any other combination of hardware, software, and/or firmware. For example, the means for generating may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which sparsity data includes a sparse weight vector, the means for generating is to generate a sparsity bit mask based on a sparse activation vector and the sparse weight vector in response to obtaining the sparse activation vector. In some examples in which the sparsity data includes a sparse weight vector, and the acceleration operation is a depthwise convolution operation, the means for generating is to identify a data pattern based on the depthwise convolution operation, and generate the sparse weight vector based on the data pattern.

In some examples in which the sparsity data includes a sparse weight vector, and the acceleration operation is a grouped convolution operation, the means for generating is to identify a data pattern based on the grouped convolution operation, the data pattern including a set of logic ones, and generate the sparse weight vector based on the data pattern.

In some examples in which the acceleration operation is an elementwise addition operation, the means for generating is to identify a data pattern based on the elementwise addition operation, the data pattern based on a walking ones data pattern, and generate a plurality of sparse weight vectors based on the data pattern.

In some examples in which the sparsity data includes one or more sparse weight vectors, and the acceleration operation is a dilated convolution, the means for generating is to identify a data pattern based on the dilated convolution, the data pattern based on a sparse kernel, and generate the one or more sparse weight vectors based on the data pattern.

In some examples, the combined sparsity controller 234 may implement example means for instructing one or more data buffers to provide at least one of activation data or weight data based on sparsity data. For example, the means for instructing may be implemented by executable instructions such as that implemented by at least blocks 1412, 1416 of FIG. 14, blocks 1516, 1518 of FIG. 15, and/or block 1622 of FIG. 16. In some examples, the executable instructions of blocks 1412, 1416 of FIG. 14, blocks 1516, 1518 of FIG. 15, and/or block 1622 of FIG. 16 may be executed on at least one processor such as the example processor circuitry 1812 of FIG. 18.

In other examples, the means for instructing is implemented by hardware logic, hardware implemented state machines, logic circuitry, and/or any other combination of hardware, software, and/or firmware. For example, the means for instructing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which the sparsity data includes at least one of activation sparsity data or weight sparsity data, and the one or more data buffers include a weight data buffer and an activation data buffer, the means for instructing is to generate a combined sparsity bit mask based on the activation sparsity data and the weight sparsity data, instruct the activation data buffer to provide activation data to the means for executing based on the combined sparsity bit mask, and, in response to determining to generate weight data, instruct the weight data buffer to provide the generated weight data to the means for executing based on the combined sparsity bit mask.

In some examples in which the sparsity data includes a sparse weight vector, and the acceleration operation is a depthwise convolution operation, the means for instructing is to generate a sparsity bit mask based on the sparse weight vector. In some examples in which the sparsity data includes a sparse weight vector, and the acceleration operation is a grouped convolution operation, the means for instructing is to generate a sparsity bit mask based on the sparse weight vector. In some examples in which the sparsity data includes one or more sparse weight vectors, and the acceleration operation is a dilated convolution operation, the means for instructing is to generate one or more sparsity bit masks based on the one or more sparse weight vectors.

In some examples, the MACs 236 may implement example means for executing an acceleration operation based on at least one of activation data or weight data. For example, the means for instructing may be implemented by executable instructions such as that implemented by at least block 1416 of FIG. 15, block 1518 of FIG. 15, and/or block 1622 of FIG. 16. In some examples, the executable instructions of block 1416 of FIG. 15, block 1518 of FIG. 15, and/or block 1622 of FIG. 16 may be executed on at least one processor such as the example processor circuitry 1812 of FIG. 18. In other examples, the means for executing is implemented by hardware logic, hardware implemented state machines, logic circuitry, and/or any other combination of hardware, software, and/or firmware. For example, the means for executing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which the acceleration operation is an elementwise addition operation, the means for executing is to store first data values associated with a first tensor based on the plurality of the sparse weight vectors and a first set of the activation data, store second data values associated with a second tensor based on the plurality of the sparse weight vectors and a second set of the activation data, and generate output data values based on a sum of the first data values and the second data values.

In some examples in which sparsity data includes a sparse weight vector, the configuration circuitry 214 may implement example means for identifying an acceleration operation based on configuration information, and the sparse weight vector may be generated based on the configuration information. For example, the means for identifying may be implemented by executable instructions such as that implemented by at least blocks 1402, 1404, 1408, 1412, 1420 of FIG. 14, blocks 1502, 1504, 1510, 1516, 1522 of FIG. 15, and/or blocks 1602, 1606, 1608, 1610, 1612, 1614, 1616, 1618, 1620, 1624 of FIG. 16. In some examples, the executable instructions of blocks 1402, 1404, 1408, 1412, 1420 of FIG. 14, blocks 1502, 1504, 1510, 1516, 1522 of FIG. 15, and/or blocks 1602, 1606, 1608, 1610, 1612, 1614, 1616, 1618, 1620, 1624 of FIG. 16 may be executed on at least one processor such as the example processor circuitry 1812 of FIG. 18. In other examples, the means for identifying is implemented by hardware logic, hardware implemented state machines, logic circuitry, and/or any other combination of hardware, software, and/or firmware. For example, the means for identifying may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

While an example manner of implementing the first example acceleration circuitry 108 and/or the second example acceleration circuitry 110 of FIG. 1 is illustrated in FIG. 2, one or more of the elements, processes and/or devices illustrated in FIG. 2 may be combined, divided, re-arranged, omitted, eliminated and/or implemented in any other way. Further, the example configuration interface 202, the example activation data interface 204, the example activation sparsity data interface 206, the example weight data interface 208, the example weight sparsity data interface 210, the example output activation interface 212, the example configuration circuitry 214, the example activation data buffer 216, the example external activation sparsity buffer 218, the example internal activation sparsity generation circuitry 220, the example weight data buffer 222, the example internal weight generation circuitry 224, the example external weight sparsity buffer 226, the example internal weight sparsity generation circuitry 228, the first example multiplexer 230, the second example multiplexer 232, the example combined sparsity controller 234, the example MACs 236, the example accumulator storage 238, and/or, more generally, the first example acceleration circuitry 108 and/or the second example acceleration circuitry 110 of FIG. 1 may be implemented by hardware, software, firmware, and/or any combination of hardware, software and/or firmware. Thus, for example, any of the example configuration interface 202, the example activation data interface 204, the example activation sparsity data interface 206, the example weight data interface 208, the example weight sparsity data interface 210, the example output activation interface 212, the example configuration circuitry 214, the example activation data buffer 216, the example external activation sparsity buffer 218, the example internal activation sparsity generation circuitry 220, the example weight data buffer 222, the example internal weight generation circuitry 224, the example external weight sparsity buffer 226, the example internal weight sparsity generation circuitry 228, the first example multiplexer 230, the second example multiplexer 232, the example combined sparsity controller 234, the example MACs 236, the example accumulator storage 238, and/or, more generally, the first example acceleration circuitry 108 and/or the second example acceleration circuitry 110 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example configuration interface 202, the example activation data interface 204, the example activation sparsity data interface 206, the example weight data interface 208, the example weight sparsity data interface 210, the example output activation interface 212, the example configuration circuitry 214, the example activation data buffer 216, the example external activation sparsity buffer 218, the example internal activation sparsity generation circuitry 220, the example weight data buffer 222, the example internal weight generation circuitry 224, the example external weight sparsity buffer 226, the example internal weight sparsity generation circuitry 228, the first example multiplexer 230, the second example multiplexer 232, the example combined sparsity controller 234, the example MACs 236, and/or the example accumulator storage 238 is/are hereby expressly defined to include a non-transitory computer readable storage device or storage disk such as a memory, a DVD, a CD, a Blu-ray disk, etc., including the software and/or firmware. Further still, the first example acceleration circuitry 108 and/or the second acceleration circuitry 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
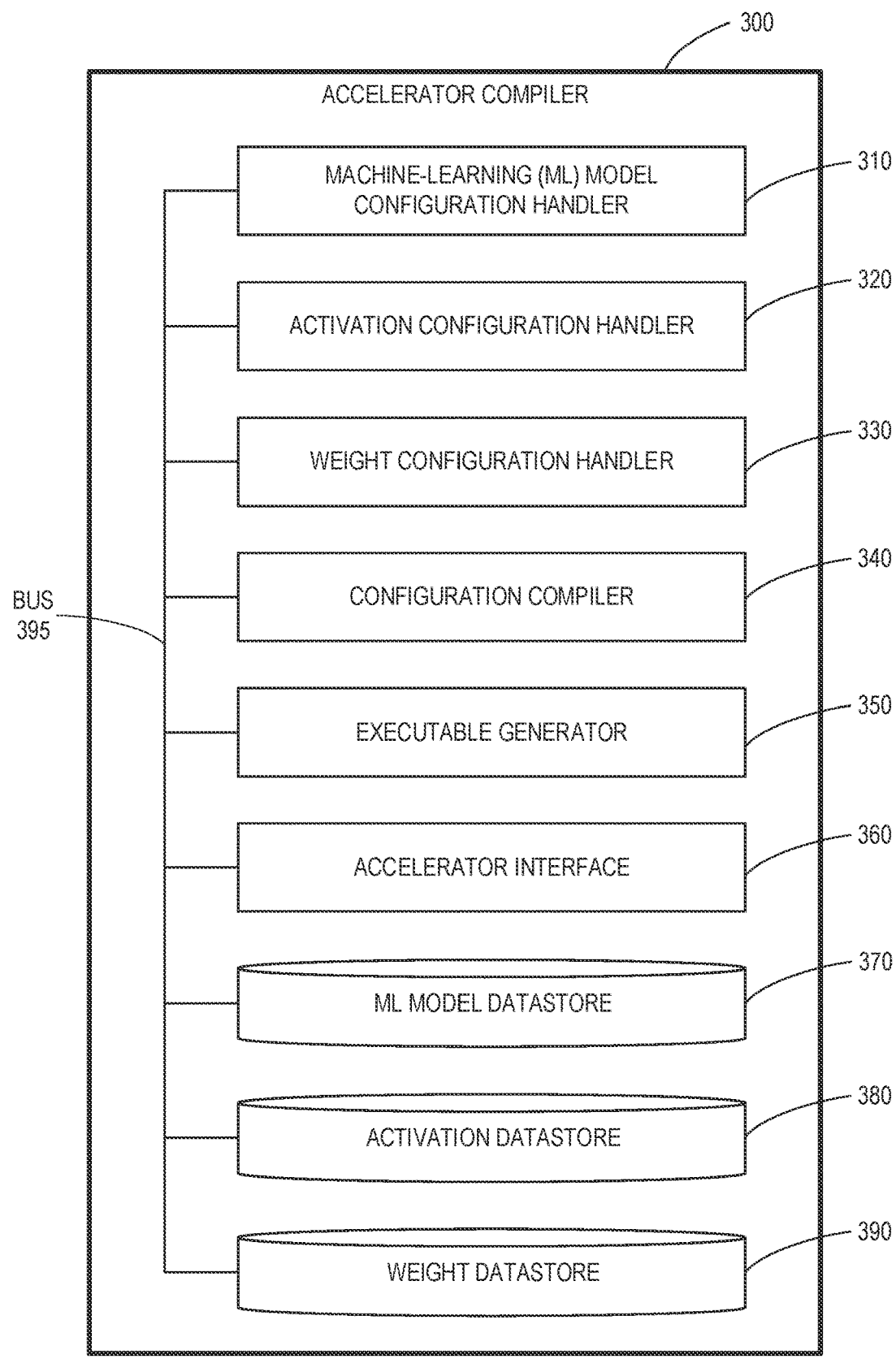
FIG. 3 is a block diagram of an example implementation of the example accelerator compiler of FIG. 1.

FIG. 3 is a block diagram of an example accelerator compiler 300. In some examples, the accelerator compiler 300 of FIG. 3 may implement one or more of the accelerator compiler 104A-C of FIG. 1. The accelerator compiler 300 may configure a hardware accelerator, such as the first acceleration circuitry 108 of FIG. 1, the second acceleration circuitry 110 of FIG. 1, and/or the accelerator 200 of FIG. 2 based on an accelerator mode. For example, the accelerator compiler 300 may configure the accelerator 200 of FIG. 2 based on the accelerator 200 to execute a 2-D convolution operation, an element-wise addition operation, etc.

The accelerator compiler 300 of the illustrated example includes an example machine-learning (ML) model configuration handler 310, an example activation configuration handler 320, an example weight configuration handler 330, an example configuration compiler 340, an example executable generator 350, an example accelerator interface 360, an example machine-learning (ML) model datastore 370, an example activation datastore 380, an example weight datastore 390, and an example bus 395. In this example, the ML model configuration handler 310, the activation configuration handler 320, the weight configuration handler 330, the configuration compiler 340, the executable generator 350, the accelerator interface 360, the ML model datastore 370, the activation datastore 380, and the weight datastore 390 are in communication with one (s0 of each other via the bus 395. For example, the bus 395 may be implemented by at least one of an I2C bus, a SPI bus, a PCI bus, or a PCIe bus. Additionally or alternatively, the bus 395 may be implemented by any other type of computing or electrical bus.

In the illustrated example of FIG. 3, the accelerator compiler 300 includes the ML model configuration handler 310 to configure an accelerator, such as the first acceleration circuitry 108 of FIG. 1, the second accelerator circuitry 110 of FIG. 1, and/or the accelerator 200 of FIG. 2, based on an acceleration operation to be executed by the accelerator, and/or an acceleration mode of the accelerator. In some examples, the ML model configuration handler 310 determines the acceleration mode based on the acceleration operation to be executed by the accelerator. For example, the ML model configuration handler 310 may determine that the accelerator is to execute a depthwise convolution operation based on a type of NN to be executed by the accelerator. In some such examples, the type of NN may indicate that the depthwise convolution operation is to be executed. In some such examples, the ML model configuration handler 310 may determine the acceleration mode to be a depthwise convolution mode based on the depthwise convolution operation to be executed by the accelerator.

In the illustrated example of FIG. 3, the accelerator compiler 300 includes the activation configuration handler 320 to identify activation data and/or activation sparsity data to be utilized by the accelerator. In some examples, the activation configuration handler 320 may identify activation data to be provided to the activation data buffer 216 and/or activation sparsity data to be provided to the external activation sparsity buffer 218. In some examples, the activation configuration handler 320 may determine that the accelerator 200 is to generate the activation sparsity data based on the acceleration mode. In some such examples, the activation configuration handler 320 may identify a value of one or more configuration registers (e.g., configuration control registers, etc.) that may be utilized to instruct the internal activation sparsity generation circuitry 220 to generate activation sparsity data based on a data pattern.

In the illustrated example of FIG. 3, the accelerator compiler 300 includes the weight configuration handler 330 to identify weight data and/or weight sparsity data to be utilized by the accelerator. In some examples, the weight configuration handler 330 may identify weight data to be provided to the weight data buffer 222 and/or weight sparsity data to be provided to the external weight sparsity buffer 226.

In some examples, the weight configuration handler 330 may determine that the accelerator 200 is to generate the weight data and/or the weight sparsity data based on the acceleration mode. In some such examples, the weight configuration handler 330 may identify a value of one or more configuration registers (e.g., configuration control registers, etc.) that may be utilized to instruct the internal weight sparsity generation circuitry 228 to generate weight sparsity data based on a first data pattern, the internal weight generation circuitry 224 to generate weight data based on a second data pattern, etc., and/or a combination thereof.

In the illustrated example of FIG. 3, the accelerator compiler 300 includes the configuration compiler 340 to compile an ML, network, etc., based on configuration data. In some examples, the configuration compiler 340 may compile the ML model, the network, etc., based on the configuration data 122 of FIG. 1, which may include values of one or more configuration registers, which may be utilized by the accelerator 200 to internally generate weight data, weight sparsity data, and/or activation sparsity data within the accelerator 200.

In the illustrated example of FIG. 3, the accelerator compiler 300 includes the executable generator 350 to generate an executable construct of the ML model, the network, etc., based on the compilation of the configurations by the configuration compiler 340. In some examples, the executable generator 350 may generate the executable construct to be executed by the accelerator to output accumulation values from the accumulator storage 238 based on ML inputs to at least one of the activation data interface 204, the activation sparsity data interface 206, the weight data interface 208, or the weight sparsity data interface 210. In some examples, the executable generator 350 may generate the executable construct as the ML model(s) 124 of FIG. 1.

In the illustrated example of FIG. 3, the accelerator compiler 300 includes the accelerator interface 360 to interface with an accelerator. In some examples, the accelerator interface 360 may provide the configuration data 122 to the configuration interface 202. In some examples, the accelerator interface 360 may provide activation data to the activation data interface 204. In some examples, the accelerator interface 360 may provide weight data to the weight data interface 208. In some examples, the accelerator interface 360 may provide weight sparsity data to the weight sparsity data interface 210. In some examples, the accelerator interface 360 may obtain accumulator data (e.g., accumulator values from the MACs 236 of FIG. 2) from the output activation interface 212.

In the illustrated example of FIG. 3, the accelerator compiler 300 includes the ML model datastore 370 to store one or more ML models, such as the ML model(s) 124 of FIG. 1. In some examples, the ML model datastore 370 may implement the ML model(s) 124, and/or, more generally, the datastore 120 of FIG. 1. In the illustrated example of FIG. 3, the accelerator compiler 300 includes the activation datastore 380 to record data, such as activation data, activation sparsity data, etc. In the illustrated example of FIG. 3, the accelerator compiler 300 includes the weight datastore 390 to record data, such as weight data, weight activation data, etc.

The ML model datastore 370, the activation datastore 380, and/or the weight datastore 390 of this example may be implemented by a volatile memory and/or a non-volatile memory. The ML model datastore 370, the activation datastore 380, and/or the weight datastore 390 may additionally or alternatively be implemented by one or more DDR memories. The ML model datastore 370, the activation datastore 380, and/or the weight datastore 390 may additionally or alternatively be implemented by one or more mass storage devices. While in the illustrated example the ML model datastore 370, the activation datastore 380, and the weight datastore 390 are each illustrated as single datastores, the ML model datastore 370, the activation datastore 380, and/or the weight datastore 390 may be implemented by any number and/or type(s) of datastores. Furthermore, the data stored in the ML model datastore 370, the activation datastore 380, and/or the weight datastore 390 may be in any data format such as, for example, binary data, comma delimited data, tab delimited data, SQL structures, an executable, etc.

While an example manner of implementing the accelerator compiler 104A-C of FIG. 1 is illustrated in FIG. 3, one or more of the elements, processes and/or devices illustrated in FIG. 3 may be combined, divided, re-arranged, omitted, eliminated and/or implemented in any other way. Further, the example ML model configuration handler 310, the example activation configuration handler 320, the example weight configuration handler 330, the example configuration compiler 340, the example executable generator 350, the example accelerator interface 360, the example ML model datastore 370, the example activation datastore 380, the example weight datastore 390, the example bus 395, and/or, more generally, the example accelerator compiler 104A-C of FIG. 1 may be implemented by hardware, software, firmware and/or any combination of hardware, software and/or firmware. Thus, for example, any of the example ML model configuration handler 310, the example activation configuration handler 320, the example weight configuration handler 330, the example configuration compiler 340, the example executable generator 350, the example accelerator interface 360, the example ML model datastore 370, the example activation datastore 380, the example weight datastore 390, the example bus 395, and/or, more generally, the example accelerator compiler 104A-C of FIG. 1 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example ML model configuration handler 310, the example activation configuration handler 320, the example weight configuration handler 330, the example configuration compiler 340, the example executable generator 350, the example accelerator interface 360, the example ML model datastore 370, the example activation datastore 380, the example weight datastore 390, and/or the example bus 395 is/are hereby expressly defined to include a non-transitory computer readable storage device or storage disk such as a memory, a DVD, a CD, a Blu-ray disk, etc., including the software and/or firmware. Further still, the example accelerator compiler 104A-C of FIG. 1 may include one or more elements, processes and/or devices in addition to, or instead of, those illustrated in FIG. 2, and/or may include more than one of any or all of the illustrated elements, processes and devices.

Figure 4:
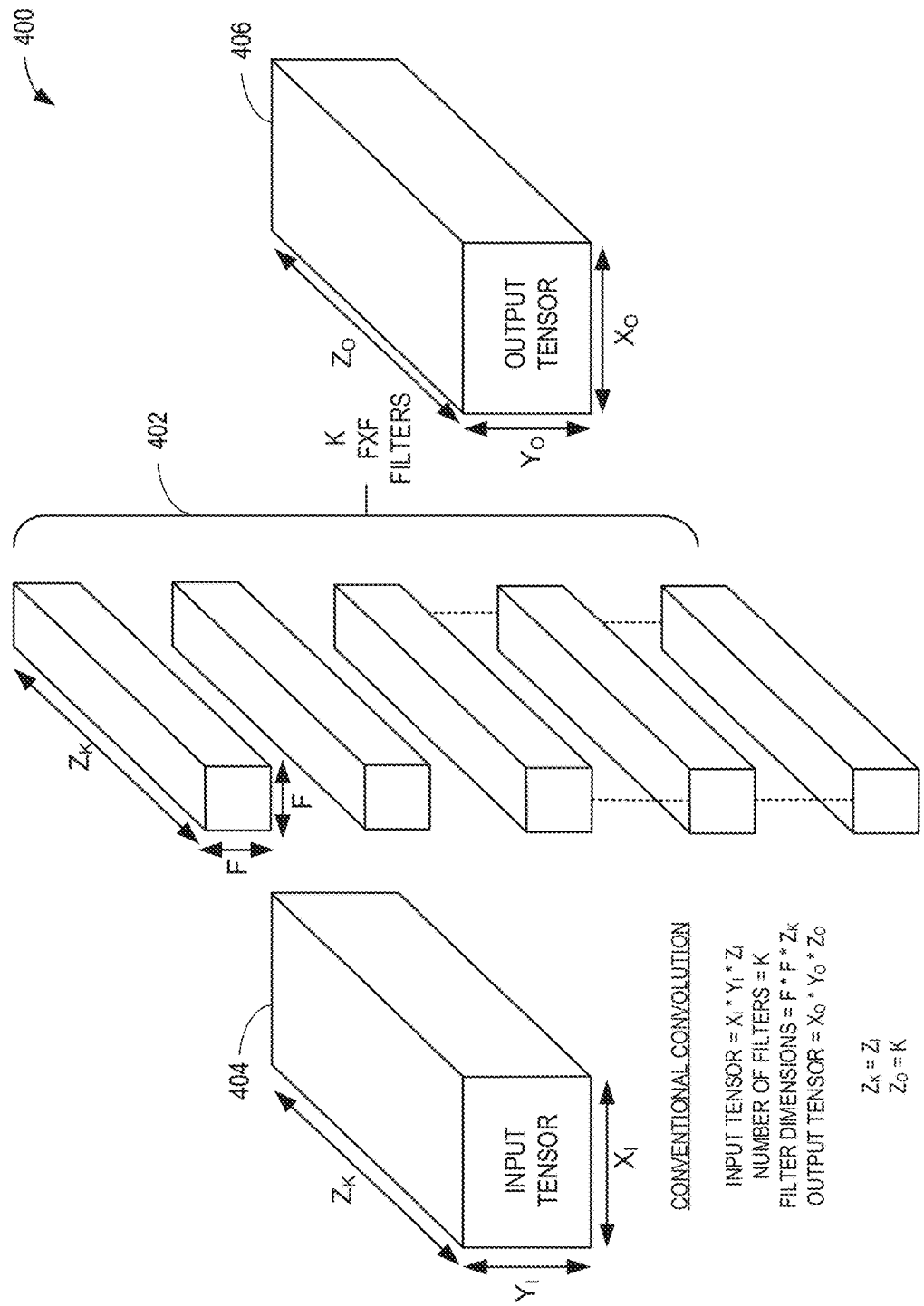
FIG. 4 is an illustration of an example conventional convolution operation that may be executed by the example acceleration circuitry of FIGS. 1 and/or 2.

FIG. 4 is an illustration of an example conventional convolution operation 400 that may be executed by the first acceleration circuitry 108 of FIG. 1, the second acceleration circuitry 110 of FIG. 1, and/or the accelerator 200 of FIG. 2. In some examples, the conventional convolution operation 400 may implement a spatial convolution over one or more images (e.g., a picture, a still frame of a video, etc.). In some examples, the accelerator 200 may be configured to operate in a conventional convolution mode, a 2-D convolution mode, a three-dimensional (3-D) convolution mode, etc., based on the conventional convolution operation to be executed by the accelerator 200.

The conventional convolution operation 400 includes applying example filters 402 to an example input tensor 404 to generate an example output tensor 406. In this example, the input tensor 404 is a 3-D object having a size of $x_i * y_i * z_i$. In this example, there are K of the filters 402 and each of the filters 402 have a size of $f*f*z_k$. Alternatively, any other size may be used to implement one(s) of the filters 402. For example, one or more of the filters 402 may have a size of $f_x*f_y*z_k$ where x and y may be different and thereby $f_x$ and $f_y$ may be different. In this example, the filters 402 are square filters and thereby $f_x$ is equal to $f_y$ but examples described herein are not so limited. In this example, the output tensor 406 has a size of $x_o*y_o*z_o$. In this example, $z_k=z_i$ and $z_o=K$. In this example, the filters 402 along with a non-linear activation function are applied to the input tensor 404 to produce the output tensor 406. For example, the accelerator 200 of FIG. 2 may obtain the input tensor 404 as the activation data, obtain one of the filters 402 as the weight data, and output the output tensor 406 from the accumulator storage 238 of FIG. 2. In some such examples, the accelerator 200 may implement the conventional convolution operation 400 in a "dense" manner while, in other examples, the accelerator 200 may implement the conventional convolution operation 400 utilizing sparsity.

Advantageously, the accelerator 200 may execute the convolution oepration 400 based on sparse data to reduce the number of computations. For example, the accelerator 200 may obtain and/or generate activation sparsity data and/or weight sparsity data to output the output tensor 406 by invoking sparsity techniques.

Figure 5:
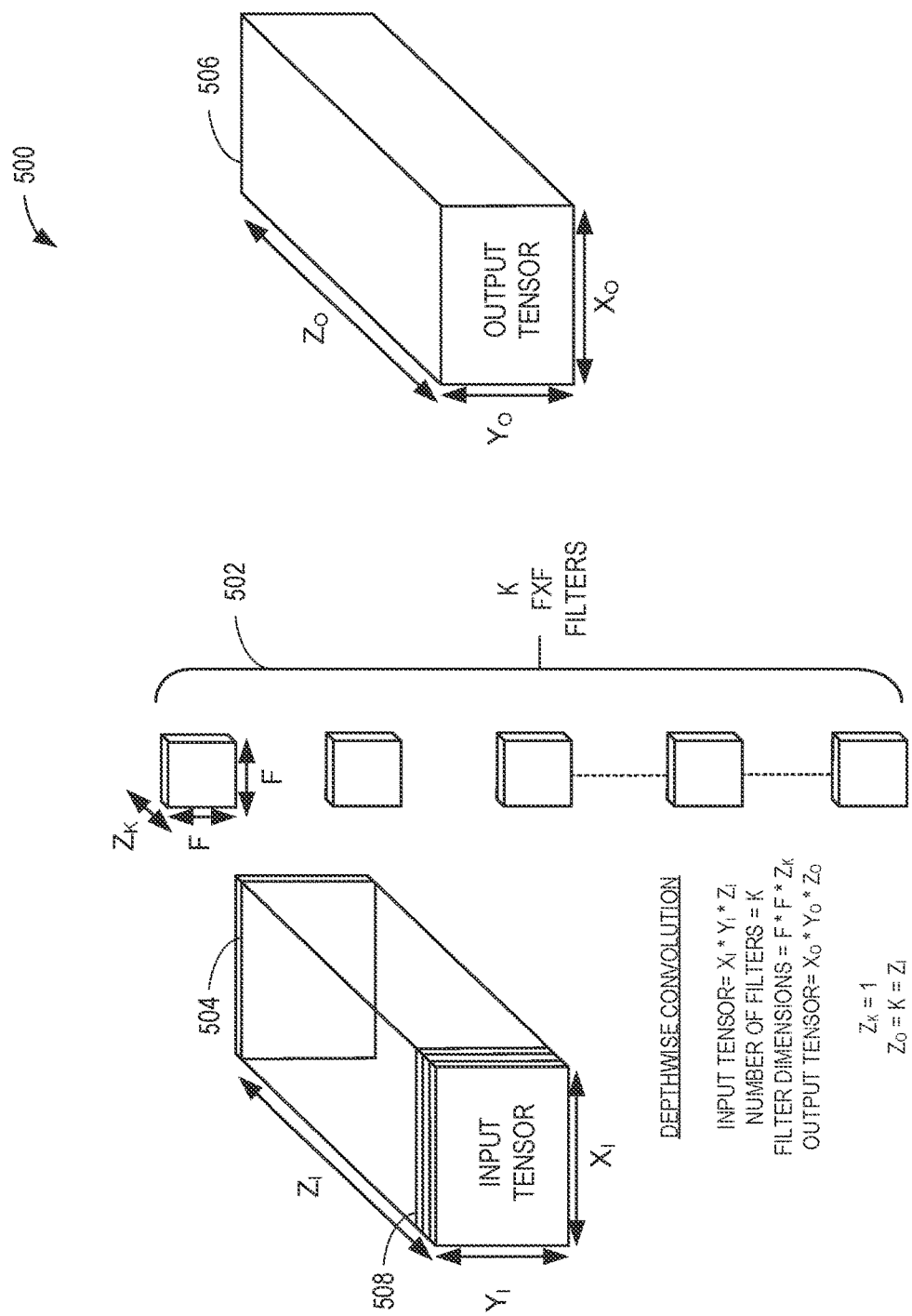
FIG. 5 is an illustration of an example depthwise convolution operation that may be executed by the example acceleration circuitry of FIGS. 1 and/or 2.

FIG. 5 is an illustration of an example depthwise convolution operation 500 that may be executed by the first acceleration circuitry 108 of FIG. 1, the second acceleration circuitry 110 of FIG. 1, and/or the accelerator 200 of FIG. 2. The depthwise convolution operation 500 includes applying example filters 502 to an example input tensor 504 to generate an example output tensor 506.

The illustrated example of FIG. 5 is an example of utilizing bit mask vectors (e.g., sparsity bit mask vectors) to isolate a single channel at a time. For example, the configuration circuitry 214 may determine to invoke the accelerator 200 to execute the depthwise convolution operation 500 of FIG. 5 based on the configuration data 122 of FIG. 1. In some such examples, the configuration circuitry 214 may instruct the internal weight sparsity generation circuitry 228 to generate the weight sparsity bit masks for the depthwise convolution operation 500 based on the configuration register settings, which may be based on the configuration data 122. In some such examples, the internal weight sparsity generation circuitry 228 may generate the weight sparsity bit masks based on a data pattern, such as a walking is pattern. For example, the internal weight sparsity generation circuitry 228 may generate the filters 502 based on a walking is pattern that, when utilized, causes the filters 502 to generate a result (e.g., the output tensor 506) that may be equivalent to a depthwise filter, which may allow the accelerator 200 to execute sparse conventional convolutions to implement depthwise convolution.

The depthwise convolution operation 500 may be implemented as a spatial convolution performed independently over every example input channel 508 within the input tensor 504. The depthwise convolution operation 500 of the illustrated example may be based on a determination that a depthwise convolution may be executed on a sparse neural network accelerator, such as the accelerator 200, by configuring the accelerator 200 in the depthwise convolution mode. For example, by considering the filters 502 as sparse filters with only a single non-sparse bit, the depthwise convolution operation 500 may be implemented using the accelerator 200, which is depicted in the illustrated example of FIG. 6.

Figure 6:
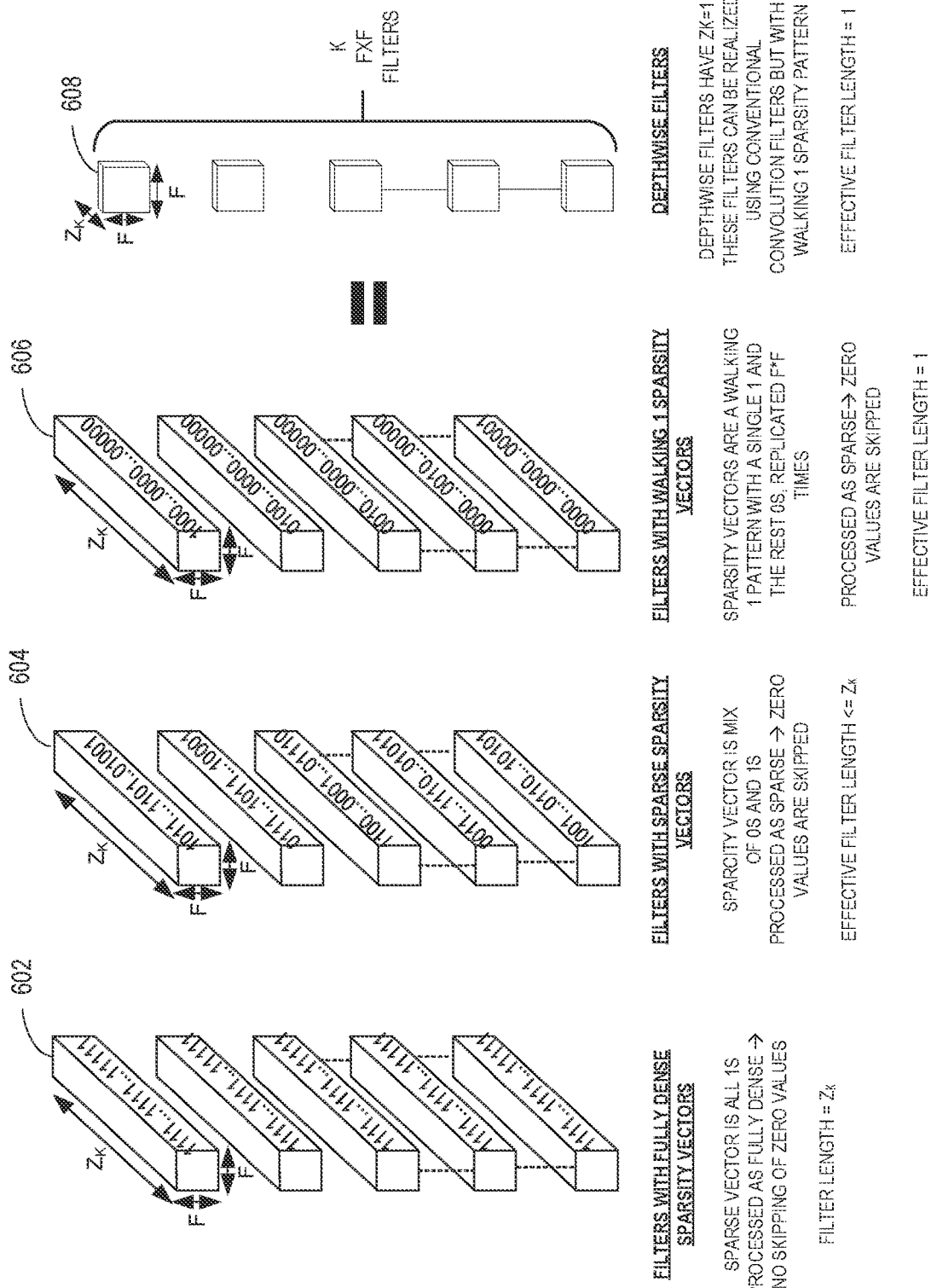
FIG. 6 is an illustration of example sparsity bit mask vectors that may be implemented by the example acceleration circuitry of FIGS. 1 and/or 2.

FIG. 6 is an illustration of example sparsity bit mask vectors 602, 604, 606, 608 associated with a convolution filter. In this example, the sparsity bit mask vectors 602, 604, 606, 608 may be implemented by the first acceleration circuitry 108 of FIG. 1, the second acceleration circuitry 110 of FIG. 1, and/or the accelerator 200 of FIG. 2. The sparsity bit mask vectors 602, 604, 606, 608 include first example sparsity bit mask vectors 602, second example sparsity bit mask vectors 604, third example sparsity bit mask vectors 606, and fourth example sparsity bit mask vectors 608. For example, the first sparsity bit mask vectors 602, the second sparsity bit mask vectors 604, the third sparsity bit mask vectors 606, or the fourth sparsity bit mask vectors 608 may implement the filters 402 of FIG. 4 and/or the filters 502 of FIG. 5. In some such examples, the internal weight sparsity generation circuitry 228 of FIG. 2 may generate the first sparsity bit mask vectors 602, the second sparsity bit mask vectors 604, the third sparsity bit mask vectors 606, and/or the fourth sparsity bit mask vectors 608. In some such examples, the internal weight sparsity generation circuitry 228 of FIG. 2 may generate the first sparsity bit mask vectors 602, the second sparsity bit mask vectors 604, the third sparsity bit mask vectors 606, and/or the fourth sparsity bit mask vectors 608 based on the configuration data 122, a data pattern, etc.

The first sparsity bit mask vectors 602 may implement fully dense sparsity vectors that have a filter length of $z_K$. The second sparsity bit mask vectors 604 may implement sparse sparsity vectors, which may include a combination of 1s and 0s due to the presence of the sparsity. In this example, the second sparsity bit mask vectors 604 have an effective filter length less than $z_K$.

The third sparsity bit mask vectors 606 of the illustrated example may implement walking 1s sparsity vectors that have an effective filter length of 1. For example, the third sparsity bit mask vectors 606 may be generated based on a data pattern, such as the walking ones data pattern (e.g., walking 1s data pattern). The fourth sparsity bit mask vectors 608 may implement sparsity bit mask vectors associated with depthwise filters that have an effective filter depth $z_K$ of 1. In some such examples, the walking 1s data pattern of third sparsity bit mask vectors 606 may be considered a subset of the sparse vector example depicted as the second sparsity bit mask vectors 604 and thereby may be utilized to mimic and/or otherwise be operative as a depthwise kernel or filter. For example, the third sparsity bit mask vectors 606 may be equivalent and/or otherwise substantially approximate to the fourth sparsity bit mask vectors 608 because they have the same effective length. Because depthwise convolutions may be bandwidth intensive, the internal weight sparsity generation circuitry 228 may generate the third sparsity bit mask vectors 606 internal to the accelerator 200 to eliminate the need to read in the sparsity patterns for the third sparsity bit mask vectors 606 to thereby save bandwidth and reduce convolution time.

Advantageously, by instructing the internal weight sparsity generation circuitry 228 to generate the third sparsity bit mask vectors 606, the accelerator 200 may execute the depthwise convolution operation 500 of FIG. 5 without dedicated depthwise convolution hardware. By reducing and/or otherwise eliminating convolution-specific hardware, such as specific depthwise convolution hardware, the accelerator 200 may implement a plurality of convolution operation types, which may significantly ease physical implementation of the accelerator 200, reduce area of the accelerator 200, and/or enhance scalability of convolution operations to be executed by one or more of the accelerator 200.

Figure 7:
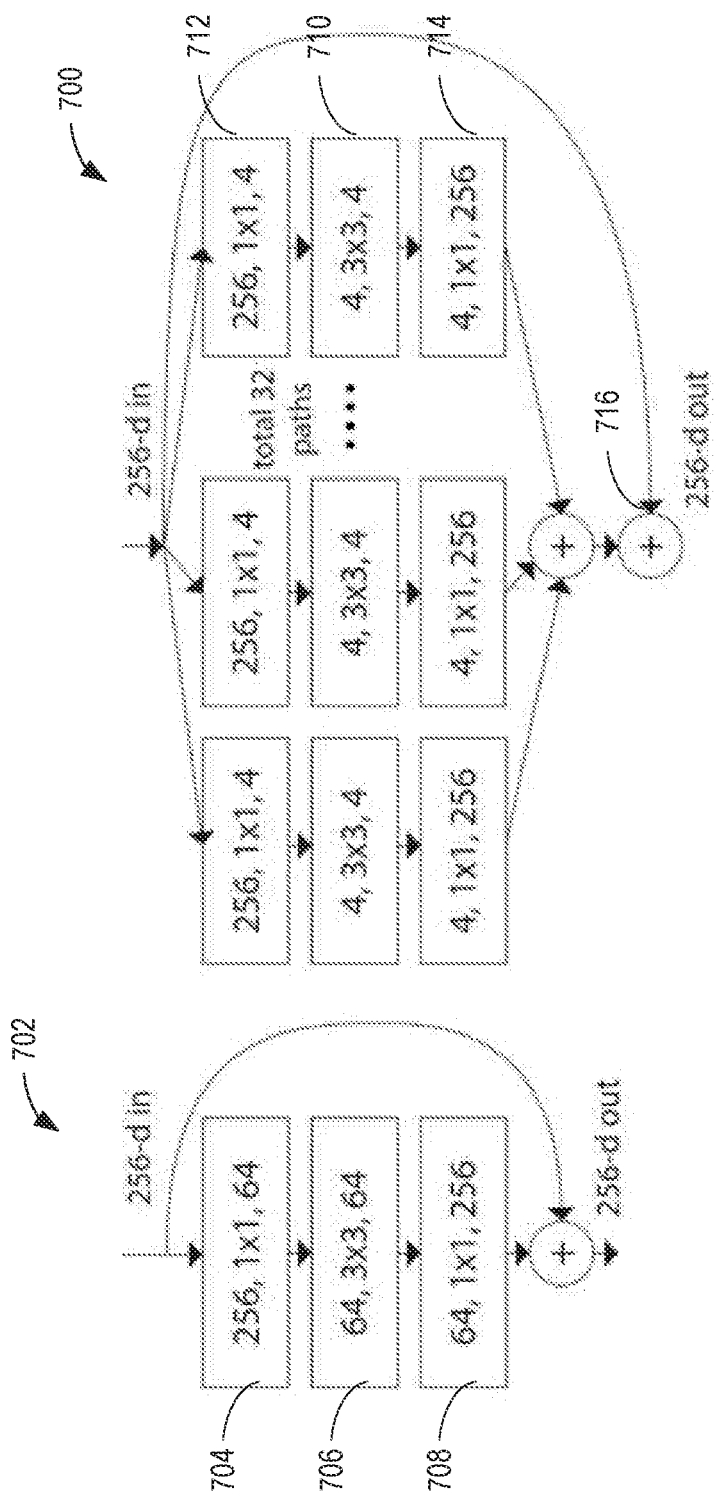
FIG. 7 is an illustration of an example grouped convolution operation that may be executed by the example acceleration circuitry of FIGS. 1 and/or 2.

FIG. 7 is an illustration of an example grouped convolution operation 700 that may be executed by the first acceleration circuitry 108 of FIG. 1, the second acceleration circuitry 110 of FIG. 1, and/or the accelerator 200 of FIG. 2. The illustrated example of FIG. 7 is an example of utilizing bit mask vectors (e.g., sparsity bit mask vectors) to isolate a number of channels at a time and then perform the grouped convolution operation 700 as a conventional convolution operation. In some examples, grouped convolutions may be implemented by performing a number of convolutions across groups of channels within a layer instead of a single convolution across all channels within the layer.

Further depicted in the illustrated example of FIG. 7 is a non-grouped convolution operation 702, which processes a first example input layer 704 of a NN by applying 64 example filters 706 to the 256 channels of the first input layer to generate a first example output layer 708. The layers of the grouped convolution operation 700 and the non-grouped convolution operation 702 are depicted with a format of (# input channels, filter size, # output channels). For example, the input layer 704 has 256 input channels, a filter size of 1×1, and 64 output channels.

The grouped convolution operation 700 of the illustrated example of FIG. 7 may be implemented by applying groups of 4 example filters 710 to a second example input layer 712 to create groups of example 4-layer outputs 714. The 4-layer outputs 714 may be added together output a second example output layer 716. In the grouped convolution operation 700, there are 32 groups of 4-layer deep tensors in the middle row of the example. The shallow and grouped processing may include executing more smaller workloads as opposed to single bigger workloads depicted by the non-grouped convolution operation 702.

In some examples, bigger, deeper workloads may be more efficient and/or otherwise more optimal for NNAs to process as opposed to smaller, shallower workloads. Advantageously, the first acceleration circuitry 108 of FIG. 1, the second acceleration circuitry 110 of FIG. 1, and/or the accelerator 200 of FIG. 2 may utilize manipulation of bit masks to cause the accelerator 200 to execute the second input layer 712 (e.g., the 32 (256, 1×1, 4) convolutions) as a single convolution (e.g., (256, 1×1, 128) convolution)) and yield a 128-d output. In some examples, the accelerator 200 may process the 128-d output as a single tensor (e.g., (128, 3×3, 128) tensor) and yield the same output as the 32 (4, 3×3, 4) convolutions of the grouped convolution operation 700.

Figure 8:
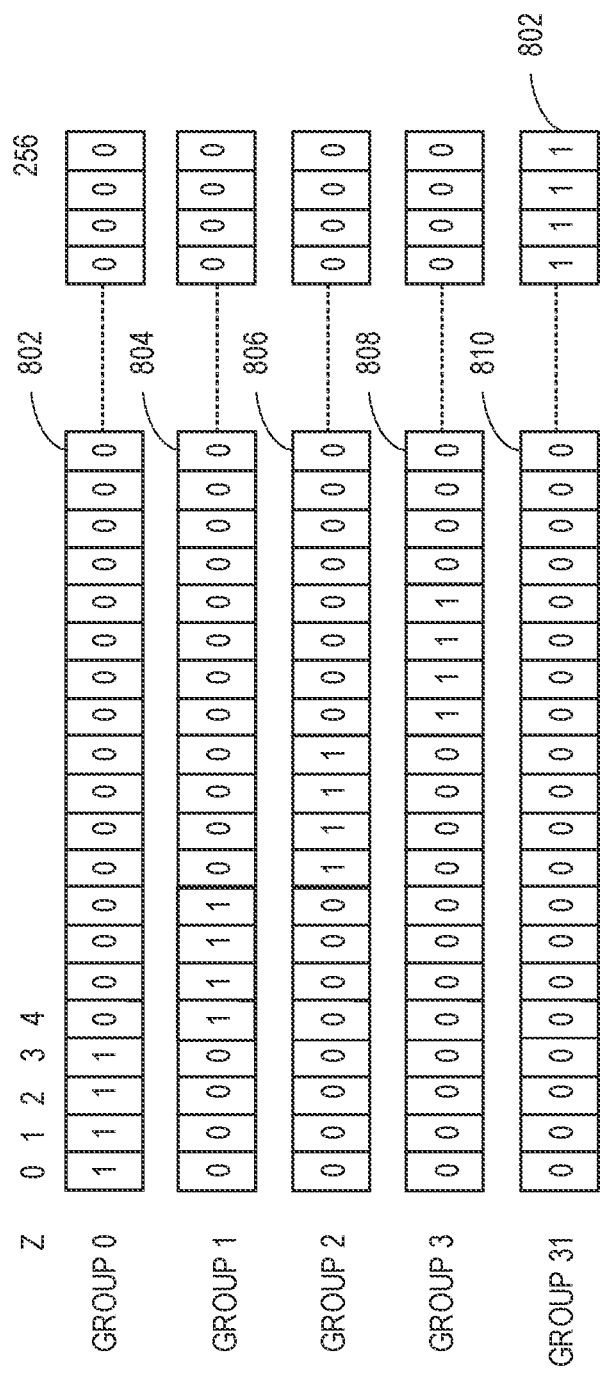
FIG. 8 is an illustration of example bit masks that may be utilized to implement the example grouped convolution operation of FIG. 7, which may be executed by the example acceleration circuitry of FIGS. 1 and/or 2.

FIG. 8 is an illustration of example bit masks 802, 804, 806, 808, 810 that may be utilized to implement the grouped convolution operation 700 of FIG. 7, which may be executed by the first acceleration circuitry 108 of FIG. 1, the second acceleration circuitry 110 of FIG. 1, and/or the accelerator 200 of FIG. 2. In this example, the bit masks 802, 804, 806, 808, 810 may implement sparsity bit masks (e.g., activation sparsity bit masks, weight sparsity bit masks, etc.).

In some examples, the bit masks 802, 804, 806, 808, 810 may be generated by the internal activation sparsity generation circuitry 220 and/or the internal weight sparsity generation circuitry 228 of FIG. 2 based on the configuration data 122 of FIG. 1. For example, the configuration circuitry 214 may determine to invoke the accelerator 200 to execute the grouped convolution operation 700 of FIG. 7 based on the configuration data 122 of FIG. 1. In some such examples, the configuration circuitry 214 may instruct the internal weight sparsity generation circuitry 228 to generate the bit masks 802, 804, 806, 808, 810 for the grouped convolution operation 700 based on the configuration register settings, which may be based on the configuration data 122. In some such examples, the internal weight sparsity generation circuitry 228 may generate the bit masks 802, 804, 806, 808, 810 based on an example data pattern 812. In this example, the data pattern 812 is a grouped walking is pattern, which includes a set of ones (e.g., a set of logic ones), a group of ones (e.g., a group of logic ones), etc.

Figure 9:
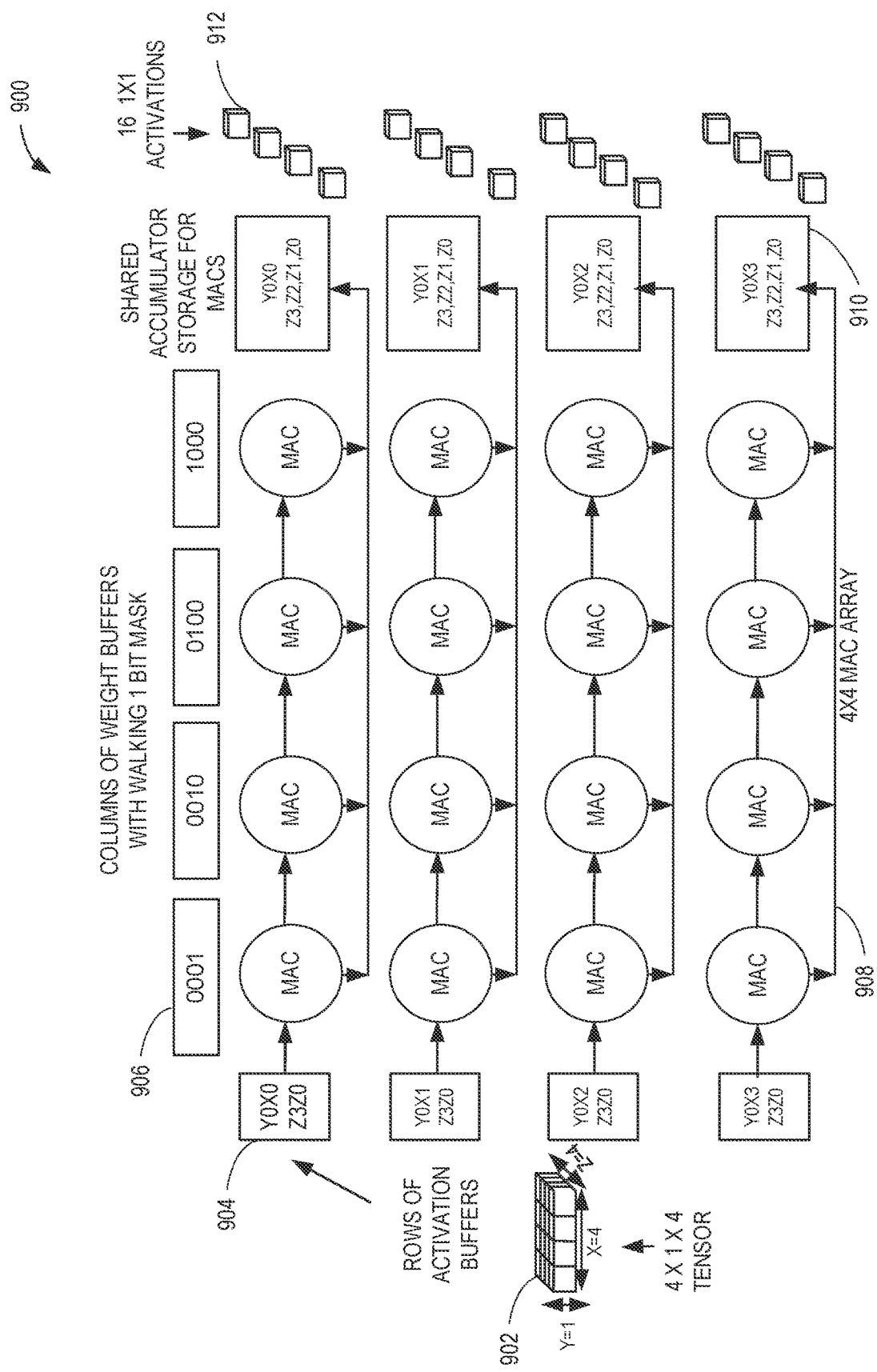
FIG. 9 is an illustration of an example elementwise addition operation that may be executed by the example acceleration circuitry of FIGS. 1 and/or 2.

The bit masks 802, 804, 806, 808, 810 include 32 bit masks having a filter length of z=256, which include a first example bit mask 802 corresponding to Group 0, a second example bit mask 804 corresponding to Group 1, a third example bit mask 806 corresponding to Group 2, a fourth example bit mask 808 corresponding to Group 3, and a fifth example bit mask 810 corresponding to Group 31. For example, the 32 ones of the bit masks 802, 804, 806, 808, 810 may be utilized to isolate 4 channels at a time from the 256-channel deep tensor of FIG. 7 (e.g., 256-d in). In some such examples, the 0s in the bit masks 802, 804, 806, 808, 810 may ensure that the filter only effectively sees 4 channels. Advantageously, the accelerator 200 may manipulate the bit masks 802, 804, 806, 808, 810 based on the data pattern 812 (or a different data pattern) to execute the grouped convolution operation 700 with increased efficiency FIG. 9 is an illustration of a first example elementwise addition operation 900 that may be executed by the first acceleration circuitry 108 of FIG. 1, the second acceleration circuitry 110 of FIG. 1, and/or the accelerator 200 of FIG. 2. The first elementwise addition operation 900 may be an example of utilizing bit mask manipulation and a structure of a MAC array to isolate a single activation at a time.

The first elementwise addition operation 900 includes an example input tensor 902, example rows of activation buffers 904, example columns of weight buffers 906, an example MAC array 908, an example shared accumulator storage 910 for the MAC array, and example output activations 912. The input tensor 902 is a 4×1×4 tensor. Alternatively, the input tensor 902 may be any other size. The rows of activation buffers 904 may include activation data stored in the activation data buffer 216 of FIG. 2. The columns of weight buffers 906 may include weight data stored in the weight data buffer 222 of FIG. 2. For example, the internal weight sparsity generation circuitry 228 may generate the weight data of the columns of weight buffers 906 based on the configuration data 122 of FIG. 1. The MAC array 908 may be an example implementation of ones of the MACs 236 of FIG. 2. In this example, the MAC array 236 is a 4×4 MAC array.

Alternatively, the MAC array 236 may be any other size and/or configuration. In this example, the MACs 236 are provided weight data. For example, the internal weight generation circuitry 224 may generate the weight data based on the configuration data 122. The shared accumulator storage 910 may implement the accumulator storage 238 of FIG. 2. The output activations 912 may include activation data stored in the accumulator storage 238 of FIG. 2.

Advantageously, an accelerator described herein, such as the accelerator 200, may utilize internal generation of sparsity patterns and weight values plus internal storage to execute the first elementwise addition operation 900 using the MAC array 908, which may typically be utilized for conventional convolution. Advantageously, the accelerator 200 may reconfigure hardware tailored for conventional convolution to implement non-convolution operations, such as the first elementwise addition operation 900, which may be performed with negligible area cost.

In some examples, the accelerator 200 may determine that a sparsity vector can be used to isolate a single element in a tensor, such as the input tensor 902, for elementwise processing. For example, in addition to isolating a single activation, the weight data may be internally generated by the accelerator 200 and hardcoded to a value (e.g., 0×1) that may be fixed in hardware and/or configured by firmware and/or software. In some such examples, the isolated activation value may be stored in the shared accumulator storage 910 when the isolated activation value passes through the MAC array 908, and/or, more generally, the accelerator 200.

In the illustrated example of FIG. 9, the MAC array 908 may be utilized to obtain a 4×1×4 input tensor as an input isolate the 16 1×1 activations based on the walking is bit mask and the operation of the MAC array 908. In this example, the MAC array 908 have a configuration where rows of the MAC array 908 share activation buffers and columns of the MAC array 908 share weight buffers. In the top row of this example, all of the MACs in the first row of the MAC array 908 see y[0]x[0]z[3:0] of the input tensor 902, which, when the bit mask vectors of the columns of weight buffers 906 are applied and the 0×1 multiplication is performed, the 4 accumulator values in the top row are populated with y[0]x[0]z[0], y[0]x[0]z[1], y[0]x[0]z[2], and y[0]x[0]z[3]. Advantageously, the generation of the bit masks based on a data pattern of a walking is pattern may effectuate the isolation of the single activation values within the input tensor 902.

Figure 10:
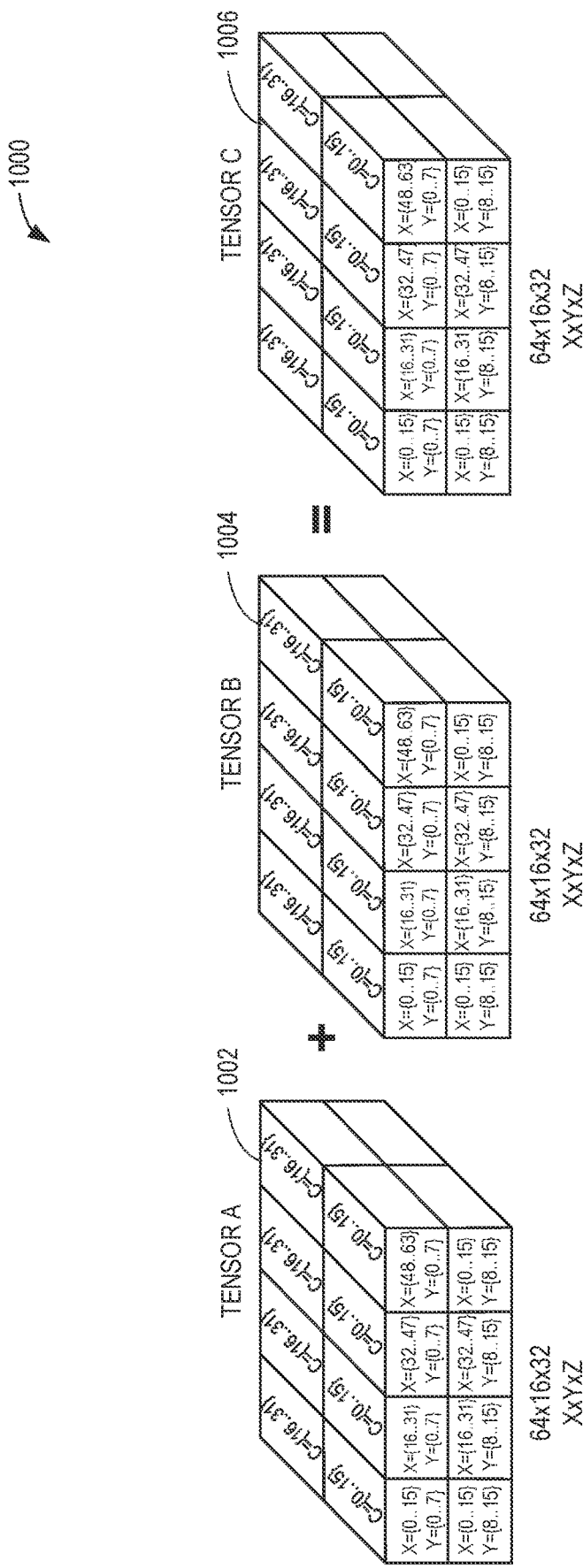
FIG. 10 is an illustration of another example elementwise addition operation that may be executed by the example acceleration circuitry of FIGS. 1 and/or 2.

FIG. 10 is an illustration of a second example elementwise addition operation 1000 that may be executed by the first acceleration circuitry 108 of FIG. 1, the second acceleration circuitry 110 of FIG. 1, and/or the accelerator 200 of FIG. 2. In this example, the second elementwise addition operation 1000 may be implemented by the addition of a first example tensor (TENSOR A) 1002 and a second example tensor (TENSOR B) 1004 to generate and/or otherwise output a third example tensor (TENSOR C) 1006.

In this example, the first tensor 1002 of FIG. 10 may implement the input tensor 902 of FIG. 9 or portion(s) thereof. For example, the first elementwise addition operation 900 of FIG. 9 may be executed to isolate first activation values of the first tensor 1002 in a first acceleration operation and isolate second activation values of the second tensor 1004 in a second acceleration operation. In some such examples, the first elementwise addition operation 900 of FIG. 9 may be executed to the add the first activation values and the second activation values to output third activation values of the third tensor 1006.

In some examples, the first acceleration circuitry 108 of FIG. 1, the second acceleration circuitry 110 of FIG. 1, and/or the accelerator 200 of FIG. 2 may execute (e.g., iteratively execute) the first elementwise addition operation 900 of FIG. 9 to achieve an addition of the first tensor 1002 and the second tensor 1004 of FIG. 10. In some such examples, the first acceleration circuitry 108 of FIG. 1, the second acceleration circuitry 110 of FIG. 1, and/or the accelerator 200 of FIG. 2 may execute (e.g., iteratively execute) the first elementwise addition operation 900 of FIG. 9 by breaking down the first tensor 1002 and the second tensor 1004 into smaller blocks or tensors and add (e.g., iteratively add) together to generate the output as depicted in the illustrated example of FIG. 11.

Figure 11:
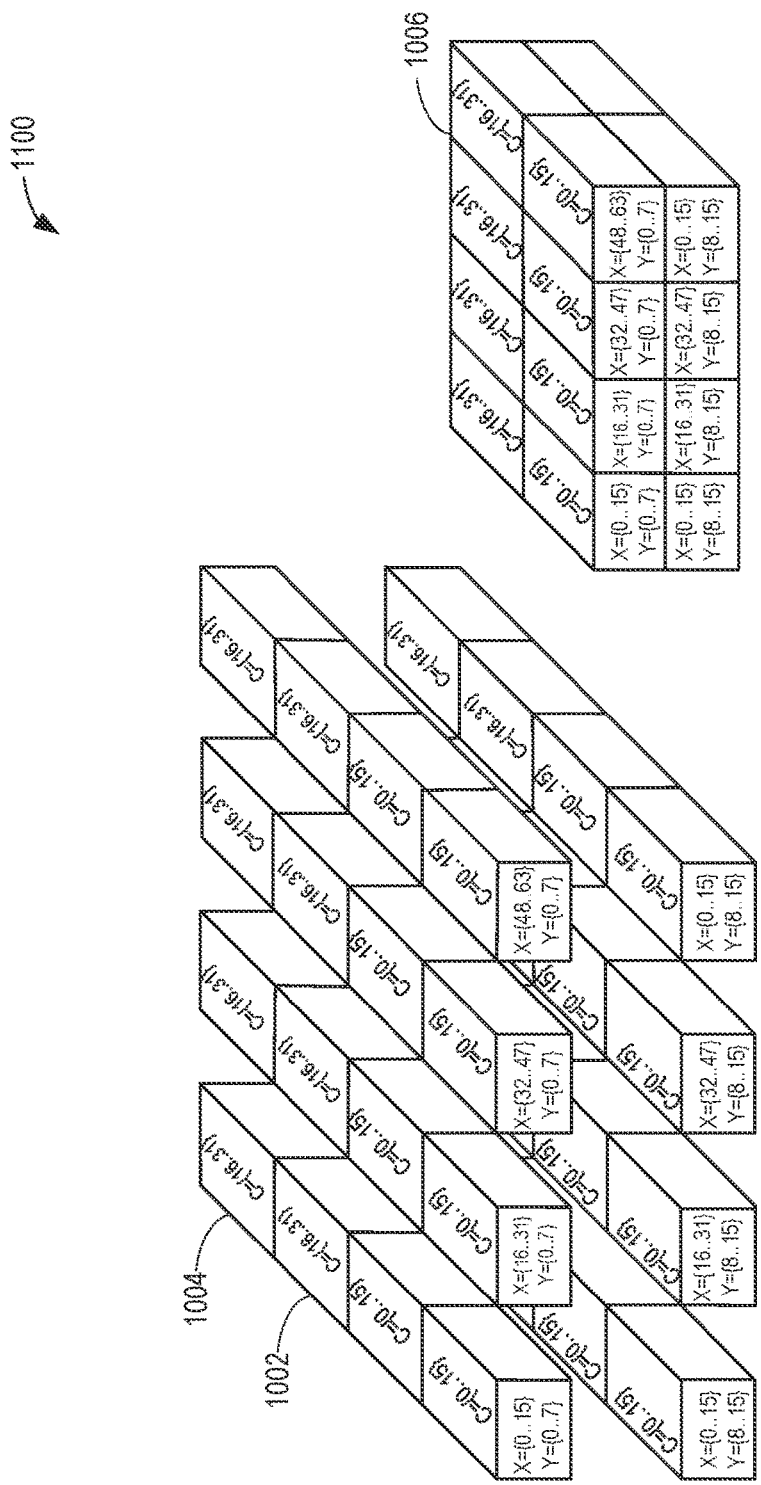
FIG. 11 is an illustration of yet another example elementwise addition operation that may be executed by the example acceleration circuitry of FIGS. 1 and/or 2.

FIG. 11 is an illustration of a third example elementwise addition operation 1100 that may be executed by the first acceleration circuitry 108 of FIG. 1, the second acceleration circuitry 110 of FIG. 1, and/or the accelerator 200 of FIG. 2. In this example, the first tensor 1002 and the second tensor 1004 may be divided, partitioned, and/or otherwise broken up into smaller tensors or blocks. In this example, the first tensor 1002 and the second tensor 1004 may be divided into blocks of 16×8×16. In this example, a first block of 16×8×16 of the first tensor 1002 may be added to a second block of 16×8×16 of the second tensor 1004 to yield a third 16×8×16 block of the third tensor 1006. For example, the accelerator 200 of FIG. 2 may execute the first elementwise addition operation 900 of FIG. 9 on the first block and the second block to yield the third block of the third tensor 1006. In some such examples, the accelerator 200 may repeat and/or otherwise iteratively execute the first elementwise addition operation 900 16 times on the first tensor 1002 and the second tensor 1004 to output the 64×16×32 block of the third tensor 1006.

Advantageously, the first acceleration circuitry 108 of FIG. 1, the second acceleration circuitry 110 of FIG. 1, and/or the accelerator 200 of FIG. 2 may perform the first elementwise addition operation 900, the second elementwise addition operation 1000, and/or the third elementwise addition operation 1100. For example, the accelerator 200 may be implemented with hardware to execute conventional convolution operations. In some such examples, the accelerator 200 may be configured to execute the conventional convolution operation, the first elementwise addition operation 900, the second elementwise addition operation 1000, and/or the third elementwise addition operation 1100 with the same hardware, which may reduce the hardware cost of supporting and/or otherwise implementing elementwise addition operations.

Advantageously, the first acceleration circuitry 108, the second acceleration circuitry 110, and/or the accelerator 200 may execute the first elementwise addition operation 900, the second elementwise addition operation 1000, and/or the third elementwise addition operation 1100 with dense and/or sparse vectors. For example, the accelerator 200 may execute the first elementwise addition operation 900, the second elementwise addition operation 1000, and/or the third elementwise addition operation 1100 to effectuate the addition of two sparse vectors, a sparse vector and a dense vector, or a two dense vectors utilizing the same hardware of FIG. 2.

Figure 12:
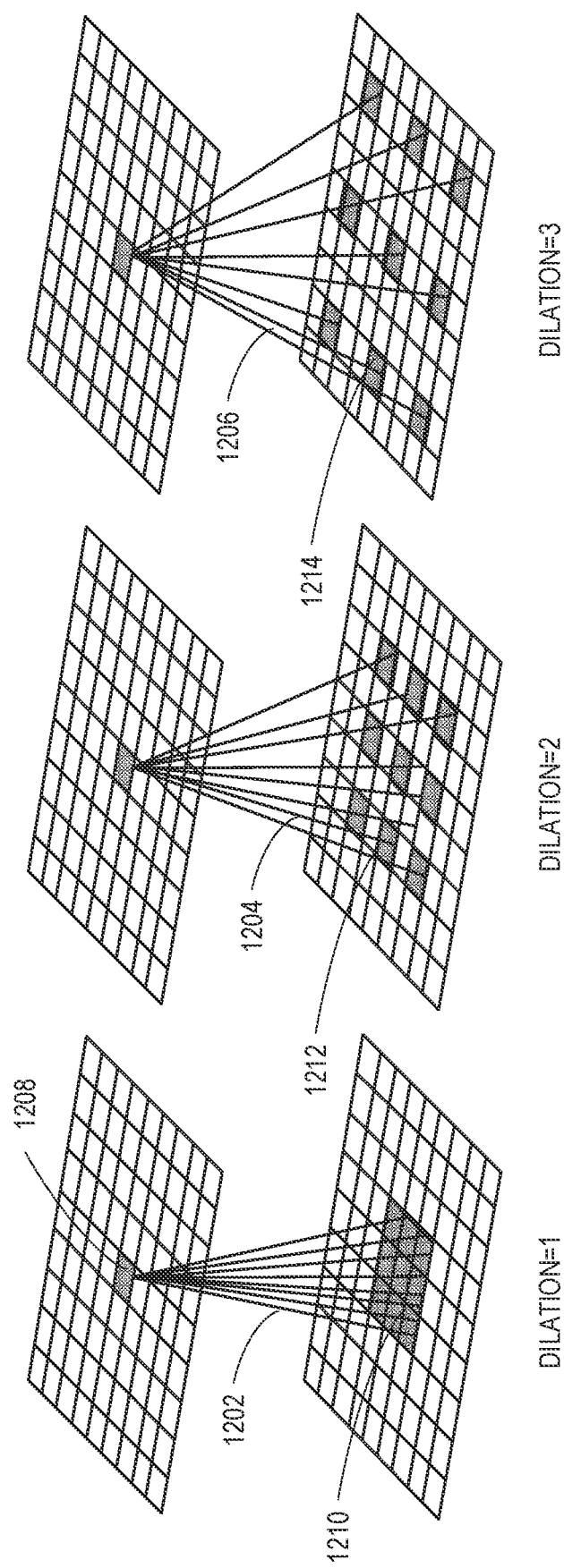
FIG. 12 is an illustration of an example dilated convolution operation that may be executed by the example acceleration circuitry of FIGS. 1 and/or 2.

FIG. 12 is an illustration of example dilated convolution operations 1202, 1204, 1206 that may be executed by the first acceleration circuitry 108 of FIG. 1, the second acceleration circuitry 110 of FIG. 1, and/or the accelerator 200 of FIG. 2. The dilated convolution operations 1202, 1204, 1206 of FIG. 12 may implement examples of generating bit mask vectors to manipulate a structure of filter kernels to perform the dilated convolution operations 1202, 1204, 1206 as conventional 2-D convolution operations. As depicted in the illustrated example, dilated convolutions, or atrous convolutions, may expand a receptive field of a first example kernel 1208 by inserting holes between adjacent elements.

In this example, the dilated convolution is a 3×3 dilated convolution. The illustrated example depicts three example dilated convolutions 1202, 1204, 1206 including a first example dilated convolution 1202, a second example dilated convolution 1204, and a third example dilated convolution 1206. The first dilated convolution 1202 may be implemented with a dilation of 1 in which there are no holes between adjacent elements of a second example kernel 1210. The second dilated convolution 1204 may be implemented with a dilation of 2 in which there is a single hole between adjacent elements of a third example kernel 1212. The third dilated convolution 1206 may be implemented with a dilation of 3 in which there are two holes between adjacent elements of a fourth example kernel 1214.

Figure 13:
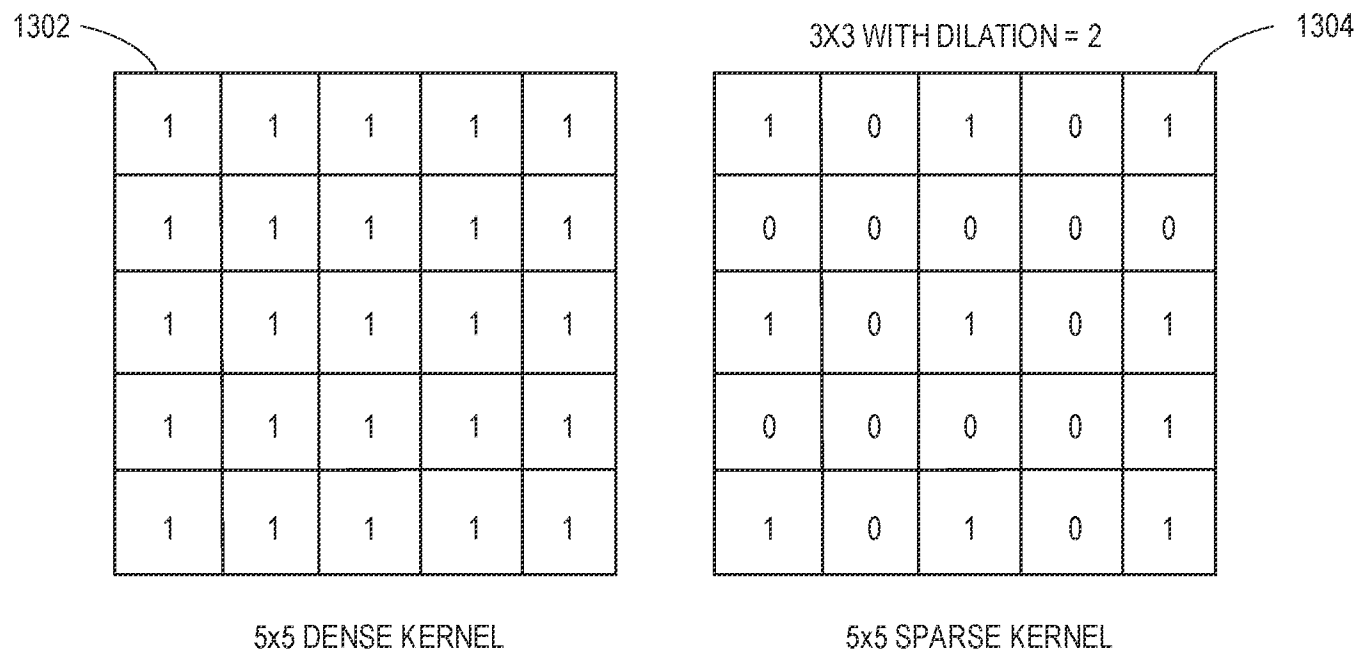

FIG. 13 is an illustration of example kernels 1302, 1304 that may be implemented by the first acceleration circuitry 108 of FIG. 1, the second acceleration circuitry 110 of FIG. 1, and/or the accelerator 200 of FIG. 2. For example, the internal activation sparsity generation circuitry 220 of FIG. 2 may generate the kernels 1302, 1304. In some examples, the internal weight sparsity generation circuitry 228 of FIG. 2 may generate the kernels 1302, 1304.

In the illustrated example of FIG. 13, the kernels 1302, 1304 include a first example kernel 1302 and a second example kernel 1304. In this example, the first kernel 1302 is a 5×5 dense kernel and the second kernel 1304 is a 5×5 sparse kernel. For example, the internal weight sparsity generation circuitry 228 may generate the second kernel 1304 to implement a 3×3 dilated convolution operation based on a dilation of 2. In some such examples, the first kernel 1302 may implement the second kernel 1210 of FIG. 12 and/or the second kernel 1304 may implement the third kernel 1212 of FIG. 12. For example, the second kernel 1304 may be considered a sparse subset of a large, non-dilated kernel, such as the first kernel 1302. Advantageously, the internal weight sparsity generation circuitry 228 may manipulate, modify, and/or otherwise adjust the first kernel 1302 by inserting 0s between adjacent elements to translate and/or otherwise convert the first kernel 1302 into the second kernel 1304. In some examples, the internal weight sparsity generation circuitry 228 may generate the second kernel 1304 by programming configuration registers of the configuration circuitry 214 and/or the internal weight sparsity generation circuitry 228 to produce the repeating pattern internally or by manipulating the values in memory of the configuration circuitry 214 and/or the internal weight sparsity generation circuitry 228 and allowing the weight data buffer 222 to read such values. Advantageously, the internal weight sparsity generation circuitry 228, and/or, more generally, the accelerator 200 may effectuate a dilated convolution operation, such as one of the dilated convolution operations 1202, 1204, 1206 of FIG. 12, to be performed as a conventional convolution operation on a sparse NNA, such as the accelerator 200, by manipulating the first kernel 1302 to generate the second kernel 1304.

Flowcharts representative of example hardware logic, machine readable instructions, hardware implemented state machines, and/or any combination thereof for implementing the example accelerator compiler 104A-C of FIG. 1, the first example acceleration circuitry 108 of FIG. 1, the second example acceleration circuitry 110 of FIG. 1, the example accelerator 200 of FIG. 2, and/or the accelerator compiler 300 of FIG. 3 are shown in FIGS. 14-17. The machine readable instructions may be one or more executable programs or portion(s) of an executable program for execution by a computer processor and/or processor circuitry, such as the example processor circuitry 1812, the example graphics processing unit 1840, the example vision processing unit 1842, and/or the example neural network processor 1844 shown in the example processor platform 1800 discussed below in connection with FIG. 18, the processor circuitry discussed below in connection with FIG. 19, and/or the processor circuitry discussed below in connection with FIG. 20. The program may be embodied in software stored on a non-transitory computer readable storage medium such as a CD-ROM, a floppy disk, an HDD, a DVD, a Blu-ray disk, or a memory associated with the example processor circuitry 1812, the example graphics processing unit 1840, the example vision processing unit 1842, and/or the example neural network processor 1844, but the entire program and/or parts thereof could alternatively be executed by a device other than the example processor circuitry 1812, the example graphics processing unit 1840, the example vision processing unit 1842, the example neural network processor 1844, and/or embodied in firmware or dedicated hardware. Further, although the example program is described with reference to the flowcharts illustrated in FIGS. 14-17, many other methods of implementing the example accelerator compiler 104A-C of FIG. 1, the first example acceleration circuitry 108 of FIG. 1, the second example acceleration circuitry 110 of FIG. 1, the example accelerator 200 of FIG.

2, and/or the accelerator compiler 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 14-17 may be implemented using executable instructions (e.g., computer and/or machine readable instructions) stored on a non-transitory computer and/or machine readable medium such as an HDD, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 14:
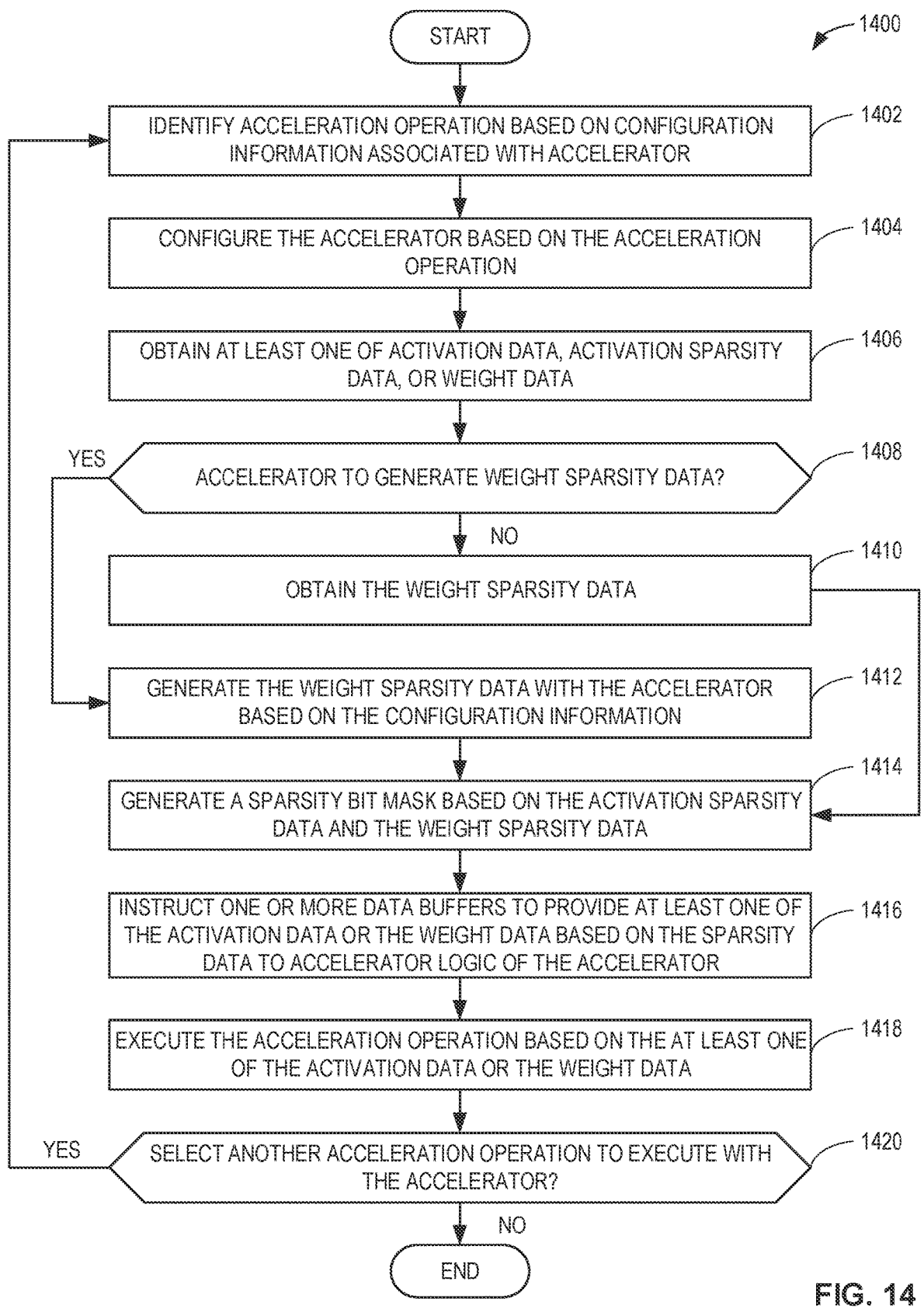
FIG. 14 is a flowchart representative of an example process that may be performed using example machine readable instructions that may be executed and/or hardware configured to implement the example acceleration circuitry of FIGS. 1 and/or 2 to execute an acceleration operation.

FIG. 14 is a flowchart representative of an example process 1400 that may be performed using example machine readable instructions that may be executed and/or hardware configured to implement the example acceleration circuitry 108, 110 of FIG. 1 and/or the sparse accelerator 200 of FIG. 2 to execute an acceleration operation. The example process 1400 begins at block 1402, at which the first acceleration circuitry 108 and/or the second acceleration circuitry 110 identifies an acceleration operation based on configuration information associated with an accelerator. For example, the configuration circuitry 214 (FIG. 2) may identify the depthwise convolution operation 500 of FIG. 5 to be executed by the accelerator 200. In some such examples, the configuration circuitry 214 may identify the depthwise convolution operation 500 based on the configuration data 122 of FIG. 1.

At block 1404, the first acceleration circuitry 108 and/or the second acceleration circuitry 110 may configure the accelerator based on the acceleration operation. For example, the configuration circuitry 214 may configure one or more configuration registers of the internal activation sparsity generation circuitry 220 (FIG. 2), the internal weight sparsity generation circuitry 228 (FIG. 2), and/or the internal weight generation circuitry 224 (FIG. 2) based on the acceleration operation. In some such examples, the configuration circuitry 214 may configure the one or more configuration registers to generate a bit mask (e.g., an activation sparsity bit mask, a weight activation bit mask, etc.) and/or weight value(s) based on a data pattern, such as a walking 1s data pattern, a grouped walking 1s data pattern, etc., and/or a combination thereof.

At block 1406, the first acceleration circuitry 108 and/or the second acceleration circuitry 110 may obtain at least one of activation data, activation sparsity data, or weight data. For example, the activation data buffer 216 (FIG. 2) may obtain activation data from a resource (e.g., hardware, software, and/or firmware) of the computing system 102 of FIG. 1 via the activation data interface 204 (FIG. 2). In some such examples, the external activation sparsity buffer 218 (FIG. 2) may obtain activation sparsity data from a resource of the computing system 102 of FIG. 1 via the activation sparsity data interface 206 (FIG. 2). In some such examples, the weight data buffer 222 (FIG. 2) may obtain weight data from a resource of the computing system 102 of FIG. 1 via the weight data interface 208 (FIG. 2).

At block 1408, the first acceleration circuitry 108 and/or the second acceleration circuitry 110 may determine whether the accelerator is to generate weight sparsity data. For example, the configuration circuitry 214 may instruct the internal weight sparsity generation circuitry 228 (FIG. 2) to generate weight sparsity data based on the convolution acceleration operation to be executed by the accelerator 200.

If, at block 1408, the first acceleration circuitry 108 and/or the second acceleration circuitry 110 determine that the accelerator is not to generate the weight sparsity data, then, at block 1410, the first acceleration circuitry 108 and/or the second acceleration circuitry 110 obtain the weight sparsity data. For example, the external weight sparsity buffer 226 (FIG. 2) may obtain weight sparsity data from a resource of the computing system 102 of FIG. 1. In response to obtaining the weight sparsity data at block 1410, control proceeds to block 1414 to generate a sparsity bit mask based on the activation sparsity data and the weight sparsity data.

If, at block 1408, the first acceleration circuitry 108 and/or the second acceleration circuitry 110 determine that the accelerator is to generate the weight sparsity data, control proceeds to block 1412 to generate a sparsity bit mask based on the activation sparsity data and the weight sparsity data. For example, the configuration circuitry 214 may instruct the first multiplexer 230 to provide a sparse activation vector to the combined sparsity controller 234 (FIG. 2) based on the acceleration operation. In some examples, the configuration circuitry 214 may instruct the second multiplexer 232 to provide a sparse weight vector to the combined sparsity controller 234 based on the acceleration operation. In some such examples, the configuration circuitry 214 may instruct the second multiplexer 232 to select the sparse weight vector from the internal weight sparsity generation circuitry 228 in response to an identification of the acceleration operation as a depthwise convolution operation. In some such examples, the combined sparsity controller 234 may generate a sparsity bit mask, such as the third sparsity bit mask vectors 606 of FIG. 6, one of the bit masks 802, 804, 806, 808, 810, etc., of FIG. 8, etc., based on the activation sparsity data and the weight sparsity data.

At block 1416, the first acceleration circuitry 108 and/or the second acceleration circuitry 110 may instruct one or more data buffers to provide at least one of the activation data or the weight data based on the sparsity data to accelerator logic of the accelerator. For example, the combined sparsity controller 234 may instruct the activation data buffer 216 to provide activation data based on the sparsity bit mask, which may be based on the activation sparsity data, to the MACs 236. In some examples, the combined sparsity controller 234 may instruct the weight data buffer 222 to provide weight data based on the sparsity bit mask, which may be based on the weight sparsity data, to the MACs 236.

At block 1418, the first acceleration circuitry 108 and/or the second acceleration circuitry 110 may execute the acceleration operation based on the at least one of the activation data or the weight data. For example, the accelerator 200 may execute the depthwise convolution operation 500 of FIG. 5, the grouped convolution operation 700 of FIG. 7, the first elementwise addition operation 900 of FIG. 9, the second elementwise addition operation 1000 of FIG. 10, the third elementwise addition operation 1100 of FIG. 11, the first dilated convolution operation 1202 of FIG. 12, the second dilated convolution operation 1204 of FIG. 12, the third dilated convolution operation 1206 of FIG. 12, etc.

At block 1420, the first acceleration circuitry 108 and/or the second acceleration circuitry 110 may determine whether to select another acceleration operation to execute with the accelerator. For example, the configuration circuitry 214 may determine whether to select another acceleration operation to execute with the accelerator 200. If, at block 1420, the first acceleration circuitry 108 and/or the second acceleration circuitry 110 determine to select another acceleration operation to execute with the accelerator, control returns to block 1402 to identify the acceleration operation based on configuration information associated with the accelerator, otherwise the example process 1400 of FIG. 14 concludes.

Figure 15:
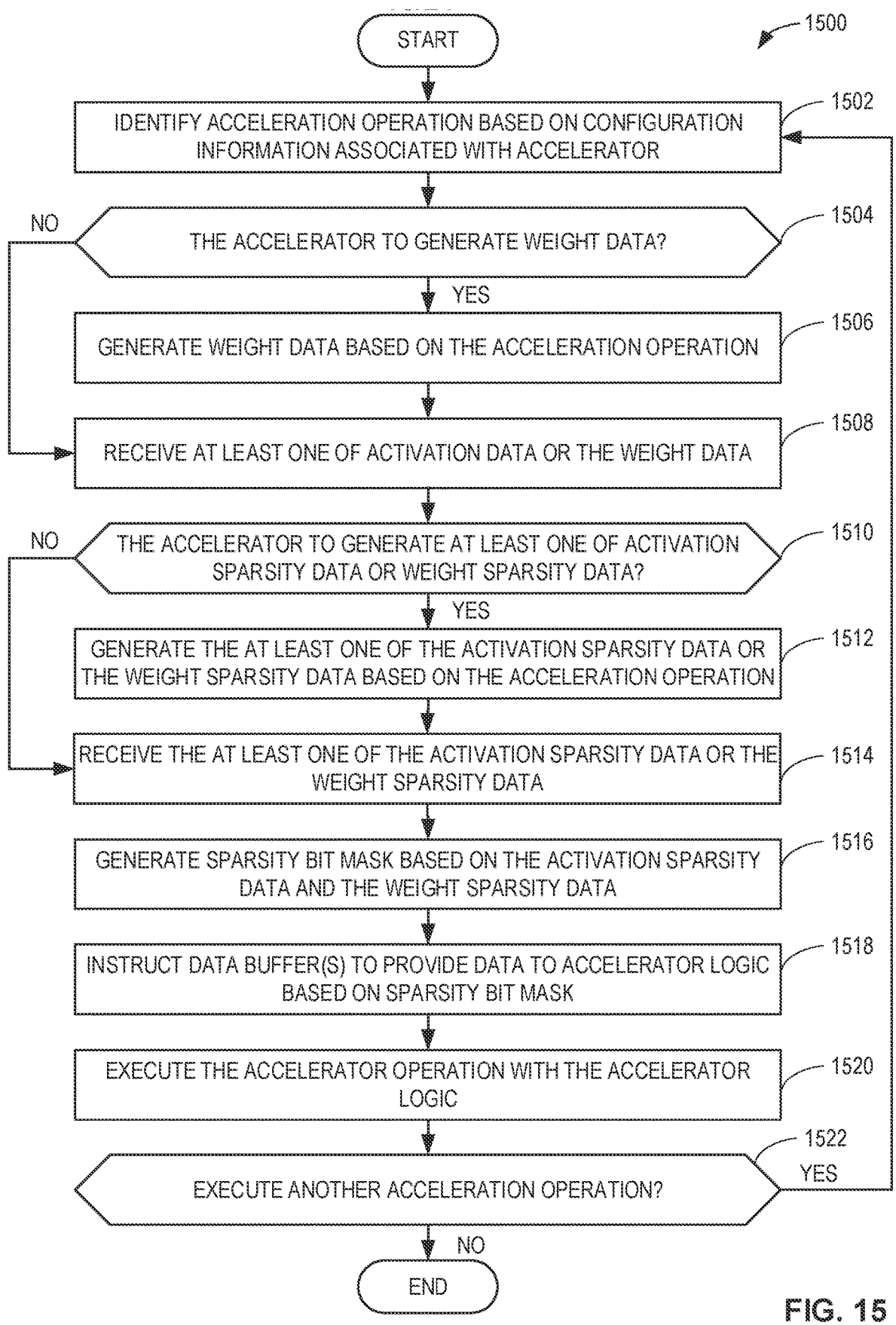
FIG. 15 is another flowchart representative of an example process that may be performed using example machine readable instructions that may be executed and/or hardware configured to implement the example acceleration circuitry of FIGS. 1 and/or 2 to execute an acceleration operation.

FIG. 15 is a flowchart representative of an example process 1500 that may be performed using example machine readable instructions that may be executed and/or hardware configured to implement the first acceleration circuitry 108 of FIG. 1, the second acceleration circuitry 110 of FIG. 1, and/or the accelerator 200 of FIG. 2 to execute an acceleration operation. The example process 1500 of FIG. 15 begins at block 1502, at which the first acceleration circuitry 108 and/or the second acceleration circuitry 110 may identify an acceleration operation based on configuration information associated with an accelerator. For example, the configuration circuitry 214 (FIG. 2) may identify based on the configuration data 122 of FIG. 1 that the accelerator is to execute the depthwise convolution operation 500 of FIG. 5, the first elementwise addition operation 900 of FIG. 9, etc.

At block 1504, the first acceleration circuitry 108 and/or the second acceleration circuitry 110 may determine whether the accelerator is to generate weight data. For example, the configuration circuitry 214 may determine based on the configuration data 122 that the internal weight generation circuitry 224 is to generate weight data. In some such examples, the configuration circuitry 214 may determine that the internal weight generation circuitry 224 is to generate weight data based on the configuration data 122 indicating that the acceleration operation to be executed by the accelerator 200 is the first elementwise addition operation 900 of FIG. 9.

If, at block 1504, the first acceleration circuitry 108 and/or the second acceleration circuitry 110 determine that the accelerator is not to generate weight data, control proceeds to block 1508, otherwise, at block 1506, the first acceleration circuitry 108 and/or the second acceleration circuitry 110 may generate weight data based on the acceleration operation. For example, the internal weight generation circuitry 224 may generate the weight data based on the acceleration operation being the first elementwise addition operation 900.

At block 1508, the first acceleration circuitry 108 and/or the second acceleration circuitry 110 may receive at least one of activation or the weight data. For example, in response to a determination to generate the weight data, the activation data buffer 216 (FIG. 2) may receive activation data from a resource of the computing system 102 via the activation data interface 204 (FIG. 2). Advantageously, in some such examples, the generated weight data may not need to be received via the weight data interface 208 (FIG. 2). In some examples, in response to a determination not to generate the weight data, the activation data buffer 216 may receive activation data from a resource of the computing system 102 via the activation data interface 204 and the weight data buffer 222 may receive weight data from a resource of the computing system 102 via the weight data interface 208 (FIG. 2).

At block 1510, the first acceleration circuitry 108 and/or the second acceleration circuitry 110 may determine whether the accelerator is to generate at least one of activation sparsity data or weight sparsity data. For example, the configuration circuitry 214 may determine to configure one or more configuration registers of the internal activation sparsity generation circuitry 220 (FIG. 2) and/or the internal weight sparsity generation circuitry 228 (FIG. 2) based on the configuration data 122 of FIG. 1 to generate activation sparsity data and/or weight sparsity data based on the depthwise convolution operation 500, the first elementwise addition operation 900, etc.

If, at block 1510, the first acceleration circuitry 108 and/or the second acceleration circuitry 110 determine that the accelerator is not to generate the at least one of the activation sparsity data or the weight sparsity data, control proceeds to block 1514. If, at block 1510, the first acceleration circuitry 108 and/or the second acceleration circuitry 110 determine that the accelerator is to generate the at least one of the activation sparsity data or the weight sparsity data, then, at block 1512, the first acceleration circuitry 108 and/or the second acceleration circuitry 110 may generate the at least one of the activation sparsity data or the weight sparsity data based on the acceleration operation. For example, the internal weight sparsity generation circuitry 228 may generate the weight sparsity data to include sparse weight vectors based on a walking 1s data pattern, such as the third sparsity bit mask vectors 606 of FIG. 6, which may be based on the identification of the acceleration operation as the depthwise convolution operation 500.

At block 1514, the first acceleration circuitry 108 and/or the second acceleration circuitry 110 may receive the at least one of the activation sparsity data or the weight sparsity data. For example, in response to a determination not to generate the at least one of the activation sparsity data or the weight sparsity data, the external activation sparsity buffer 218 (FIG. 2) may receive activation sparsity data from a resource of the computing system 102 via the activation sparsity data interface 206 (FIG. 2). In some examples, in response to a determination to generate the at least one of the activation sparsity data or the weight sparsity data, the external activation sparsity buffer 218 may receive activation sparsity data from a resource of the computing system 102 via the activation sparsity data interface 206 and/or the external weight sparsity buffer 226 (FIG. 2) may receive weight sparsity data from a resource of the computing system 102 via the weight sparsity data interface 210 (FIG. 2).

At block 1516, the first acceleration circuitry 108 and/or the second acceleration circuitry 110 may generate a sparsity bit mask based on the activation sparsity data and the weight sparsity data. For example, the configuration circuitry 214 may instruct the first multiplexer 230 (FIG. 2) to provide a sparse activation vector to the combined sparsity controller 234 (FIG. 2) based on the acceleration operation. In some examples, the configuration circuitry 214 may instruct the second multiplexer 232 (FIG. 2) to provide a sparse weight vector to the combined sparsity controller 234 based on the acceleration operation. In some such examples, the configuration circuitry 214 may instruct the second multiplexer 232 to select the sparse weight vector from the internal weight sparsity generation circuitry 228 in response to an identification of the acceleration operation as the depthwise convolution operation 500. In some such examples, the combined sparsity controller 234 may generate a sparsity bit mask, such as the third sparsity bit mask vectors 606 of FIG. 6, one of the bit masks 802, 804, 806, 808, 810, etc., of FIG. 8, etc., based on the activation sparsity data and the weight sparsity data.

At block 1518, the first acceleration circuitry 108 and/or the second acceleration circuitry 110 may instruct data buffer(s) to provide data to accelerator logic based on the sparsity bit mask. For example, the combined sparsity controller 234 may instruct the activation data buffer 216 to provide activation data based on the sparsity bit mask and the activation sparsity data to the MACs 236. In some examples, the combined sparsity controller 234 may instruct the weight data buffer 222 to provide weight data based on the sparsity bit mask and the weight sparsity data to the MACs 236.

At block 1520, the first acceleration circuitry 108 and/or the second acceleration circuitry 110 may execute the acceleration operation with the accelerator logic. For example, the accelerator 200 may execute the depthwise convolution operation 500 of FIG. 5, the grouped convolution operation 700 of FIG. 7, the first elementwise addition operation 900 of FIG. 9, the second elementwise addition operation 1000 of FIG. 10, the third elementwise addition operation 1100 of FIG. 11, the first dilated convolution operation 1202 of FIG. 12, the second dilated convolution operation 1204 of FIG. 12, the third dilated convolution operation 1206 of FIG. 12, etc.

At block 1522, the first acceleration circuitry 108 and/or the second acceleration circuitry 110 may determine whether to execute another acceleration operation. For example, the configuration circuitry 214 may determine whether to select another acceleration operation to execute with the accelerator 200. If, at block 1522, the first acceleration circuitry 108 and/or the second acceleration circuitry 110 determine to execute another acceleration operation, control returns to block 1502 to identify the acceleration operation based on configuration information associated with the accelerator, otherwise the example process 1500 of FIG. 15 concludes.

Figure 16:
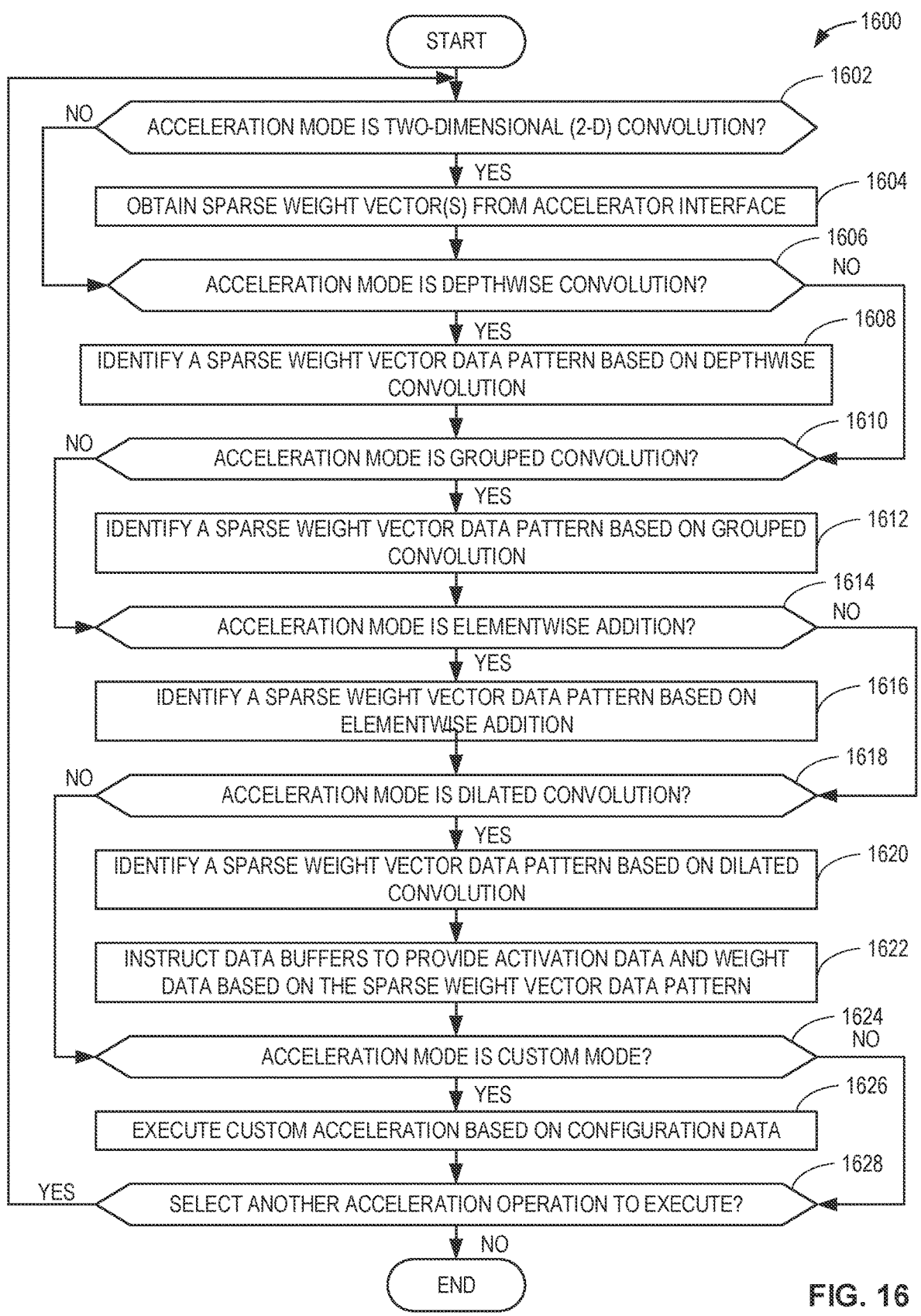
FIG. 16 is a flowchart representative of an example process that may be performed using example machine readable instructions that may be executed and/or hardware configured to implement the example acceleration circuitry of FIGS. 1 and/or 2 to execute an acceleration operation based on an acceleration mode.

FIG. 16 is a flowchart representative of an example process 1600 that may be performed using example machine readable instructions that may be executed and/or hardware configured to implement the first acceleration circuitry 108 of FIG. 1, the second acceleration circuitry 110 of FIG. 1, and/or the accelerator 200 of FIG. 2 to execute an acceleration operation based on an acceleration mode. The example process 1600 begins at block 1602, at which the first acceleration circuitry 108 and/or the second acceleration circuitry 110 may determine whether an acceleration mode is two-dimensional (2-D) convolution. For example, the configuration circuitry 214 (FIG. 2) may determine that the acceleration mode of the accelerator 200 is to be a 2-D convolution mode based on the configuration data 122 of FIG. 1 received via the configuration interface 202 (FIG. 2).

If, at block 1602, the first acceleration circuitry 108 and/or the second acceleration circuitry 110 determine that the acceleration mode is not 2-D convolution, control proceeds to block 1606. If, at block 1602, the first acceleration circuitry 108 and/or the second acceleration circuitry 110 determine that the acceleration mode is 2-D convolution, then, at block 1604, the first acceleration circuitry 108 and/or the second acceleration circuitry 110 obtain sparse weight vector(s) from an acceleration interface. For example, the external weight sparsity buffer 226 (FIG. 2) may receive weight sparsity data including one or more sparse weight vectors from a resource of the computing system 102 via the weight sparsity data interface 210 (FIG. 2).

At block 1606, the first acceleration circuitry 108 and/or the second acceleration circuitry 110 may determine whether the acceleration mode is depthwise convolution. For example, the configuration circuitry 214 may determine that the acceleration mode of the accelerator 200 is to be a depthwise convolution mode based on the configuration data 122.

If, at block 1606, the first acceleration circuitry 108 and/or the second acceleration circuitry 110 determine that the acceleration mode is not depthwise convolution, control proceeds to block 1610. If, at block 1606, the first acceleration circuitry 108 and/or the second acceleration circuitry 110 determine that the acceleration mode is depthwise convolution, then, at block 1608, the first acceleration circuitry 108 and/or the second acceleration circuitry 110 may identify a sparse weight vector data pattern based on depthwise convolution. For example, the configuration circuitry 214 may instruct the internal weight sparsity generation circuitry 228 (FIG. 2) to generate one or more sparse weight vectors based on a sparse weight vector data pattern. In some such examples, the internal weight sparsity generation circuitry 228 may identify the sparse weight vector data pattern in response to a determination that the accelerator 200 is to execute the depthwise convolution operation 500 of FIG. 5 based on the acceleration mode being depthwise convolution.

At block 1610, the first acceleration circuitry 108 and/or the second acceleration circuitry 110 may determine whether the acceleration mode is grouped convolution. For example, the configuration circuitry 214 may determine that the acceleration mode of the accelerator 200 is to be a grouped convolution mode based on the configuration data 122.

If, at block 1610, the first acceleration circuitry 108 and/or the second acceleration circuitry 110 determine that the acceleration mode is not grouped convolution, control proceeds to block 1614. If, at block 1610, the first acceleration circuitry 108 and/or the second acceleration circuitry 110 determine that the acceleration mode is grouped convolution, then, at block 1612, the first acceleration circuitry 108 and/or the second acceleration circuitry 110 may identify a sparse weight vector data pattern based on grouped convolution. For example, the configuration circuitry 214 may instruct the internal weight sparsity generation circuitry 228 to generate one or more sparse weight vectors based on a sparse weight vector data pattern. In some such examples, the internal weight sparsity generation circuitry 228 may identify the sparse weight vector data pattern in response to a determination that the accelerator 200 is to execute the grouped convolution operation 700 of FIG. 7 based on the acceleration mode being grouped convolution. In some such examples, the internal weight sparsity generation circuitry 228 may generate one(s) of the bit masks 802, 804, 806, 808, 810.

At block 1614, the first acceleration circuitry 108 and/or the second acceleration circuitry 110 may determine whether the acceleration mode is elementwise addition. For example, the configuration circuitry 214 may determine that the acceleration mode of the accelerator 200 is to be an elementwise addition mode based on the configuration data 122.

If, at block 1614, the first acceleration circuitry 108 and/or the second acceleration circuitry 110 determine that the acceleration mode is not elementwise addition, control proceeds to block 1618. If, at block 1614, the first acceleration circuitry 108 and/or the second acceleration circuitry 110 determine that the acceleration mode is elementwise addition, then, at block 1616, the first acceleration circuitry 108 and/or the second acceleration circuitry 110 may identify a sparse weight vector data pattern based on elementwise addition. For example, the configuration circuitry 214 may instruct the internal weight sparsity generation circuitry 228 to generate one or more sparse weight vectors based on a sparse weight vector data pattern. In some such examples, the internal weight sparsity generation circuitry 228 may identify the sparse weight vector data pattern in response to a determination that the accelerator 200 is to execute the first elementwise addition operation 900 of FIG. 9, the second elementwise addition operation 1000 of FIG. 10, and/or the third elementwise addition operation 1100 of FIG. 11 based on the acceleration mode being elementwise addition. In some such examples, the internal weight sparsity generation circuitry 228 may generate the columns of weight buffers 906 of FIG. 9.

At block 1618, the first acceleration circuitry 108 and/or the second acceleration circuitry 110 may determine whether the acceleration mode is dilated convolution. For example, the configuration circuitry 214 may determine that the acceleration mode of the accelerator 200 is to be a dilated convolution mode based on the configuration data 122.

If, at block 1618, the first acceleration circuitry 108 and/or the second acceleration circuitry 110 determine that the acceleration mode is not dilated convolution, control proceeds to block 1624. If, at block 1618, the first acceleration circuitry 108 and/or the second acceleration circuitry 110 determine that the acceleration mode is dilated convolution, then, at block 1620, the first acceleration circuitry 108 and/or the second acceleration circuitry 110 may identify a sparse weight vector pattern based on dilated convolution. For example, the configuration circuitry 214 may instruct the internal weight sparsity generation circuitry 228 to generate one or more sparse weight vectors based on a sparse weight vector data pattern. In some such examples, the internal weight sparsity generation circuitry 228 may identify the sparse weight vector data pattern in response to a determination that the accelerator 200 is to execute one(s) of the dilated convolution operations 1202, 1204, 1206 of FIG. 12 based on the acceleration mode being dilated convolution. In some such examples, the internal weight sparsity generation circuitry 228 may generate the second kernel 1304 of FIG. 13.

At block 1622, the first acceleration circuitry 108 and/or the second acceleration circuitry 110 may instruct data buffers to provide activation data and weight data based on the sparse weight vector data pattern. For example, the combined sparsity controller 234 (FIG. 2) may instruct the activation data buffer 216 (FIG. 2) to provide activation data based on the activation data and a sparsity bit mask, which may be based on sparse activation vectors and sparse weight vectors based on the sparse weight vector data pattern, to the MACs 236 (FIG. 2). In some examples, the combined sparsity controller 234 may instruct the weight data buffer 222 (FIG. 2) to provide weight data based on the sparsity bit mask and weight data to the MACs 236.

At block 1624, the first acceleration circuitry 108 and/or the second acceleration circuitry 110 may determine whether the acceleration mode is a custom mode. For example, the configuration circuitry 214 may determine that the acceleration mode of the accelerator 200 is a custom mode in which a user, a computing system, etc., may configure the accelerator 200 for a custom operation, a custom acceleration operation, etc.

If, at block 1624, the first acceleration circuitry 108 and/or the second acceleration circuitry 110 determine that the acceleration mode is not the custom mode, control proceeds to block 1628. If, at block 1624, the first acceleration circuitry 108 and/or the second acceleration circuitry 110 determine that the acceleration mode is the custom mode, then, at block 1626, the first acceleration circuitry 108 and/or the second acceleration circuitry 110 may execute a custom acceleration based on configuration data. For example, the user, the computing system, etc., may provide the configuration circuitry 214 with configuration data including a first instruction to cause the accelerator 200 to internally generate sparse weight vector(s) based on a first data pattern, a second instruction to cause the accelerator 200 to internally generate weight data based on a second data pattern, a third instruction to cause the accelerator 200 to internally generate sparse activation vector(s) based on a third data pattern, etc., and/or a combination thereof. In some such examples, in response to the first instruction, the internal activation sparsity generation circuitry 220 may generate the sparse activation vector(s) based on the first data pattern. In some examples, in response to the second instruction, the internal weight sparsity generation circuitry 228 may generate the sparse weight vector(s) based on the second data pattern. In some examples, in response to the third instruction, the internal weight generation circuitry 224 may generate the weight data based on the third data pattern. In some such examples, the combined sparsity controller 234 may instruct the activation data buffer 216 to provide activation data based on the activation data and a sparsity bit mask, which may be based on sparse activation vector(s) and sparse weight vector(s) based on one(s) of the first data pattern and/or the second data pattern, to the MACs 236. In some examples, the combined sparsity controller 234 may instruct the weight data buffer 222 to provide weight data based on the sparsity bit mask and the internally generated weight data to the MACs 236. In some such examples, the MACs 236 may execute the custom operation based on the provided activation and weight data.

At block 1628, the first acceleration circuitry 108 and/or the second acceleration circuitry 110 may determine whether to select another acceleration operation to execute. For example, the configuration circuitry 214 may determine whether to select another acceleration operation to execute with the accelerator 200. If, at block 1628, the first acceleration circuitry 108 and/or the second acceleration circuitry 110 determine to select another acceleration operation to execute, control returns to block 1602, otherwise the example process 1600 of FIG. 16 concludes.

Figure 17:
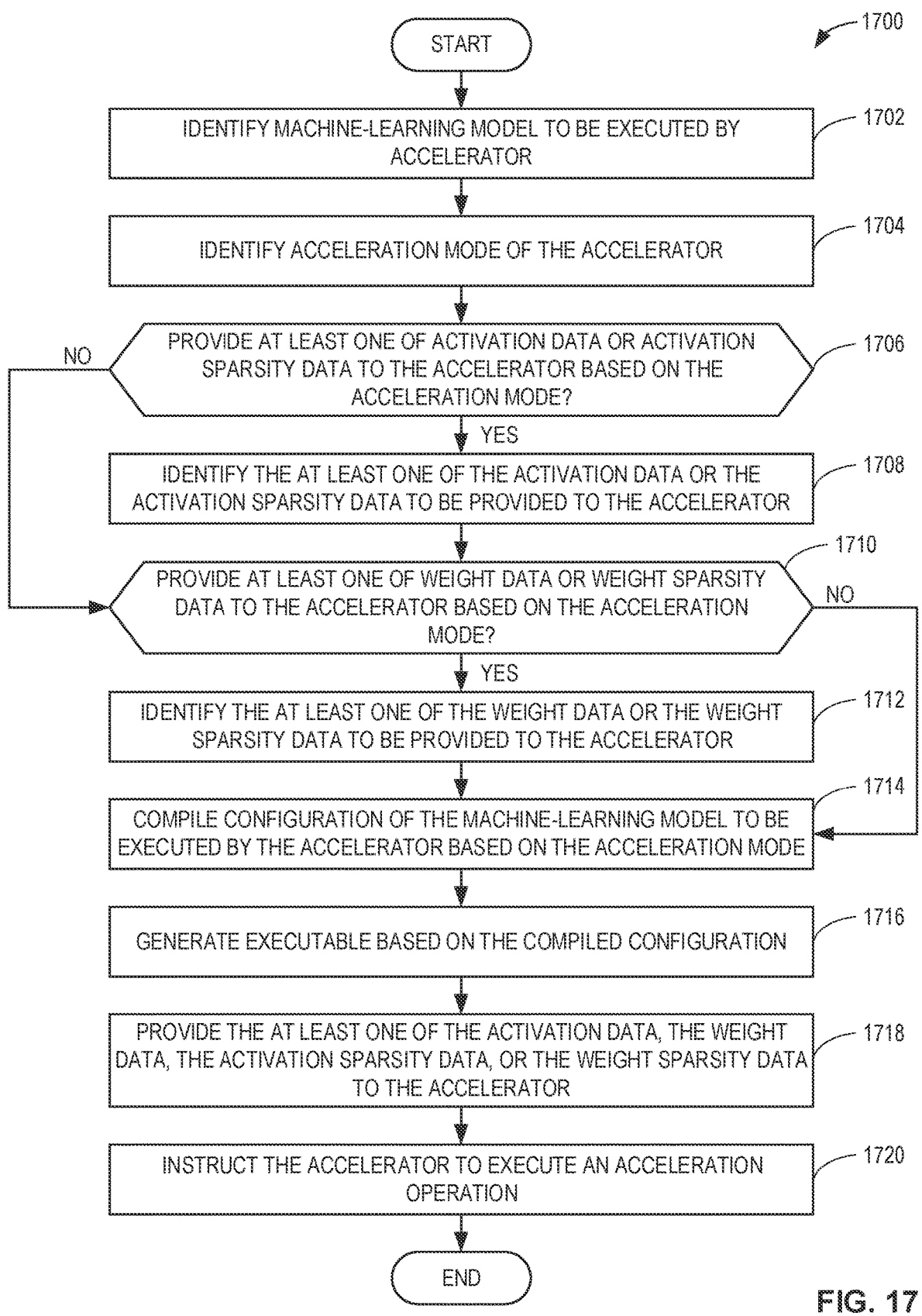
FIG. 17 is a flowchart representative of an example process that may be performed using example machine readable instructions that may be executed and/or hardware configured to implement the example accelerator compiler of FIGS. 1 and/or 3 to generate an executable based on a compiled configuration of a machine-learning model.

FIG. 17 is a flowchart representative of an example process 1700 that may be performed using example machine readable instructions that may be executed and/or hardware configured to implement the accelerator compiler 104A-C of FIG. 1 and/or the accelerator compiler 300 of FIG. 3 to generate an executable based on a compiled configuration of a machine-learning model. The example process 1700 of FIG. 17 begins at block 1702, at which the accelerator compiler 104A-C may identify a machine-learning model to be executed by an accelerator. For example, the ML model configuration handler 310 (FIG. 3) may identify one of the ML model(s) 124 of FIG. 1 to be executed by the first acceleration circuitry 108 of FIG. 1, the second acceleration circuitry 110 of FIG. 1, the accelerator 200 of FIG. 2, etc. In some such examples, the ML model configuration handler 310 may identify the one of the ML model(s) 124 to be a NN to be executed by the accelerator 200.

At block 1704, the accelerator compiler 104A-C may identify an acceleration mode of the accelerator. For example, the ML model configuration handler 310 may identify a depthwise convolution mode of the accelerator 200 based on the identified NN, or layer(s) thereof to process.

At block 1706, the accelerator compiler 104A-C may determine to provide at least one of activation data or activation sparsity data to the accelerator based on the acceleration mode. For example, the activation configuration handler 320 (FIG. 3) may determine to provide at least one of activation data or activation sparsity data to the accelerator 200 based on the depthwise convolution mode. In some examples, the activation configuration handler 320 may determine not to provide activation data and/or activation sparsity data to the accelerator 200 based on the depthwise convolution mode to improve bandwidth of the accelerator. In some such examples, the activation configuration handler 320 may determine that the accelerator 200 can internally generate the activation sparsity data to reduce a quantity of data to be read in to the accelerator 200 and thereby improve the efficiency of the accelerator 200.

If, at block 1706, the accelerator compiler 104A-C determines not to provide at least one of the activation data or the activation sparsity data to the accelerator based on the acceleration mode, control proceeds to block 1710. If, at block 1706, the accelerator compiler 104A-C determines to provide at least one of the activation data or the activation sparsity data to the accelerator based on the acceleration mode, then, at block 1708, the accelerator compiler 104A-C may identify the at least one of the activation data or the activation sparsity data to be provided to the accelerator. For example, the activation configuration handler 320 may identify activation data to be transmitted to the activation data interface 204 of FIG. 2 and/or activation sparsity data to be transmitted to the activation sparsity data interface 206 of FIG. 2.

At block 1710, the accelerator compiler 104A-C may determine whether to provide at least one of weight data or weight sparsity data to the accelerator based on the acceleration mode. For example, the weight configuration handler 330 (FIG. 3) may determine to provide at least one of weight data or weight sparsity data to the accelerator 200 based on the depthwise convolution mode. In some examples, the weight configuration handler 330 may determine not to provide weight data and/or weight sparsity data to the accelerator 200 based on the depthwise convolution mode to improve bandwidth of the accelerator. In some such examples, the weight configuration handler 330 may determine that the accelerator 200 can internally generate the weight data and/or the weight sparsity data to reduce a quantity of data to be read in to the accelerator 200 and thereby improve the efficiency of the accelerator 200.

If, at block 1710, the accelerator compiler 104A-C determines not to provide at least one of the weight data or the weight sparsity data to the accelerator based on the acceleration mode, control proceeds to block 1714. If, at block 1710, the accelerator compiler 104A-C determines to provide at least one of the weight data or the weight sparsity data to the accelerator based on the acceleration mode, then, at block 1712, the accelerator compiler 104A-C may identify the at least one of the weight data or the weight sparsity data to be provided to the accelerator. For example, the weight configuration handler 330 may identify weight data to be transmitted to the weight data interface 208 of FIG. 2 and/or weight sparsity data to be transmitted to the weight sparsity data interface 210 of FIG. 2.

At block 1714, the accelerator compiler 104A-C may compile a configuration of the machine-learning model to be executed by the accelerator based on the acceleration mode. For example, the configuration compiler 340 (FIG. 3) may compile a configuration of one or more layers of the NN based on the configuration data 122 of FIG. 1. In some examples, the configuration compiler 340 may compile the configuration of the one or more NN layers in response to a determination not to provide at least one of activation sparsity data, weight sparsity data, or weight data to the accelerator 200. In some such examples, the configuration compiler 340 may compile the configuration to include a command, an instruction, etc., to the accelerator 200 to generate activation sparsity data with the internal activation sparsity generation circuitry 220, generate weight sparsity data with the internal weight sparsity generation circuitry 228, and/or generate weight data with the internal weight generation circuitry 224.

At block 1716, the accelerator compiler 104A-C may generate an executable based on the compiled configuration. For example, the executable generator 350 (FIG. 3) may generate an executable based on the compiled one(s) of the one or more NN layers. In some such examples, the executable generator 350 may store the executable as one of the ML model(s) 124. In some such examples, the interface circuitry 114 (FIG. 1) may transmit the executable to one(s) of the external computing systems 130, which, when executed by the one(s) of the external computing systems 130, may configure and/or execute a NN associated with the one(s) of the external computing systems 130.

At block 1718, the accelerator compiler 104A-C may provide the at least one of the activation data, the weight data, the activation sparsity data, or the weight sparsity data to the accelerator. For example, the acceleration interface 360 (FIG. 3) may transmit activation data to the activation data interface 204, activation sparsity data to the activation sparsity data interface 206, weight data to the weight data interface 208, and/or weight sparsity data to the weight sparsity data interface 210 of the accelerator 200.

At block 1720, the accelerator compiler 104A-C may instruct the accelerator to execute an acceleration operation. For example, the accelerator interface 360 may transmit the compiled configuration(s) to the configuration interface 202 that, when received, may invoke and/or otherwise cause the accelerator 200 to execute the depthwise convolution operation (or a different acceleration operation) based on the compiled configuration(s). In response to instructing the accelerator to execute the acceleration operation at block 1720, the example process 1700 of FIG. 17 concludes.

Figure 18:
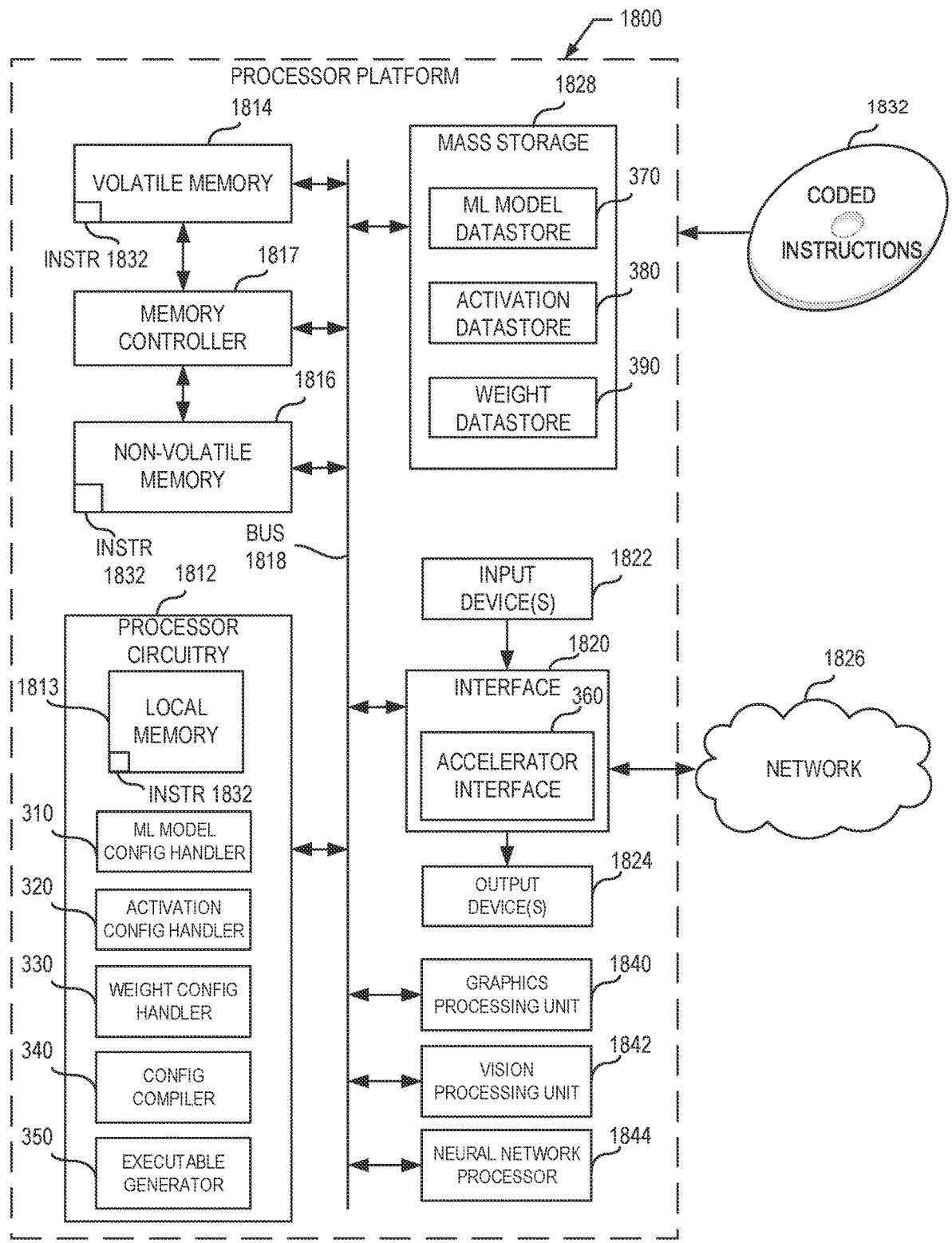
FIG. 18 is a block diagram of an example processing platform structured to execute the example machine readable instructions of FIGS. 15, 16, and/or 17 to implement the example accelerator compiler of FIGS. 1 and/or 3 and/or the example acceleration circuitry of FIGS. 1 and/or 2.

FIG. 18 is a block diagram of an example processor platform 1800 structured to execute the instructions of FIGS. 14-17 to implement the acceleration compiler 104A-C of FIG. 1, the first acceleration circuitry 108 of FIG. 1, the second acceleration circuitry 110 of FIG. 1, the accelerator 200 of FIG. 2, and/or the accelerator compiler 300 of FIG. 3. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor circuitry 1812 implements the example ML model configuration handler 310, the example activation configuration handler 320, the example weight configuration handler 330, the example configuration compiler 340, and the example executable generator 350 of FIG. 3.

The processor circuitry 1812 of the illustrated example includes a local memory 1813 (e.g., a cache). The processor circuitry 1812 of the illustrated example is in communication with a main memory including a volatile memory 1814 and a non-volatile memory 1816 via a bus 1818. For example, the bus 1818 may implement the example bus 116 of FIG. 1 and/or the example bus 395 of FIG. 3. The volatile memory 1814 may be implemented by SDRAM, DRAM, RDRAM®, and/or any other type of random access memory device. The non-volatile memory 1816 may be implemented by flash memory and/or any other desired type of memory device. Access to the main memory 1814, 1816 is controlled by a memory controller 1817.

The processor platform 1800 of the illustrated example also includes an interface circuit 1820. The interface circuit 1820 may be implemented by any type of interface standard, such as an Ethernet interface, a USB, a Bluetooth® interface, an NFC interface, and/or a PCIe interface.

In the illustrated example, one or more input devices 1822 are connected to the interface circuit 1820. The input device(s) 1822 permit(s) a user to enter data and/or commands into the processor circuitry 1812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a DSL connection, a telephone line connection, a coaxial cable system, a satellite system, a line-of-site wireless system, a cellular telephone system, etc. In this example, the interface circuit 1820 implements the example accelerator interface 360 of FIG. 3.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and DVD drives.

The machine executable instructions 1832 of FIGS. 14-17 may be stored in the mass storage device 1828, in the volatile memory 1814, in the non-volatile memory 1816, and/or on a removable non-transitory computer readable storage medium such as a CD or DVD. In this example, the one or more mass storage devices 1828 implement the example ML model datastore 370, the example activation datastore 380, and the example weight datastore 390 of FIG. 3.

The processor platform 1800 of the illustrated example of FIG. 18 includes an example graphics processing unit (GPU) 1840, an example vision processing unit (VPU) 1842, and an example neural network processor 1844. In this example, the GPU 1840, the VPU 1842, and the neural network processor 1844 are in communication with different hardware of the processor platform 1800, such as the volatile memory 1814, the non-volatile memory 1816, etc., via the bus 1818. In this example, the neural network processor 1844 may be implemented by one or more integrated circuits, logic circuits, microprocessors, GPUs, DSPs, or controllers from any desired family or manufacturer that can be used to execute an AI model, such as a neural network, which may be implemented by the ML model(s) 124 of FIG. 1. In some examples, one or more of the ML model configuration handler 310, the activation configuration handler 320, the weight configuration handler 330, the configuration compiler 340, the executable generator 350, the accelerator interface 360, the ML model datastore 370, the activation datastore 380, and/or the weight datastore 390 may be implemented in or with at least one of the GPU 1840, the VPU 1842, or the neural network processor 1844 instead of or in addition to the processor circuitry 1812, the one or more mass storage devices 1828, and/or the interface circuit 1820.

In some examples, the graphics processing unit 1840 may implement the first acceleration circuitry 108, the second acceleration circuitry 110, and/or the general purpose processing circuitry 112 of FIG. 1. In some examples, the VPU 1842 may implement the first acceleration circuitry 108, the second acceleration circuitry 110, and/or the general purpose processing circuitry 112 of FIG. 1. In some examples, the neural network processor 1844 may implement the first acceleration circuitry 108, the second acceleration circuitry 110, and/or the general purpose processing circuitry 112 of FIG. 1.

Figure 19:
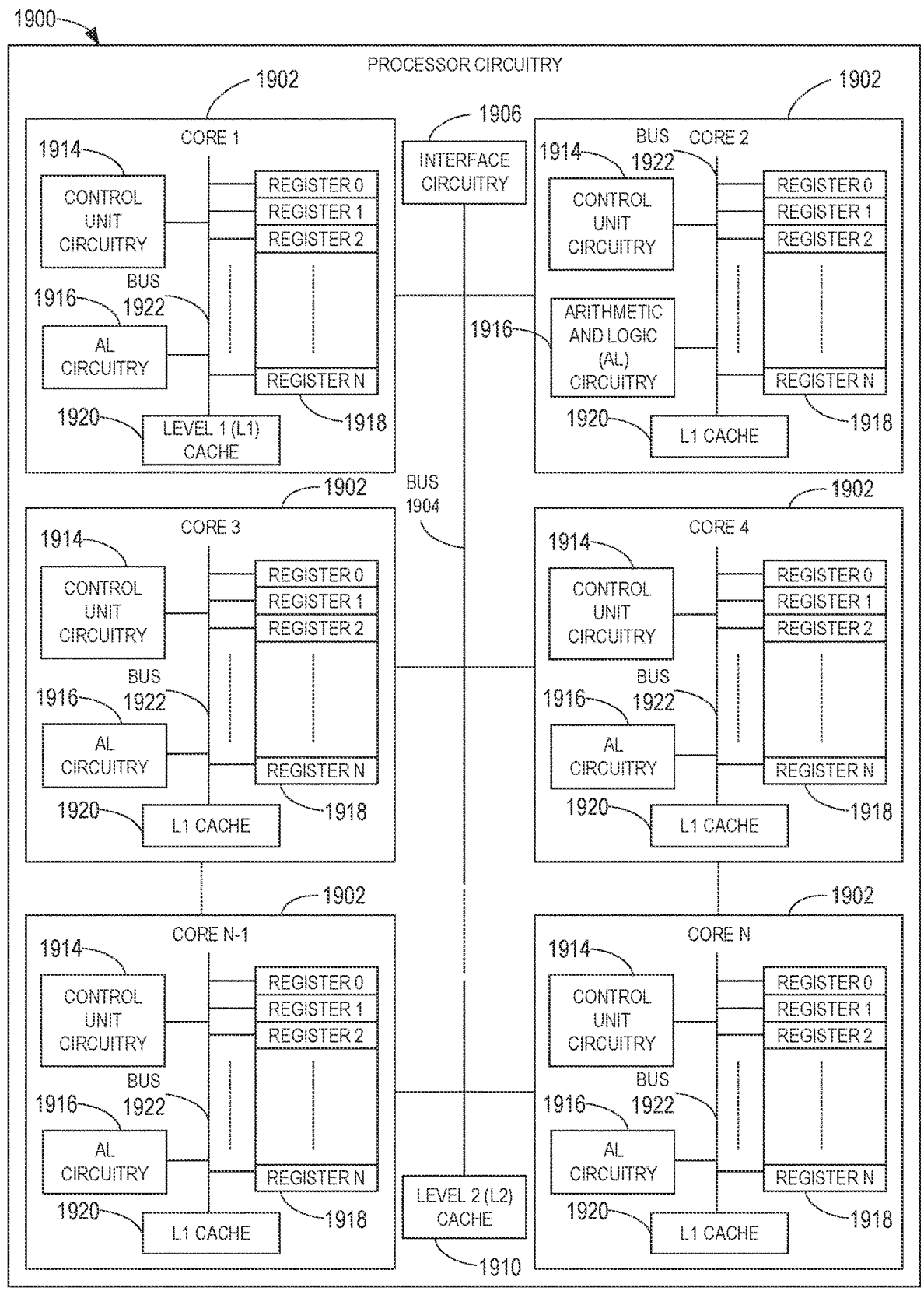
FIG. 19 is a block diagram of an example implementation of the processor circuitry of FIG. 18.

FIG. 19 is a block diagram of an example implementation of the processor circuitry 1812 of FIG. 18. In this example, the processor circuitry 1812 of FIG. 18 is implemented by a microprocessor 1900. For example, the microprocessor 1900 may implement multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowcharts of FIGS. 14-17.

The cores 1902 may communicate by an example bus 1904. In some examples, the bus 1904 may implement a communication bus to effectuate communication associated with one(s) of the cores 1902. For example, the bus 1904 may implement at least one of an Inter-Integrated Circuit (I2C) bus, a Serial Peripheral Interface (SPI) bus, a PCI bus, or a PCIe bus. Additionally or alternatively, the bus 1904 may implement any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2_cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the L1 cache 1920, and an example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating point operations. In yet other examples, the AL circuitry 1916 may include first AL circuitry that performs integer based operations and second AL circuitry that performs floating point operations. In some examples, the AL circuitry 1916 may be referred to as an Arithmetic Logic Unit (ALU). The registers 1918 are semiconductor-based structures to store data and/or instructions such as results of one or more of the operations performed by the AL circuitry 1916 of the corresponding core 1902. For example, the registers 1918 may include vector register(s), SIMD register(s), general purpose register(s), flag register(s), segment register(s), machine specific register(s), instruction pointer register(s), control register(s), debug register(s), memory management register(s), machine check register(s), etc. The registers 1918 may be arranged in a bank as shown in FIG. 19. Alternatively, the registers 1918 may be organized in any other arrangement, format, or structure including distributed throughout the core 1902 to shorten access time. The bus 1920 may implement at least one of an I2C bus, a SPI bus, a PCI bus, or a PCIe bus Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 20:
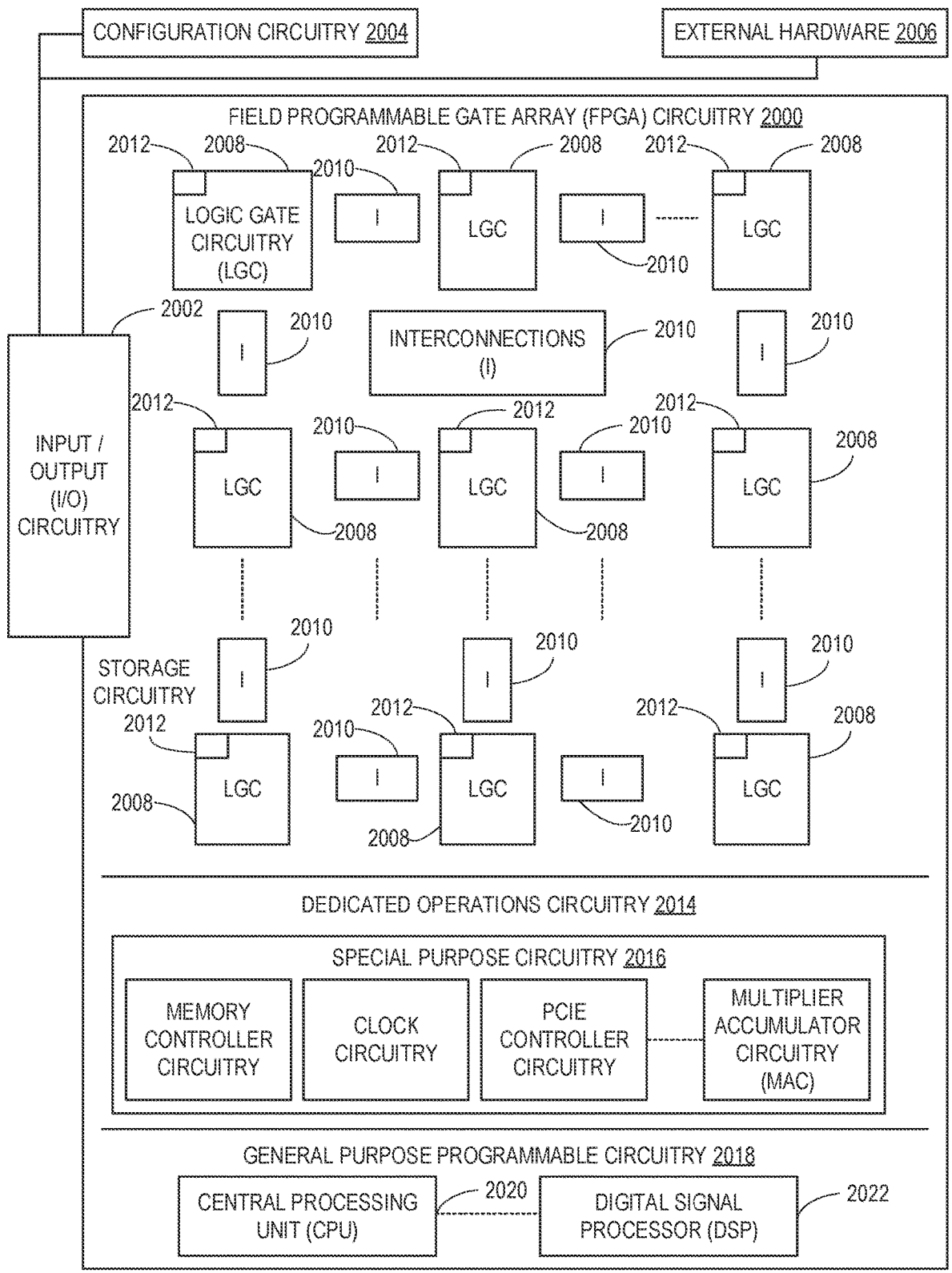
FIG. 20 is a block diagram of another example implementation of the processor circuitry of FIG. 18.

FIG. 20 is a block diagram of another example implementation of the processor circuitry 1812 of FIG. 18. In this example, the processor circuitry 1812 is implemented by FPGA circuitry 2000. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the machine readable instructions in hardware and, thus, can often execute the operations faster than they could be performed by a general purpose microprocessor executing the corresponding software.

More specifically, in contrast to the microprocessor 1900 of FIG. 19 described above (which is a general purpose device that may be programmed to execute some or all of the machine readable instructions represented by the flowchart of FIGS. 14-17 but whose interconnections and logic circuitry are fixed once fabricated), the FPGA circuitry 2000 of the example of FIG. 20 includes interconnections and logic circuitry that may be configured and/or interconnected in different ways after fabrication to instantiate, for example, some or all of the machine readable instructions represented by the flowcharts of FIGS. 14-17. In particular, the FPGA 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the software represented by the flowcharts of FIGS. 14-17. As such, the FPGA circuitry 2000 may be structured to effectively instantiate some or all of the machine readable instructions of the flowcharts of FIG. 14-17 as dedicated logic circuits to perform the operations corresponding to those software instructions in a dedicated manner analogous to an ASIC. Therefore, the FPGA circuitry 2000 may perform the operations corresponding to the some or all of the machine readable instructions of FIGS. 14-17 faster than the general purpose microprocessor can execute the same.

In the example of FIG. 20, the FPGA circuitry 2000 is structured to be programmed (and/or reprogrammed one or more times) by an end user by a hardware description language (HDL) such as Verilog. The FPGA circuitry 2000 of FIG. 20, includes example input/output (I/O) circuitry 2002 to obtain and/or output data to/from example configuration circuitry 2004 and/or external hardware (e.g., external hardware circuitry) 2006. For example, the configuration circuitry 2004 may implement interface circuitry that may obtain machine readable instructions to configure the FPGA circuitry 2000, or portion(s) thereof. In some such examples, the configuration circuitry 2004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2006 may implement the microprocessor 1900 of FIG. 19. In some examples, the external hardware 2006 may implement the first acceleration circuitry 108 of FIG. 1, the second acceleration circuitry of FIG. 1, and/or any other component of FIG. 1. In some examples, the external hardware 2006 may implement the accelerator 200 of FIG. 2. The FPGA circuitry 2000 also includes an array of example logic gate circuitry 2008, a plurality of example configurable interconnections 2010, and example storage circuitry 2012. The logic gate circuitry 2008 and interconnections 2010 are configurable to instantiate one or more operations that may correspond to at least some of the machine readable instructions of FIGS. 14-17 and/or other desired operations. The logic gate circuitry 2008 shown in FIG. 20 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations. The logic gate circuitry 2008 may include other electrical structures such as look-up tables (LUTs), registers (e.g., flip-flops or latches), multiplexers, etc.

The interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example Dedicated Operations Circuitry 2014. In this example, the Dedicated Operations Circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 19 and 20 illustrate two example implementations of the processor circuitry 1812 of FIG. 18, many other approaches are contemplated. For example, as mentioned above, modern FPGA circuitry may include an on-board CPU, such as one or more of the example CPU 2020 of FIG. 20. Therefore, the processor circuitry 1812 of FIG. 18 may additionally be implemented by combining the example microprocessor 1900 of FIG. 19 and the example FPGA circuitry 2000 of FIG. 20. In some such hybrid examples, a first portion of the machine readable instructions represented by the flowcharts of FIG. 14-17 may be executed by one or more of the cores 1902 of FIG. 19 and a second portion of the machine readable instructions represented by the flowcharts of FIGS. 14-17 may be executed by the FPGA circuitry 2000 of FIG. 20.

In some examples, the processor circuitry 1812 of FIG. 18 may be in one or more packages. For example, the processor circuitry 1900 of FIG. 19 and/or the FPGA circuitry 2000 of FIG. 20 may be in one or more packages. In some examples, an XPU may be implemented by the processor circuitry 1812 of FIG. 18, which may be in one or more packages. For example, the XPU may include a CPU in one package, a DSP in another package, a GPU in yet another package, and an FPGA in still yet another package.

Figure 21:
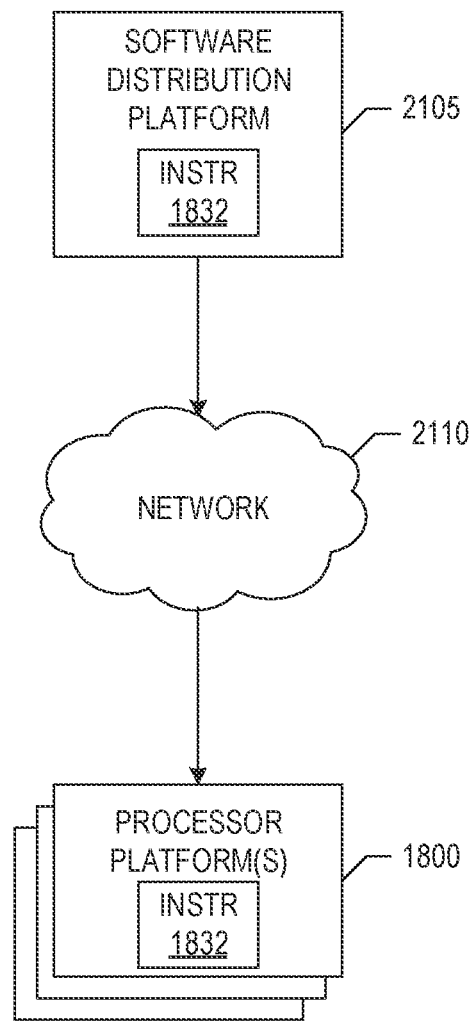
FIG. 21 is a block diagram of an example software distribution platform to distribute software to client devices.

FIG. 21 is a block diagram of an example software distribution platform 2105 to distribute software (e.g., software corresponding to the example machine readable instructions 1832 of FIG. 18) to third parties, client devices, etc., such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers). The example software distribution platform 2105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine readable instructions 1832 of FIG. 18. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the machine readable instructions 1832, which may correspond to the example machine readable instructions 1400, 1500, 1600, 1700 of FIGS. 14-17, as described above. The one or more servers of the example software distribution platform 2105 are in communication with a network 2110, which may correspond to any one or more of the Internet and/or any of the example networks 128, 1826 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the machine readable instructions 1832 from the software distribution platform 2105. For example, the software, which may correspond to the example machine readable instructions 1400, 1500, 1600, 1700 of FIGS. 14-17, may be downloaded to the example processor platform 1800, which is to execute the machine readable instructions 1832 to implement the example acceleration compiler 104A-C of FIG. 1, the first example acceleration circuitry 108 of FIG. 1, the second example acceleration circuitry 110 of FIG. 1, the example accelerator 200 of FIG. 1, and/or the example accelerator compiler 300 of FIG. 3. In some example, one or more servers of the software distribution platform 2105 periodically offer, transmit, and/or force updates to the software (e.g., the example machine readable instructions 1832 of FIG. 18) to ensure improvements, patches, updates, etc. are distributed and applied to the software at the end user devices.

From the foregoing, it will be appreciated that example systems, methods, apparatus, and articles of manufacture have been disclosed to perform machine-learning model operations on sparse accelerators. The disclosed systems, methods, apparatus, and articles of manufacture utilize bit mask vectors as compute vectors in addition to being sparsity vectors to isolate single activations and/or single channels or groups of channels within a tensor. The disclosed systems, methods, apparatus, and articles of manufacture manipulate bit mask vectors internal to a sparse accelerator to save the bandwidth of reading the bit mask vectors from external memory. The disclosed systems, methods, apparatus, and articles of manufacture alternatively may perform the manipulation offline, load to memory, and read the manipulated bit mask vectors into the sparse accelerator when processing the layer. The disclosed systems, methods, apparatus, and articles of manufacture improve the efficiency of using a computing device by reducing a quantity of data to be read into an accelerator to execute a machine-learning layer and execute non-conventional convolution operations as conventional convolution operations to improve system efficiency and performance. The disclosed methods, apparatus and articles of manufacture are accordingly directed to one or more improvement(s) in the functioning of a computer.

Example methods, apparatus, systems, and articles of manufacture to perform machine-learning model operations on sparse accelerators are disclosed herein. Further examples and combinations thereof include the following:

Example 1 includes an apparatus to execute an acceleration operation, the apparatus comprising first circuitry, second circuitry to generate sparsity data based on the acceleration operation, and third circuitry to instruct one or more data buffers to provide at least one of activation data or weight data based on the sparsity data to the first circuitry, the first circuitry to execute the acceleration operation based on the at least one of the activation data or the weight data.

Example 2 includes the apparatus of example 1, wherein the sparsity data includes a sparse weight vector, and further including fourth circuitry to identify the acceleration operation based on configuration information, the sparse weight vector generated based on the configuration information, and the third circuitry to generate a sparsity bit mask based on a sparse activation vector and the sparse weight vector in response to obtaining the sparse activation vector.

Example 3 includes the apparatus of example 1, wherein the sparsity data includes at least one of activation sparsity data or weight sparsity data, the one or more data buffers include a weight data buffer and an activation data buffer, and the third circuitry is to generate a combined sparsity bit mask based on the activation sparsity data and the weight sparsity data, instruct the activation data buffer to provide activation data to the first circuitry based on the combined sparsity bit mask, and in response to determining to generate weight data, instruct the weight data buffer to provide the generated weight data to the first circuitry based on the combined sparsity bit mask.

Example 4 includes the apparatus of example 1, wherein the sparsity data includes a sparse weight vector, the acceleration operation is a depthwise convolution operation, and wherein the second circuitry is to identify a data pattern based on the depthwise convolution operation, and generate the sparse weight vector based on the data pattern, and the third circuitry is to generate a sparsity bit mask based on the sparse weight vector.

Example 5 includes the apparatus of example 1, wherein the sparsity data includes a sparse weight vector, the acceleration operation is a grouped convolution operation, and wherein the second circuitry is to identify a data pattern based on the grouped convolution operation, the data pattern including a set of logic ones, and generate the sparse weight vector based on the data pattern, and the third circuitry is to generate a sparsity bit mask based on the sparse weight vector.

Example 6 includes the apparatus of example 1, wherein the acceleration operation is an elementwise addition operation, and wherein the second circuitry is to identify a data pattern based on the elementwise addition operation, the data pattern based on a walking ones data pattern, and generate a plurality of sparse weight vectors based on the data pattern, and the first circuitry is to store first data values associated with a first tensor based on the plurality of the sparse weight vectors and a first set of the activation data, store second data values associated with a second tensor based on the plurality of the sparse weight vectors and a second set of the activation data, and generate output data values based on a sum of the first data values and the second data values.

Example 7 includes the apparatus of example 1, wherein the sparsity data includes one or more sparse weight vectors, the acceleration operation is a dilated convolution, and wherein the second circuitry is to, in response to an identification of a data pattern based on the dilated convolution, generate the one or more sparse weight vectors based on the data pattern, the data pattern based on a sparse kernel, and the third circuitry is to generate one or more sparsity bit masks based on the one or more sparse weight vectors.

Example 8 includes a non-transitory computer readable medium comprising instructions that, when executed, cause at least one accelerator to at least generate, with the at least one accelerator, sparsity data based on an acceleration operation to be executed by the at least one accelerator, instruct one or more data buffers to provide at least one of activation data or weight data based on the sparsity data to accelerator logic of the at least one accelerator, and execute the acceleration operation based on the at least one of the activation data or the weight data.

Example 9 includes the non-transitory computer readable medium of example 8, wherein the sparsity data includes a sparse weight vector, and the instructions, when executed, cause the at least one accelerator to identify the acceleration operation based on configuration information, the sparse weight vector generated based on the configuration information, and in response to obtaining a sparse activation vector, generate a sparsity bit mask based on the sparse activation vector and the sparse weight vector.

Example 10 includes the non-transitory computer readable medium of example 8, wherein the sparsity data includes at least one of activation sparsity data or weight sparsity data, the one or more data buffers include a weight data buffer and an activation data buffer, and the instructions, when executed, cause the at least one accelerator to generate a combined sparsity bit mask based on the activation sparsity data and the weight sparsity data, instruct the activation data buffer to provide activation data to the accelerator logic based on the combined sparsity bit mask, and in response to determining to generate weight data, instruct the weight data buffer to provide the generated weight data to the accelerator logic based on the combined sparsity bit mask.

Example 11 includes the non-transitory computer readable medium of example 8, wherein the sparsity data includes a sparse weight vector, the acceleration operation is a depthwise convolution operation, and the instructions, when executed, cause the at least one accelerator to identify a data pattern based on the depthwise convolution operation, generate the sparse weight vector based on the data pattern, and generate a sparsity bit mask based on the sparse weight vector.

Example 12 includes the non-transitory computer readable medium of example 8, wherein the sparsity data includes a sparse weight vector, the acceleration operation is a grouped convolution operation, and the instructions, when executed, cause the at least one accelerator to identify a data pattern based on the grouped convolution operation, the data pattern including a set of logic ones, generate the sparse weight vector based on the data pattern, and generate a sparsity bit mask based on the sparse weight vector.

Example 13 includes the non-transitory computer readable medium of example 8, wherein the acceleration operation is an elementwise addition operation, and the instructions, when executed, cause the at least one accelerator to identify a data pattern based on the elementwise addition operation, the data pattern based on a walking ones data pattern, generate a plurality of sparse weight vectors based on the data pattern, store first data values associated with a first tensor based on the plurality of the sparse weight vectors and a first set of the activation data, store second data values associated with a second tensor based on the plurality of the sparse weight vectors and a second set of the activation data, and generate output data values based on a sum of the first data values and the second data values.

Example 14 includes the non-transitory computer readable medium of example 8, wherein the sparsity data includes one or more sparse weight vectors, the acceleration operation is a dilated convolution, and the instructions, when executed, cause the at least one accelerator to identify a data pattern based on the dilated convolution, the data pattern based on a sparse kernel, generate the one or more sparse weight vectors based on the data pattern, and generate one or more sparsity bit masks based on the one or more sparse weight vectors.

Example 15 includes a method comprising generating, with an accelerator, sparsity data based on an acceleration operation to be executed by the accelerator, instructing one or more data buffers to provide at least one of activation data or weight data based on the sparsity data to accelerator logic of the accelerator, and executing the acceleration operation based on the at least one of the activation data or the weight data.

Example 16 includes the method of example 15, wherein the sparsity data includes a sparse weight vector, and further including identifying the acceleration operation based on configuration information, the sparse weight vector generated based on the configuration information, and in response to obtaining a sparse activation vector, generating a sparsity bit mask based on the sparse activation vector and the sparse weight vector.

Example 17 includes the method of example 15, wherein the sparsity data includes at least one of activation sparsity data or weight sparsity data, the one or more data buffers include a weight data buffer and an activation data buffer, and further including generating a combined sparsity bit mask based on the activation sparsity data and the weight sparsity data, instructing the activation data buffer to provide activation data to the accelerator logic based on the combined sparsity bit mask, and in response to determining to generate weight data, instructing the weight data buffer to provide the generated weight data to the accelerator logic based on the combined sparsity bit mask.

Example 18 includes the method of example 15, wherein the sparsity data includes a sparse weight vector, the acceleration operation is a depthwise convolution operation, and further including identifying a data pattern based on the depthwise convolution operation, generating the sparse weight vector based on the data pattern, and generating a sparsity bit mask based on the sparse weight vector.

Example 19 includes the method of example 15, wherein the sparsity data includes a sparse weight vector, the acceleration operation is a grouped convolution operation, and further including identifying a data pattern based on the grouped convolution operation, the data pattern including a set of logic ones, generating the sparse weight vector based on the data pattern, and generating a sparsity bit mask based on the sparse weight vector.

Example 20 includes the method of example 15, wherein the acceleration operation is an elementwise addition operation, and further including identifying a data pattern based on the elementwise addition operation, the data pattern based on a walking ones data pattern, generating a plurality of sparse weight vectors based on the data pattern, storing first data values associated with a first tensor based on the plurality of the sparse weight vectors and a first set of the activation data, storing second data values associated with a second tensor based on the plurality of the sparse weight vectors and a second set of the activation data, and generating output data values based on a sum of the first data values and the second data values.

Example 21 includes the method of example 15, wherein the sparsity data includes one or more sparse weight vectors, the acceleration operation is a dilated convolution, and further including identifying a data pattern based on the dilated convolution, the data pattern based on a sparse kernel, generating the one or more sparse weight vectors based on the data pattern, and generating one or more sparsity bit masks based on the one or more sparse weight vectors.

Example 22 includes an apparatus to execute an acceleration operation, the apparatus comprising means for generating sparsity data based on the acceleration operation, means for instructing one or more data buffers to provide at least one of activation data or weight data based on the sparsity data, and means for executing the acceleration operation based on the at least one of the activation data or the weight data.

Example 23 includes the apparatus of example 22, wherein the sparsity data includes a sparse weight vector, and further including means for identifying the acceleration operation based on configuration information, the sparse weight vector generated based on the configuration information, and the means for generating to generate a sparsity bit mask based on a sparse activation vector and the sparse weight vector in response to obtaining the sparse activation vector.

Example 24 includes the apparatus of example 22, wherein the sparsity data includes at least one of activation sparsity data or weight sparsity data, the one or more data buffers include a weight data buffer and an activation data buffer, and the means for instructing is to generate a combined sparsity bit mask based on the activation sparsity data and the weight sparsity data, instruct the activation data buffer to provide activation data to the means for executing based on the combined sparsity bit mask, and in response to determining to generate weight data, instruct the weight data buffer to provide the generated weight data to the means for executing based on the combined sparsity bit mask.

Example 25 includes the apparatus of example 22, wherein the sparsity data includes a sparse weight vector, the acceleration operation is a depthwise convolution operation, and wherein the means for generating is to identify a data pattern based on the depthwise convolution operation, and generate the sparse weight vector based on the data pattern, and the means for instructing is to generate a sparsity bit mask based on the sparse weight vector.

Example 26 includes the apparatus of example 22, wherein the sparsity data includes a sparse weight vector, the acceleration operation is a grouped convolution operation, and wherein the means for generating is to identify a data pattern based on the grouped convolution operation, the data pattern including a set of logic ones, and generate the sparse weight vector based on the data pattern, and the means for instructing is to generate a sparsity bit mask based on the sparse weight vector.

Example 27 includes the apparatus of example 22, wherein the acceleration operation is an elementwise addition operation, and wherein the means for generating is to identify a data pattern based on the elementwise addition operation, the data pattern based on a walking ones data pattern, and generate a plurality of sparse weight vectors based on the data pattern, and the means for executing is to store first data values associated with a first tensor based on the plurality of the sparse weight vectors and a first set of the activation data, store second data values associated with a second tensor based on the plurality of the sparse weight vectors and a second set of the activation data, and generate output data values based on a sum of the first data values and the second data values.

Example 28 includes the apparatus of example 22, wherein the sparsity data includes one or more sparse weight vectors, the acceleration operation is a dilated convolution, and wherein the means for generating is to identify a data pattern based on the dilated convolution, the data pattern based on a sparse kernel, and generate the one or more sparse weight vectors based on the data pattern, and the means for instructing is to generate one or more sparsity bit masks based on the one or more sparse weight vectors.

Example 29 includes an apparatus comprising internal weight sparsity generation circuitry with a first output, first multiplexer circuitry with a first multiplexer input and a first multiplexer output, the first multiplexer input coupled to the first output, controller circuitry with a first controller input, a first controller output, and a second controller output, the first controller input coupled to the first multiplexer output, and acceleration circuitry having acceleration inputs.

Example 30 includes the apparatus of example 29, further including configuration circuitry with a first configuration output, a second configuration output, a third configuration output, and a fourth configuration output, the first configuration output coupled to a first input of the internal weight sparsity generation circuitry, the second configuration output coupled to a first multiplexer control input of the first multiplexer circuitry, internal activation sparsity generation circuitry with a second input and a second output, the second input coupled to the third configuration output, and second multiplexer circuitry with a second multiplexer control input, a second multiplexer input, and a second multiplexer output, the second multiplexer control input coupled to the fourth configuration output, the second multiplexer input coupled to the second output.

Example 31 includes the apparatus of example 30, further including a configuration interface coupled to a configuration input of the configuration circuitry.

Example 32 includes the apparatus of example 30, further including an external weight sparsity buffer having a first buffer input and a first buffer output, the first buffer output coupled to a third multiplexer input of the first multiplexer circuitry, an external activation sparsity buffer having a second buffer input and a second buffer output, the second buffer output coupled to a fourth multiplexer input of the second multiplexer circuitry, a weight sparsity data interface coupled to the first buffer input, and an activation sparsity data interface coupled to the second buffer input.

Example 33 includes the apparatus of example 30, wherein the controller circuitry has a second controller input coupled to the second multiplexer output, and further including an activation data buffer having a first data buffer input and first data buffer outputs, the first data buffer input coupled the first controller output, the first data buffer outputs coupled to respective ones of the accelerator inputs, and a weight data buffer having a second data buffer input and second data buffer outputs, the second data buffer input coupled to the second controller output, the second data buffer outputs coupled to respective ones of the accelerator inputs.

Example 34 includes the apparatus of example 33, wherein the weight data buffer includes internal weight generation circuitry.

Example 35 includes the apparatus of example 33, further including an accumulator storage with storage inputs and storage outputs, the storage inputs coupled to respective ones of accelerator outputs of the accelerator circuitry, and an output activation interface coupled to the storage outputs.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   first circuitry comprising one or more multiply accumulators;
   a buffer to store first sparsity data, the first sparsity data indicating sparsity in input data of a first convolution type;
   second circuitry to generate second sparsity data for a second convolution type;
   one or more other buffers to store input data of a convolution; and
   third circuitry to:
      select sparsity data between the first sparsity data and the second sparsity data based on a type of a convolution,
      identify one or more data elements in the input data of the convolution based on the selected sparsity data, and
      transfer the one or more data elements from the one or more other data buffers to the first circuitry,
   wherein the first circuitry is to execute at least part of the convolution by performing one or more multiply-accumulate operations on the one or more data elements.

2. The apparatus of claim 1, wherein the second sparsity data includes a sparse weight vector, and the apparatus further comprises:
   fourth circuitry to identify the type of the convolution based on configuration information, the sparse weight vector generated based on the configuration information,
   wherein the third circuitry is further to generate a sparsity bit mask based on a sparse activation vector and the sparse weight vector and is to identify the one or more data elements by using the sparsity bit mask.

3. The apparatus of claim 1, wherein the selected sparsity data includes at least one of activation sparsity data and weight sparsity data, the one or more data buffers include a weight data buffer and an activation data buffer, and the third circuitry is to:
   generate a combined sparsity bit mask based on the activation sparsity data and the weight sparsity data;
   identify one or more weights stored in the weight data buffer and one or more activations stored in the activation data buffer based on the combined sparsity bit mask;
   transfer the one or more activations from the activation data buffer to the first circuitry; and
   transfer the one or more weights from the weight data buffer to the first circuitry.

4. The apparatus of claim 1, wherein the second sparsity data includes a sparse weight vector, the type of the convolution is depthwise convolution, and
   the sparse weight vector includes a sequence of elements, in which an element has a different value from other elements.

5. The apparatus of claim 1, wherein the second sparsity data includes a sparse weight vector, the type of the convolution is grouped convolution, and the sparse weight vector includes a sequence of elements, in which a group of consecutive elements in the sequence has a different value from other elements in the sequence.

6. The apparatus of claim 1, wherein the type of the convolution is elementwise addition, and wherein:

the second circuitry is to generate the second sparsity data by generating a plurality of sparse weight vectors, each sparse weight vector including a non-zero element and one or more other zero elements.

7. The apparatus of claim 1, wherein the second sparsity data includes a sparse weight matrix, the type of the convolution is dilated convolution, and the second circuitry is to generate the sparse weight matrix based on a dimension of a kernel of the convolution and a dilation parameter of the convolution.

8. A non-transitory computer readable medium storing instructions executable to perform operations, the operations comprising:

storing first sparsity data, the first sparsity data indicating sparsity in input data of a first convolution type;

generating second sparsity data for a second convolution type;

selecting sparsity data between the first sparsity data and the second sparsity data based on a type of a convolution;

identifying one or more data elements in the input data of the convolution based on the selected sparsity data;

transferring the one or more data elements from one or more data buffers to one or more multiply accumulators; and executing, by the one or more multiply accumulators, at least part of the convolution by performing one or more multiply-accumulate operations on the one or more data elements.

9. The non-transitory computer readable medium of claim 8, wherein the second sparsity data includes a sparse weight vector, and the operations further comprise:

identifying the type of the convolution based on configuration information, the sparse weight vector generated based on the configuration information generating a sparsity bit mask based on a sparse activation vector and the sparse weight vector, wherein the one or more data elements are identified by using the sparsity bit mask.

10. The non-transitory computer readable medium of claim 8, wherein the selected sparsity data includes at least one of activation sparsity data and weight sparsity data, the one or more data buffers include a weight data buffer and an activation data buffer, and the operations further comprise:

generating a combined sparsity bit mask based on the activation sparsity data and the weight sparsity data;

identifying one or more weights stored in the weight data buffer and one or more activations stored in the activation data buffer based on the combined sparsity bit mask;

transferring the one or more activations from the activation data buffer to the one or more multiply accumulators; and transferring the one or more weights from the weight data buffer to the one or more multiply accumulators.

11. The non-transitory computer readable medium of claim 8, wherein the second sparsity data includes a sparse weight vector, the type of the convolution is depthwise convolution, and the sparse weight vector includes a sequence of elements, in which an element has a different value from other elements.

12. The non-transitory computer readable medium of claim 8, wherein the second sparsity data includes a sparse weight vector, the type of the convolution a grouped convolution, and the sparse weight vector includes a sequence of elements, in which a group of consecutive elements in the sequence has a different value from other elements in the sequence.

13. The non-transitory computer readable medium of claim 8, wherein the type of the convolution is elementwise addition, and generating the second sparsity data comprises:

generating a plurality of sparse weight vectors, each sparse weight vector including a non-zero element and one or more other zero elements.

14. The non-transitory computer readable medium of claim 8, wherein the second sparsity data includes a sparse weight matrix, the type of the convolution is a dilated convolution, and generating the second sparsity data comprises:

generating the sparse weight matrix based on a dimension of a kernel of the convolution and a dilation parameter of the convolution.

15. A method comprising:

storing first sparsity data, the first sparsity data indicating sparsity in input data of a first convolution type;

generating second sparsity data for a second convolution type;

selecting sparsity data between the first sparsity data and the second sparsity data based on a type of a convolution;

identifying one or more data elements in the input data of the convolution based on the selected sparsity data;

transferring the one or more data elements from one or more data buffers to one or more multiply accumulators; and executing, by the one or more multiply accumulators, at least part of the convolution by performing one or more multiply-accumulate operations on the one or more data element.

16. The method of claim 15, wherein the second sparsity data includes a sparse weight vector, and the method further comprises:

identifying the type of the convolution based on configuration information, the sparse weight vector generated based on the configuration information generating a sparsity bit mask based on a sparse activation vector and the sparse weight vector, wherein the one or more data elements are identified by using the sparsity bit mask.

17. The method of claim 15, wherein the selected sparsity data includes at least one of activation sparsity data and weight sparsity data, the one or more data buffers include a weight data buffer and an activation data buffer, and the method further comprises:

generating a combined sparsity bit mask based on the activation sparsity data and the weight sparsity data;

identifying one or more weights stored in the weight data buffer and one or more activations stored in the activation data buffer based on the combined sparsity bit mask;

transferring the one or more activations from the activation data buffer to the one or more multiply accumulators; and transferring the one or more weights from the weight data buffer to the one or more multiply accumulators.

18. The method of claim 15, wherein the second sparsity data includes a sparse weight vector, the type of the convolution is depthwise convolution, and the sparse weight vector includes a sequence of elements, in which an element has a different value from other elements.

19. The method of claim 15, wherein the second sparsity data includes a sparse weight vector, the type of the convolution is grouped convolution, and the sparse weight vector includes a sequence of elements, in which a group of consecutive elements in the sequence has a different value from other elements in the sequence.

20. The method of claim 15, wherein the type of the convolution is elementwise addition, and the method further comprises:

generating a plurality of sparse weight vectors, each sparse weight vector including a non-zero element and one or more other zero elements.

21. The method of claim 15, wherein the second sparsity data includes a sparse weight matrix, the type of the convolution is dilated convolution, and the method further comprises:

generating the sparse weight matrix based on a dimension of a kernel of the convolution and a dilation parameter of the convolution.

\* \* \* \* \*

UNITED STATES PATENT AND TRADEMARK OFFICE
CERTIFICATE OF CORRECTION

| | | |
|---|---|---|
| PATENT NO. | : 12,321,857 B2 | Page 1 of 1 |
| APPLICATION NO. | : 17/357924 | |
| DATED | : June 3, 2025 | |
| INVENTOR(S) | : Martin Power et al. | |

It is certified that error appears in the above-identified patent and that said Letters Patent is hereby corrected as shown below:

In the Claims

In Column 59, Claim 9, Line 47, delete "information" and insert -- information; and --, therefor.

In Column 60, Claim 12, Line 10, delete "a grouped" and insert -- is grouped --, therefor.

In Column 60, Claim 16, Line 52, delete "information" and insert -- information; and --, therefor.

Signed and Sealed this
Fifteenth Day of July, 2025

Coke Morgan Stewart
*Acting Director of the United States Patent and Trademark Office*